United States Patent
Kimura

(10) Patent No.: US 9,015,625 B2
(45) Date of Patent: Apr. 21, 2015

(54) ELECTRONIC DEVICE, METHOD OF SELECTING MENU, AND PROGRAM FOR SELECTING MENU

(75) Inventor: Mitsuhide Kimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 509 days.

(21) Appl. No.: 13/124,239

(22) PCT Filed: Oct. 29, 2009

(86) PCT No.: PCT/JP2009/068571
§ 371 (c)(1),
(2), (4) Date: Apr. 14, 2011

(87) PCT Pub. No.: WO2010/050547
PCT Pub. Date: May 6, 2010

(65) Prior Publication Data
US 2011/0202875 A1    Aug. 18, 2011

(30) Foreign Application Priority Data
Oct. 30, 2008 (JP) .................................. 2008-280100

(51) Int. Cl.
G06F 3/048     (2013.01)
G06F 3/0488    (2013.01)
G06F 3/041     (2006.01)
G06F 3/044     (2006.01)
G06F 3/0482    (2013.01)

(52) U.S. Cl.
CPC ............ *G06F 3/0488* (2013.01); *G06F 3/0412* (2013.01); *G06F 3/044* (2013.01); *G06F 3/0482* (2013.01); *G06F 3/04883* (2013.01)

(58) Field of Classification Search
USPC .......................................... 715/810; 345/173
See application file for complete search history.

(56) References Cited

U.S. PATENT DOCUMENTS

| 6,560,612 | B1 | 5/2003 | Yamada et al. |
| 7,221,357 | B2 * | 5/2007 | Von Essen et al. ............ 345/173 |
| 2004/0004604 | A1 | 1/2004 | Numano |
| 2004/0239621 | A1 | 12/2004 | Numano |
| 2007/0126714 | A1 | 6/2007 | Imamura |
| 2007/0229471 | A1 * | 10/2007 | Kim et al. ...................... 345/173 |

(Continued)

FOREIGN PATENT DOCUMENTS

| JP | 7-261932 A | 10/1995 |
| JP | 2000-339097 A | 12/2000 |

(Continued)

OTHER PUBLICATIONS

International Search Report, dated Feb. 23, 2010 issued in PCT/JP2009/068571.

*Primary Examiner* — Tadeese Hailu
*Assistant Examiner* — Darrin Hope
(74) *Attorney, Agent, or Firm* — Birch, Stewart, Kolasch & Birch, LLP

(57) ABSTRACT

An electronic device includes a storage portion for storing a plurality of menus, a multi-point-acceptable display-integrated tablet, a display control unit for causing the display-integrated tablet to display a display screen including the plurality of menus, an input processing unit for outputting an indicated position in accordance with an input while the input is provided to the display-integrated tablet, a selection unit for selecting menus based on a plurality of simultaneously output indicated positions, and an output portion for outputting the selected menus.

12 Claims, 38 Drawing Sheets

(56) References Cited

FOREIGN PATENT DOCUMENTS

| | | |
|---|---|---|
| JP | 2001-356878 A | 12/2001 |
| JP | 2004-5105 A | 1/2004 |
| JP | 2004-5212 A | 1/2004 |
| JP | 2004-234504 A | 8/2004 |
| JP | 2007-156983 A | 6/2007 |
| JP | 2007-272904 A | 10/2007 |

* cited by examiner

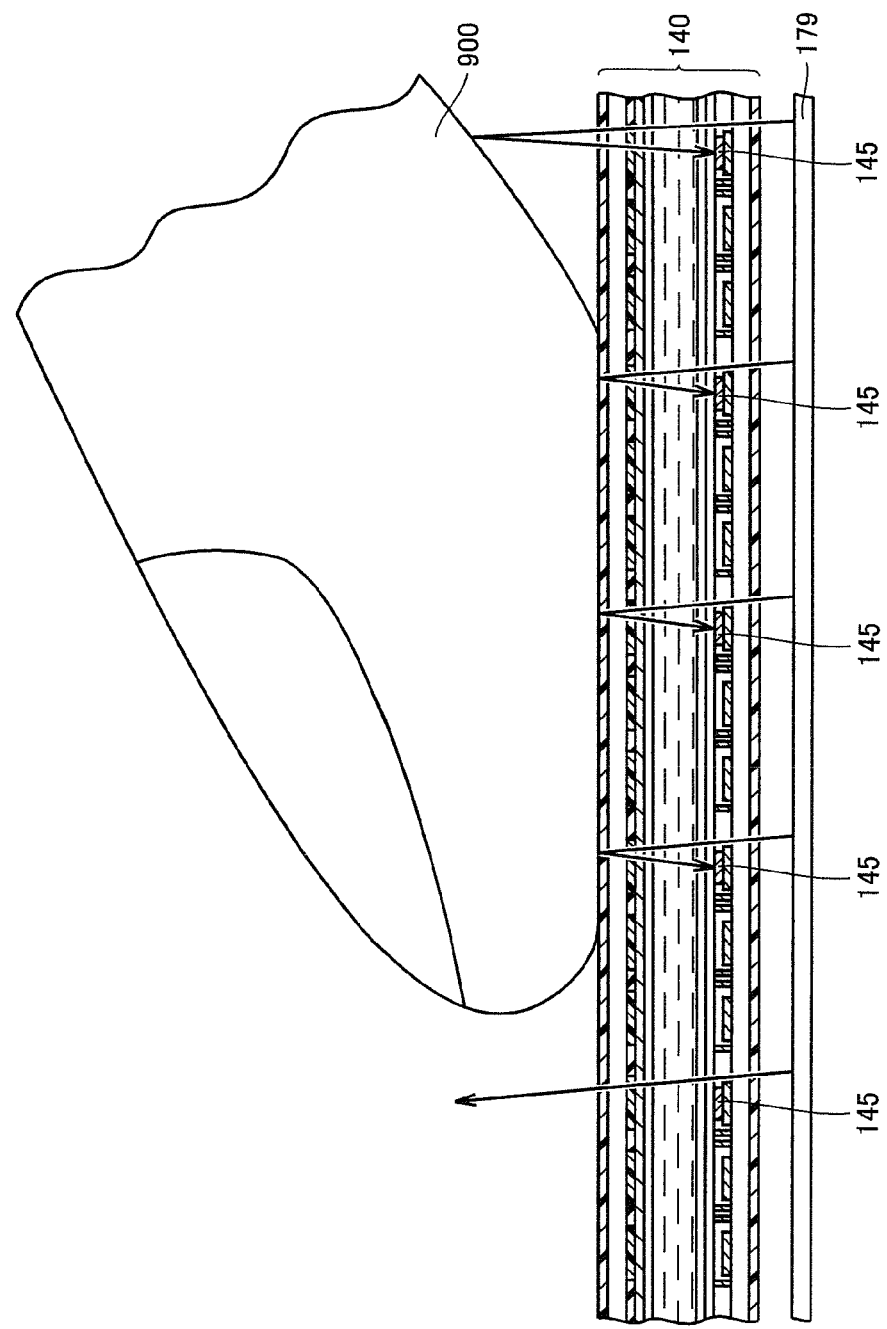

FIG.7

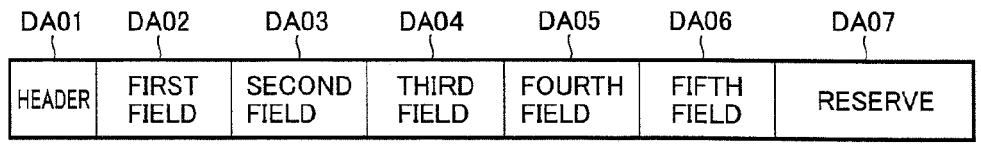

FIG.8

| TYPE | NUMBER | FIELD NAME | VALUE | DEFINITION | MEANING |
|---|---|---|---|---|---|
| 000 | 1 | TIMING | 00 | SENSE | REQUEST SCAN DATA AT THE TIME |
| | | | 01 | EVENT | REQUEST SCAN DATA WHEN CHANGE IS MADE |
| | | | 10 | ALL | REQUEST SCAN DATA EVERY FIXED PERIOD OF TIME |
| | 2 | DATA TYPE | 001 | COORDINATES | CENTER COORDINATES OF PARTIAL IMAGE |
| | | | 010 | PARTIAL IMAGE | ONLY CHANGED PARTIAL IMAGE |
| | | | 011 | COORDINATES + PARTIAL IMAGE | CENTER COORDINATES OF PARTIAL IMAGE AND CHANGED PARTIAL IMAGE |
| | | | 100 | ENTIRE IMAGE | IMAGE OF ENTIRE SCANNED SCREEN |
| | | | 101 | COORDINATES + ENTIRE IMAGE | CENTER COORDINATES OF PARTIAL IMAGE AND IMAGE OF ENTIRE SCANNED SCREEN |
| | 3 | SCANNING METHOD | 00 | REFLECTION | SCAN WITH BACKLIGHT LIT ON |
| | | | 01 | TRANSMISSION | SCAN WITH BACKLIGHT LIT OFF |
| | | | 10 | REFLECTION/ TRANSMISSION | UTILIZATION OF BOTH REFLECTION AND TRANSMISSION |
| | 4 | IMAGE GRADATION | 00 | BINARY | DATA INDICATIVE OF BLACK AND WHITE |
| | | | 01 | MULTIPLE VALUE | MULTIPLE GRADATION DATA |
| | | | 10 | COLOR | RGB DATA |
| | 5 | RESOLUTION | 0 | HIGH | HIGH RESOLUTION IMAGE (FOR IMAGE RECOGNITION OF FINGERPRINT, ETC.) |
| | | | 1 | LOW | LOW RESOLUTION IMAGE (SHADOW OF FINGER OR HAND, ETC.) |

FIG.9

| TYPE | NUMBER | FIELD NAME | VALUE | DEFINITION | MEANING |
|---|---|---|---|---|---|
| 001 | 1 | DISPLAY REQUEST | 001 | IMAGE DISPLAY REQUEST | REQUEST TO DISPLAY IMAGE ON SUB DISPLAY |
| | | | 010 | ICON DISPLAY REQUEST | REQUEST TO DISPLAY ICON ON SUB DISPLAY |
| | | | 011 | HANDWRITING REGION DISPLAY REQUEST | REQUEST TO DISPLAY HANDWRITING REGION ON SUB DISPLAY |
| | | | ⋮ | ⋮ | ⋮ |
| | 2 | THE NUMBER/ KIND | | THE NUMBER OF IMAGES/KIND | THE NUMBER OF PIECES OF DISPLAY IMAGE INFORMATION/HANDWRITING LANGUAGE NUMBER |
| | 3 | DISPLAY RANGE | 01 | COORDINATES | DESIGNATE RANGE OF DISPLAY WITH COORDINATES |
| | | | 10 | ENTIRE DISPLAY | DESIGNATE RANGE OF DISPLAY AS A WHOLE |
| | | | ⋮ | ⋮ | ⋮ |
| | 4 | IMAGE | | IMAGE DATA | DISPLAYED IMAGE DATA AND INFORMATION OF POSITION FOR DISPLAY |

FIG.10

| TYPE | NUMBER | FIELD NAME | VALUE | DEFINITION | MEANING |
|---|---|---|---|---|---|
| 010 | 1 | OS PROCESSING REQUEST | 01 | OS TYPE REQUEST | REQUEST TRANSMISSION OF OS TYPE IN MAIN DEVICE |
| | | | 10 | OS LAUNCH | REQUEST LAUNCH OF OS DESIGNATED BY OS INFORMATION |
| | | | ⋮ | ⋮ | ⋮ |
| | 2 | OS INFORMATION | 000 | | NOT INDICATE LAUNCH OF OS |
| | | | 001 | FIRST OS | SELECT LAUNCH OF FIRST OS |
| | | | 010 | SECOND OS | SELECT LAUNCH OF SECOND OS |
| | | | ⋮ | ⋮ | ⋮ |

FIG.11

| TYPE | NUMBER | FIELD NAME | VALUE | DEFINITION | MEANING |
|---|---|---|---|---|---|
| 011 | 1 | LAUNCHED APPLICATION | | DESIGNATE APPLICATION TO BE LAUNCHED | DESIGNATE APPLICATION TO BE LAUNCHED IN MAIN DEVICE |
| | 2 | LAUNCH INFORMATION | | LAUNCH INFORMATION | LAUNCH SETTINGS/INFORMATION USED AFTER LAUNCH |

FIG.12

| TYPE | NUMBER | FIELD NAME | VALUE | DEFINITION | MEANING |
|---|---|---|---|---|---|
| 100 | 1 | RECEPTION REQUEST | 01 | FILE TRANSFER | REQUEST MAIN DEVICE TO RECEIVE FILE |
| | 2 | THE NUMBER | | THE NUMBER OF FILES | THE NUMBER OF FILES TO BE TRANSMITTED |
| | 3 | FILE | | FILE | FILE TO BE TRANSFERRED |

FIG.13

| TYPE | NUMBER | FIELD NAME | VALUE | DEFINITION | MEANING |
|---|---|---|---|---|---|
| 101 | 1 | COMMUNICATION TYPE | 001 | INFRARED COMMUNICATION | SELECT INFRARED COMMUNICATION |
| | | | 010 | Bluetooth | SELECT BLUETOOTH COMMUNICATION |
| | | | 011 | LAN | SELECT LAN COMMUNICATION |
| | | | ⋮ | ⋮ | ⋮ |
| | 2 | DESTINATION OF CONNECTION | 000 | | NO INFORMATION OF DESTINATION OF CONNECTION |
| | | | 001 | MAIN CONNECTION DESTINATION REQUEST | REQUEST INFORMATION OF DESTINATION OF CONNECTION FROM MAIN SIDE |
| | | | 010 | SUB CONNECTION DESTINATION REQUEST | REQUEST INFORMATION OF DESTINATION OF CONNECTION FROM SUB SIDE |
| | | | 011 | MAIN CONNECTION DESTINATION SETTING | SET INFORMATION OF DESTINATION OF CONNECTION FROM MAIN SIDE |
| | | | 100 | SUB CONNECTION DESTINATION SETTING | SET INFORMATION OF DESTINATION OF CONNECTION FROM SUB SIDE |
| | | | ⋮ | ⋮ | ⋮ |
| | 3 | DESTINATION OF TRANSFER | 000 | | NO INFORMATION OF DESTINATION OF TRANSFER |
| | | | 001 | MAIN TRANSFER DESTINATION REQUEST | REQUEST INFORMATION OF DESTINATION OF TRANSFER FROM MAIN SIDE |
| | | | 010 | SUB TRANSFER DESTINATION REQUEST | REQUEST INFORMATION OF DESTINATION OF TRANSFER FROM SUB SIDE |
| | | | 011 | MAIN TRANSFER DESTINATION SETTING | SET INFORMATION OF DESTINATION OF TRANSFER FROM MAIN SIDE |
| | | | 100 | SUB TRANSFER DESTINATION SETTING | SET INFORMATION OF DESTINATION OF TRANSFER FROM SUB SIDE |
| | | | ⋮ | ⋮ | ⋮ |
| | 4 | TIMING FOR OBTAINING STRENGTH IN COMMUNICATION | 00 | | NOT REQUEST TO OBTAIN STRENGTH |
| | | | 00 | SENSE | REQUEST MOST RECENT DATA |
| | | | 01 | EVENT | REQUEST DATA UPON OCCURRENCE OF CHANGE |
| | | | 10 | ALL | REQUEST DATA EVERY PRESCRIBED CYCLE |
| | | | ⋮ | ⋮ | ⋮ |

FIG.31
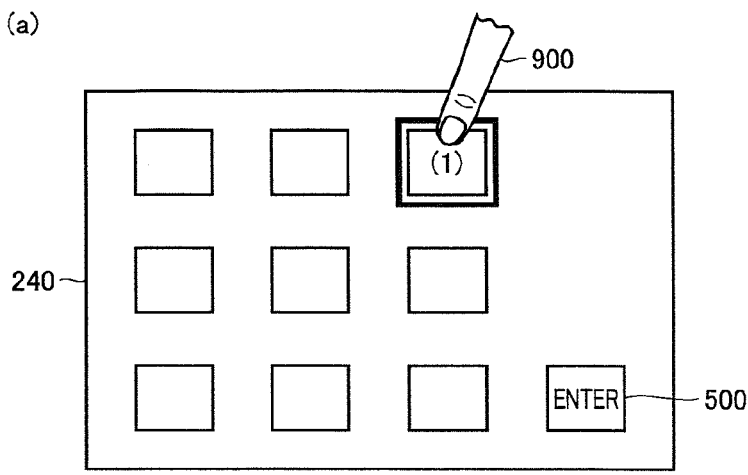
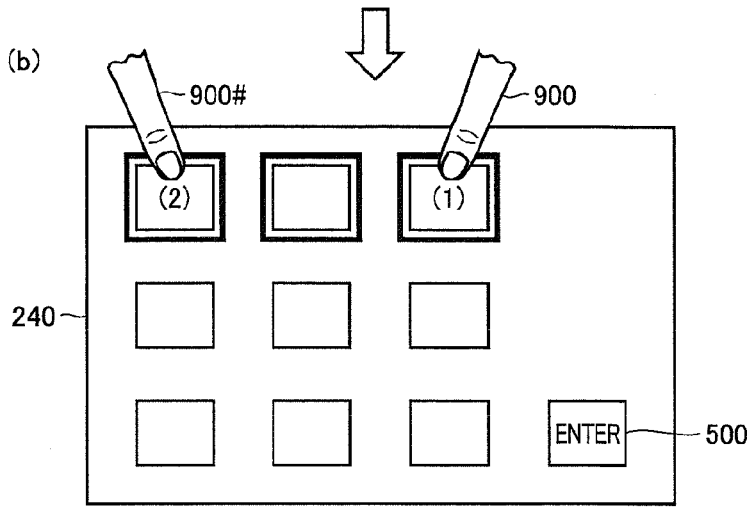
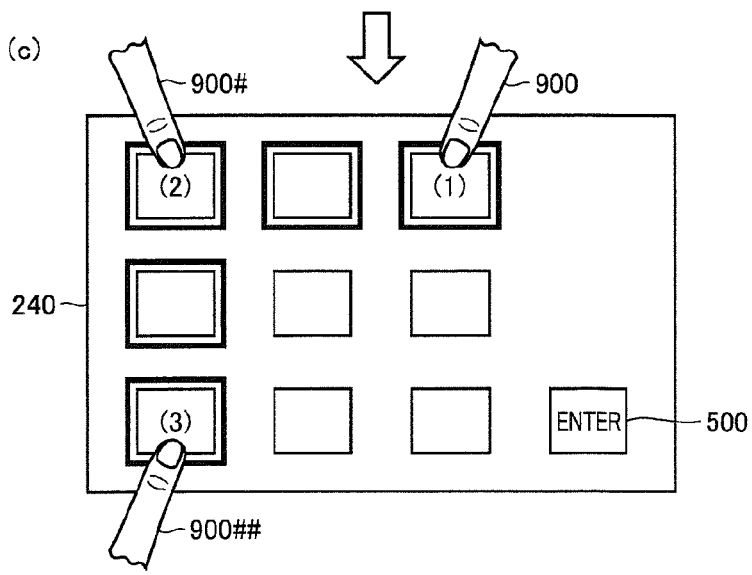

FIG.38
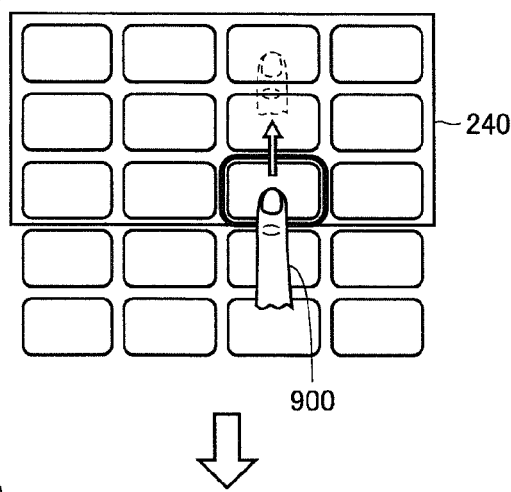
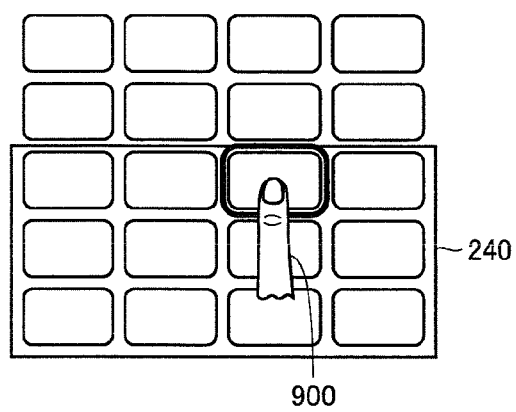

ELECTRONIC DEVICE, METHOD OF SELECTING MENU, AND PROGRAM FOR SELECTING MENU

TECHNICAL FIELD

The present invention relates to an electronic device including a display-integrated touch panel, as well as a method of selecting a menu with the electronic device and a program for selecting a menu.

BACKGROUND ART

Electronic devices such as a personal computer have currently widely been distributed. An electronic device normally includes an input device for accepting an external instruction and a display device. A mouse, a touch pad or the like has conventionally widely been used as the input device. Patent Document 1 (Japanese Patent Laying-Open No. 2004-5105), Patent Document 2 (Japanese Patent Laying-Open No. 2004-5212), Patent Document 3 (Japanese Patent Laying-Open No. 2004-234504), and Patent Document 4 (Japanese Patent Laying-Open No. 2000-339097) each disclose an information processing apparatus including a touch pad combined with a display device.

An electronic device may cause its display device to display a plurality of menus such as a thumbnail of an image or a command menu. A user can use an input device to simultaneously select a plurality of menus among a plurality of displayed menus.

For example, in Windows® applications, the user can simultaneously select a plurality of menus by performing an operation as follows.

(1) The user selects a menu one by one while pressing a ctrl key. By performing this operation, menus selected while the ctrl key is being pressed are simultaneously selected.

(2) A start menu and an end menu are selected while a shift key is being pressed. By performing this operation, a menu lying between the start menu and the end menu is selected.

(3) Dragging is performed by using a mouse or a touch pad. By performing this operation, a menu in a drag region is selected.

PRIOR ART DOCUMENTS

Patent Documents

Patent Document 1: Japanese Patent Laying-Open No. 2004-5105
Patent Document 2: Japanese Patent Laying-Open No. 2004-5212
Patent Document 3: Japanese Patent Laying-Open No. 2004-234504
Patent Document 4: Japanese Patent Laying-Open No. 2000-339097

SUMMARY OF THE INVENTION

Problems to be Solved by the Invention

With a conventional electronic device, when the user selects a plurality of menus, the user had to perform an operation for switching an input mode to a simultaneous menu selection mode. Namely, the user had to perform a bothersome operation such as pressing of a ctrl key or a shift key on a keyboard.

The present invention was made to solve the above-described problems, and an object of the present invention is to provide an electronic device allowing a user to simultaneously select a plurality of menus with an intuitive operation.

Means for Solving the Problems

According to one aspect of the present invention, an electronic device is provided. The electronic device includes a storage portion for storing a plurality of menus, a multi-point-acceptable display-integrated tablet, a display control unit for causing the display-integrated tablet to display a display screen including the plurality of menus, an input processing unit for outputting an indicated position in accordance with an input while the input is provided to the display-integrated tablet, a selection unit for selecting the menus based on a plurality of simultaneously output indicated positions, and an output portion for outputting the selected menus.

Preferably, the selection unit selects the menus lying between the two simultaneously output indicated positions.

Further preferably, the selection unit selects the menus in a rectangle having the two simultaneously output indicated positions at vertices at respective opposite angles.

Further preferably, the selection unit selects the menus on a line segment having the two simultaneously output indicated positions at respective end points.

Further preferably, the storage portion stores timing of start of each input, the selection unit sequentially provides the selected menus with respective selection numbers from one end point to the other end point based on an order of the timing of start of the input corresponding to each end point, and the output portion outputs the menus based on the selection numbers.

Preferably, the storage portion stores timing of start of each input, and the selection unit selects the menus on a polygonal line formed by connecting the plurality of simultaneously output indicated positions in an order of the timing of start of the input corresponding to each indicated position.

Further preferably, the selection unit sequentially provides the selected menus with respective selection numbers from one end point of the polygonal line to the other end point of the polygonal line, and the output portion outputs the menus based on the selection numbers.

Preferably, the storage portion stores an order of display of each menu in the display screen, and the selection unit selects the plurality of menus having the menus corresponding to the two simultaneously input indicated position at respective opposing ends and having the consecutive order of display.

Further preferably, the selection unit provisionally selects one menu simultaneously designated by the plurality of indicated positions and selects the plurality of menus having the two provisionally selected menus at respective opposing ends and having the consecutive order of display.

Further preferably, the display control unit causes the display screen to scroll in accordance with continuous transition of the indicated position.

Further preferably, the output portion outputs the menus based on the order of display.

Preferably, the output portion includes a monitor.

Further preferably, the monitor is a photosensor built-in liquid crystal panel.

Preferably, the display-integrated tablet is a photosensor built-in liquid crystal panel.

According to another aspect of the present invention, a method of selecting a menu with an electronic device having a multi-point-acceptable display-integrated tablet is provided. The method of selecting a menu includes the steps of displaying a display screen including a plurality of menus on the display-integrated tablet, outputting an indicated position in accordance with an input while the input is provided to the display-integrated tablet, and selecting the menus based on a plurality of simultaneously output indicated positions.

According to yet another aspect of the present invention, a menu selection program for causing an electronic device having a multi-point-acceptable display-integrated tablet displaying a plurality of menus to select a menu is provided. The electronic device includes an input processing unit for outputting an indicated position in accordance with an input while the input is provided to the display-integrated tablet. The menu selection program includes the steps of causing the electronic device to determine whether the input processing unit is simultaneously outputting a plurality of indicated positions or not, and causing the electronic device to select menus from among the plurality of menus displayed on the display-integrated tablet based on the plurality of simultaneously output indicated positions when the electronic device has determined that the input processing unit is simultaneously outputting the plurality of indicated positions.

Effects of the Invention

When a display-integrated touch panel displaying a plurality of menus simultaneously accepts a plurality of inputs, an electronic device according to the present invention can select menus based on a plurality of simultaneously designated input positions. Consequently, according to the present invention, the user can simultaneously select a plurality of menus with an intuitive operation.

BRIEF DESCRIPTION OF THE DRAWINGS

FIG. 6 is a cross-sectional view showing how a photodiode receives light from a backlight in scanning.
FIG. 7 shows a schematic configuration of a command.
FIG. 8 illustrates a command of type "000".
FIG. 9 illustrates a command of type "001".
FIG. 10 illustrates a command of type "010".
FIG. 11 illustrates a command of type "011".
FIG. 12 illustrates a command of type "100".
FIG. 13 illustrates a command of type "101".

FIG. 31 is a diagram for illustrating menu selection according to a second embodiment.
FIG. 38 is a diagram for illustrating scrolling.

MODES FOR CARRYING OUT THE INVENTION

Figure 1:
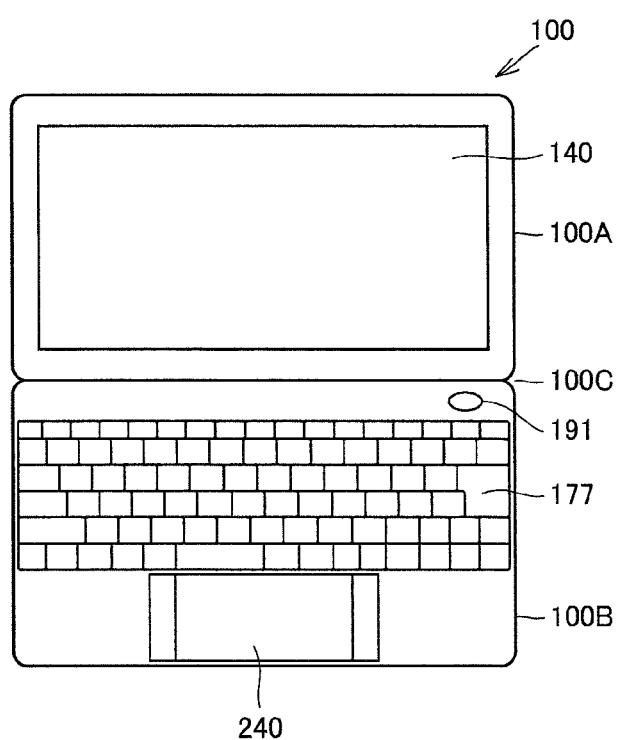
FIG. 1 is a schematic diagram showing appearance of an electronic device according to the present embodiment.

An embodiment of the present invention will be described hereinafter with reference to the drawings. In the description below, the same elements have the same reference characters allotted. Their label and function are also identical. Therefore, detailed description thereof will not be repeated.

First Embodiment

<Appearance of Electronic Device>

FIG. 1 shows appearance of an electronic device 100 of the present embodiment. Referring to FIG. 1, electronic device 100 includes a first casing 100A and a second casing 100B.

First casing 100A and second casing 100B are foldably connected to each other via a hinge 100C. First casing 100A includes a photosensor built-in liquid crystal panel 140. Second casing 100B includes a photosensor built-in liquid crystal panel 240. As such, electronic device 100 includes the two photo sensor built-in liquid crystal panels.

Electronic device 100 is configured as a mobile device having a display function, such as a PDA (Personal Digital Assistant), a notebook type personal computer, a mobile phone, or an electronic dictionary.

<As to Hardware Configuration>

Figure 2:
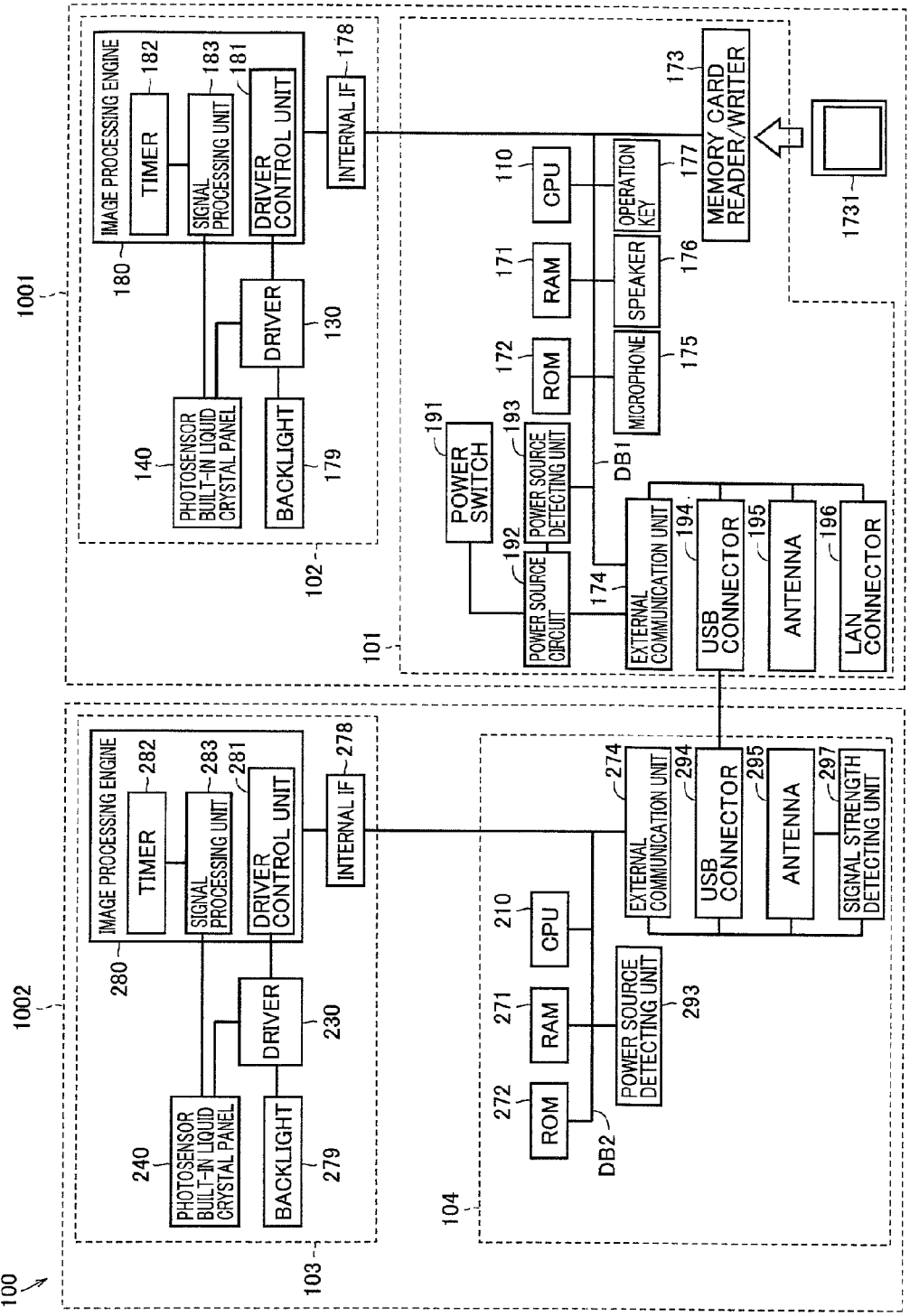
FIG. 2 is a block diagram showing a hardware configuration of the electronic device.

Next, referring to FIG. 2, one embodiment of a specific configuration of electronic device 100 will be described. FIG. 2 is a block diagram showing a hardware configuration of electronic device 100

Electronic device 100 includes a first unit 1001 and a second unit 1002. Second unit 1002 is connected to first unit 1001 so that it is detachable from electronic device 100. First unit 1001 includes a main device 101 and a display device 102. Second unit 1002 includes a display device 103 and a main device 104.

First casing 100A contains display device 102 therein. Second casing 100B contains main device 101 therein. Second casing 100B also contains second unit 1002 therein.

(As to First Unit)

Main device 101 includes a CPU (Central Processing Unit) 110, a RAM (Random Access Memory) 171, a ROM (Read-Only Memory) 172, a memory card reader/writer 173, an external communication unit 174, a microphone 175, a speaker 176, an operation key 177, a power switch 191, a power source circuit 192, a power source detecting unit 193, a USB (Universal Serial Bus) connector 194, an antenna 195, and a LAN (Local Area Network) connector 196. These components (110, 171-177, 193) are connected to one another via a data bus DB1. To memory card reader/writer 173, a memory card 1731 is inserted.

CPU 110 executes a program. Operation key 177 receives an instruction input from a user of electronic device 100. RAM 171 stores therein data generated by execution of a program by CPU 110 or input data provided via operation key 177, in a volatile manner. ROM 172 stores data therein in a nonvolatile manner. ROM 172 is a ROM in and from which data can be written and deleted, such as an EPROM (Erasable Programmable Read-Only Memory) or a flash memory.

External communication unit 174 communicates with another electronic device. Specifically, external communication unit 174 communicates with for example second unit 1002 via USB connector 194. Further, external communication unit 174 wirelessly communicates with for example second unit 1002 via antenna 195. Further, external communication unit 174 communicates with other electronic devices via LAN connector 196 in a wired manner.

Main device 101 may communicate with other electronic devices through wireless communication other than Bluetooth®. For example, external communication unit 174 may wirelessly communicate with another electronic device connected to the LAN, via a wireless LAN antenna not shown in the figure. Alternatively, external communication unit 174 may wirelessly communicate with another electronic device via an infrared port not shown in the figure.

Power switch 191 is a switch for launching electronic device 100.

When power switch 191 is turned on, power source circuit 192 supplies power via power source detecting unit 193 to the components and display device 102 each of which is connected to data bus DB1. Further, when power switch 191 is turned on, power source circuit 192 supplies power to external communication unit 174 not via power source detecting unit 193.

Power source detecting unit 193 detects an output from power source circuit 192. Further, power source detecting unit 193 sends information concerned with the detected output (for example, a voltage value or a current value) to CPU 110.

USB connector 194 is used to connect first unit 1001 to second unit 1002. It should be noted that main device 101 may include another USB connector in addition to USB connector 194.

First unit 1001 transmits data to second unit 1002 via USB connector 194. Further, first unit 1001 receives data from second unit 1002 via USB connector 194. Furthermore, first unit 1001 supplies power to second unit 1002 via USB connector 194.

Antenna 195 is used for communication between first unit 1001 and other communication devices (for example, second unit 1002) in compliance with the Bluetooth® standard. LAN connector 196 is used to connect electronic device 100 to the LAN.

Display device 102 includes a driver 130, photosensor built-in liquid crystal panel 140 (hereinafter, referred to as liquid crystal panel 140), an internal IF 178, a backlight 179, and an image processing engine 180.

Driver 130 is a driving circuit for driving liquid crystal panel 140 and backlight 179. Various driving circuits in driver 130 will be described later.

Liquid crystal panel 140 is a device including a function of a liquid crystal display and a function of a photosensor. In other words, liquid crystal panel 140 is capable of displaying an image using liquid crystal, and sensing using a photosensor. Details of liquid crystal panel 140 will be described later.

Internal IF (Interface) 178 interfaces exchanges of data between main device 101 and display device 102.

Backlight 179 is a light source provided at the back surface of liquid crystal panel 140. Backlight 179 emits uniform light to the back surface.

Image processing engine 180 controls operations of liquid crystal panel 140 via driver 130. This control is performed based on various types of data sent from main device 101 via internal IF 178. The various types of data include below-described commands. Further, image processing engine 180 processes data output from liquid crystal panel 140, and sends the processed data to main device 101 via internal IF 178. Further, image processing engine 180 includes a driver control unit 181, a timer 182, and a signal processing unit 183.

Driver control unit 181 sends a control signal to driver 130 to control operations of driver 130. Further, driver control unit 181 analyzes a command sent from main device 101. Further, driver control unit 181 sends to driver 130 a control signal that is based on a result of the analysis. Details of the operations of driver 130 will be described later.

Timer 182 generates time information and sends the time information to signal processing unit 183.

Signal processing unit 183 receives data output from the photosensor. The data thus output from the photosensor is analog data, and therefore signal processing unit 183 first converts the analog data into digital data. Then, signal processing unit 183 subjects the digital data to data processing corresponding to the content of a command sent from main device 101. Then, signal processing unit 183 sends to main device 101 data including the data (hereinafter, referred to as response data) having been subjected to the data processing and the time information obtained from timer 182. Further, signal processing unit 183 includes a RAM (not shown) capable of sequentially storing therein a plurality of pieces of scan data described below.

Figure 14:
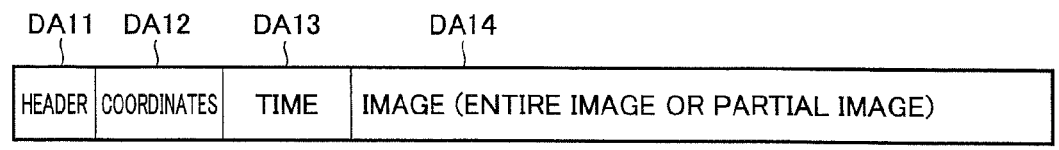
FIG. 14 shows a schematic configuration of response data.

The commands include a sensing command for instructing the photosensor to perform sensing. Details of the sensing command and the response data will be described later (FIG. 7, FIG. 8, and FIG. 14).

It should be noted that timer 182 does not need to be necessarily provided in image processing engine 180. For example, timer 182 may be provided outside image processing engine 180 in display device 102. Alternatively, timer 182 may be provided in main device 101. Further, microphone 175 and speaker 176 do not need to be always provided in electronic device 100. In some embodiments of electronic device 100, one or both of microphone 175 and speaker 176 may not be provided.

Here, display device 102 includes a system LCD. The system LCD is a device obtained by forming peripheral devices of liquid crystal panel 140 in one piece on a glass substrate of liquid crystal panel 140. In the present embodiment, driver 130 (excluding a circuit for driving backlight 179), internal IF 178, and image processing engine 180 are formed in one piece on the glass substrate of liquid crystal panel 140. It should be noted that display device 102 does not need to be configured to use the system LCD, and driver 130 (excluding the circuit for driving backlight 179), internal IF 178, and image processing engine 180 may be provided on a substrate other than the glass substrate.

(As to Second Unit)

Second unit 1002 is supplied with power from first unit 1001. Specifically, by connecting a below-described USB connector 294 to USB connector 194 of first unit 1001, second unit 1002 is supplied with power from power source circuit 192 of first unit 1001.

Main device 104 includes a CPU 210, a RAM 271, a ROM 272, an external communication unit 274, a power source detecting unit 293, USB connector 294, an antenna 295, and a signal strength detecting unit 297. The components (210, 271, 272, 274, 293) are connected to one another via a data bus DB2.

CPU 210 executes a program. RAM 271 stores therein data generated by execution of the program by CPU 210, in a volatile manner. ROM 272 stores data therein in a nonvolatile manner. Further, ROM 272 is a ROM in and from which data can be written and deleted, such as an EPROM (Erasable Programmable Read-Only Memory) or a flash memory.

External communication unit 274 communicates with another electronic device. Specifically, external communication unit 274 communicates with for example first unit 1001 via USB connector 294. Further, external communication unit 274 communicates with for example first unit 1001 via antenna 295.

It should be noted that main device 104 may communicate with another electronic device (for example, first unit 1001) through wireless communication other than Bluetooth®. For example, external communication unit 274 may wirelessly communicate with another electronic device via an infrared port not shown in the figure.

Signal strength detecting unit 297 detects the strength of a signal received via antenna 295. Further, signal strength detecting unit 297 informs external communication unit 274 of the strength thus detected.

USB connector 294 is used to connect second unit 1002 to first unit 1001.

Second unit 1002 transmits data to first unit 1001 via USB connector 294. Further, second unit 1002 receives data from first unit 1001 via USB connector 294. Furthermore, second unit 1002 is supplied with power from first unit 1001 via USB connector 294 as described above. It should be noted that second unit 1002 stores, in a battery not shown in the figure, the power thus supplied from first unit 1001.

Antenna 295 is used for communication between second unit 1002 and for example first unit 1001, in compliance with the Bluetooth® standard.

Power source detecting unit 293 detects the power supplied via USB connector 294. Further, power source detecting unit 293 sends information concerned with the detected power, to CPU 210.

Further, main device 104 may have a function of infrared communication.

Display device 103 includes a driver 230, photosensor built-in liquid crystal panel 240 (hereinafter, referred to as "liquid crystal panel 240"), an internal IF 278, a backlight 279, and an image processing engine 280. Image processing engine 280 includes a driver control unit 281, a timer 282, and a signal processing unit 283.

Display device 103 has a configuration similar to that of display device 102. Namely, driver 230, liquid crystal panel 240, internal IF 278, backlight 279, and image processing engine 280 respectively have the same configurations as those of driver 130, liquid crystal panel 140, internal IF 178, backlight 179, and image processing engine 180 of display device 102. Driver control unit 281, timer 282, and signal processing unit 283 respectively have the same configurations as those of driver control unit 181, timer 182, and signal processing unit 183 of display device 102. Hence, explanation is not repeated for each functional block in display device 103.

Meanwhile, the processes in electronic device 100 are implemented by hardware and software executed by CPU 110. Such software may be stored in ROM 172 in advance. Alternatively, the software may be stored in memory card 1731 or another storage medium and may be distributed as a program product. Alternatively, the software may be provided as a downloadable program product by an information providing business entity connected to what is called the Internet. Such software is read from the storage medium by memory card reader/writer 173 or another reader, or is downloaded via communication unit 174 or a communication IF (not shown), and is then temporarily stored in ROM 172. The software is read from ROM 172 by CPU 110, and is then stored in RAM 171 in the form of an executable program. CPU 110 executes the program.

Each component constituting main device 101 of electronic device 100 shown in FIG. 2 is a general one. Hence, it can be said that an essential part of the present invention lies in the software stored in RAM 171, ROM 172, memory card 1731, and other storage media, or the software downloadable via the network. It should be noted that the operations of the hardware of main device 101 of electronic device 100 are well known and are not described repeatedly in detail.

It should also be noted that the storage medium is not limited to a memory card, but may be a medium storing a program in a fixed manner such as a CD-ROM, an FD (Flexible Disk), a hard disk, a magnetic tape, a cassette tape, an optical disk (MO (Magnetic Optical Disc)/MD (Mini Disc)/

DVD (Digital Versatile Disc)), an IC (Integrated Circuit) card (excluding a memory card), an optical card, and a semiconductor memory such as a mask ROM, an EPROM, an EEPROM (Electronically Erasable Programmable Read-Only Memory), and a flash ROM.

The program herein includes not only a program directly executable by the CPU, but also a program in the form of a source program, a compressed program, an encrypted program, and the like.

<As to Configuration and Driving of Photosensor Built-in Liquid Crystal Panel>

Figure 3:
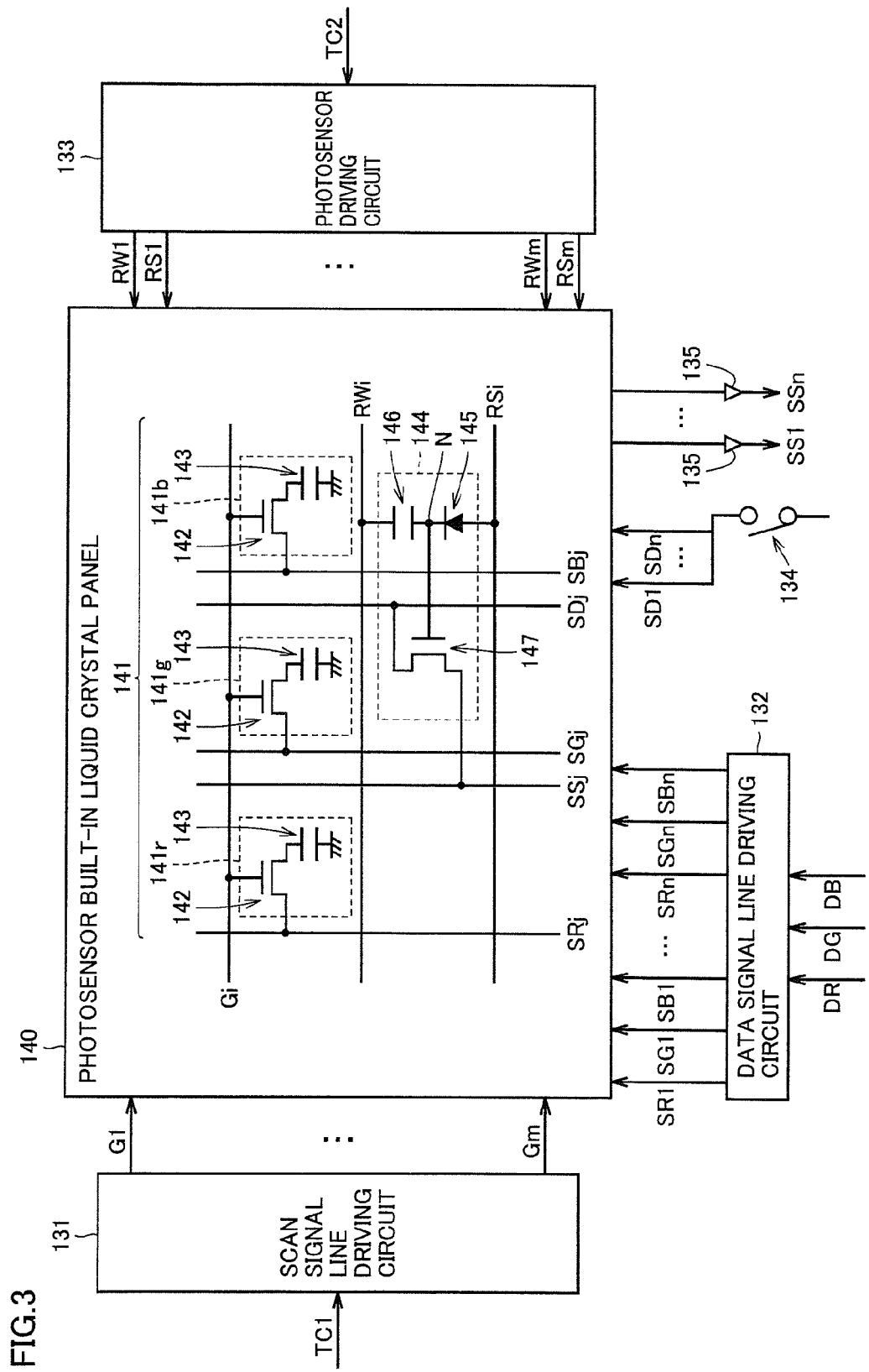
FIG. 3 shows a configuration of a liquid crystal panel and peripheral circuits of the liquid crystal panel.

The following describes the configuration of liquid crystal panel 140 and configurations of circuits around liquid crystal panel 140. FIG. 3 shows the configuration of liquid crystal panel 140 and the circuits around liquid crystal panel 140.

Referring to FIG. 3, liquid crystal panel 140 includes a pixel circuit 141, a photosensor circuit 144, scanning signal lines Gi, data signal lines SRj, data signal lines SGj, data signal lines SBj, sensor signal lines SSj, sensor signal lines SDj, read signal lines RWi, and reset signal lines RSi. It should be noted that i represents a natural number satisfying 1≤i≤m whereas j represents a natural number satisfying 1≤j≤n.

Further, driver 130 of display device 102 shown in FIG. 2 includes a scan signal line driving circuit 131, a data signal line driving circuit 132, a photosensor driving circuit 133, a switch 134, and amplifiers 135, all of which are the circuits around liquid crystal panel 140.

Scan signal line driving circuit 131 receives a control signal TC1 from driver control unit 181 shown in FIG. 2. Based on control signal TC1, scan signal line driving circuit 131 applies a predetermined voltage to the scanning signal lines (G1-Gm) one after another in an order from scanning signal line G1. More specifically, scan signal line driving circuit 131 sequentially selects one of the scanning signal lines (G1-Gm) every unit time, and applies to the selected scanning signal line a voltage (hereinafter, referred to as a high-level voltage) sufficient to turn on the gate of a TFT (Thin Film Transistor) 142 which will be described later. It should be noted that the scanning signal lines not selected are not fed with the high-level voltage but remains fed with a low-level voltage.

Data signal line driving circuit 132 receives image data (DR, DG, DB) from driver control unit 181 shown in FIG. 2. Then, data signal line driving circuit 132 sequentially applies a voltage corresponding to image data for one row to each of 3n data signal lines (SR1-SRn, SG1-SGn, SB1-SBn) every unit time described above.

It should be noted that, in the description herein, a driving method called line sequential method is employed, however, the driving method is not limited to this.

Each of pixel circuits 141 is a circuit for setting a luminance (transmittance) of one pixel. Further, m×n pixel circuits 141 are arranged in matrix. More specifically, m pixel circuits 141 are arranged in the vertical direction of FIG. 3 and n pixel circuits 141 are arranged in the horizontal direction.

Each of pixel circuits 141 is constituted of an R sub pixel circuit 141r, a G sub pixel circuit 141g, and a B sub pixel circuit 141b. Each of the three circuits (141r, 141g, 141b) includes TFT 142, an electrode pair 143 made up of a pixel electrode and a counter electrode, and a capacitor not shown in the figure.

In display device 102, a polycrystalline silicon thin film transistor (p-Si TFT) is used as TFT 142 because the polycrystalline silicon thin film transistor allows for realization of a CMOS (Complementary Metal Oxide Semiconductor) with an n-type transistor and a p-type transistor and the polycrystalline silicon thin film transistor allows carriers (electrons or holes) to move several hundred times faster than in an amorphous silicon thin film transistor (a-Si TFT). It is assumed herein that TFT 142 is a field effect transistor with an n-type channel, however, TFT 142 may be a field effect transistor with a p-type channel.

TFT 142 in R sub pixel circuit 141r has a source connected to data signal line SRj. Further, TFT 142 has a gate connected to scanning signal line Gi. Furthermore, TFT 142 has a drain connected to the pixel electrode of electrode pair 143. Between the pixel electrode and the counter electrode, liquid crystal is provided. It should be noted that each of G sub pixel circuit 141g and B sub pixel circuit 141b has the same configuration as that of R sub pixel circuit 141r except that TFT 142 of each of them has a source connected to a different data signal line. Hence, explanation is not repeated for these two circuits (141g, 141b).

Now, how luminance is set in pixel circuit 141 will be described. First, the above-described high-level voltage is applied to scanning signal line Gi. The application of the high-level voltage turns on the gate of TFT 142. While the gate of TFT 142 is on, designated voltages (voltages corresponding to image data for one pixel) are respectively applied to the data signal lines (SRj, SGj, SBj). In this way, a voltage based on the designated voltages is applied to the pixel electrode. This results in a potential difference between the pixel electrode and the counter electrode. Based on the potential difference, the liquid crystal responds to set the luminance of the pixel to a predetermined luminance. The potential difference is maintained until scanning signal line Gi is selected in a next frame period by the capacitor (auxiliary capacitor) not shown in the figure.

Photosensor driving circuit 133 receives a control signal TC2 from driver control unit 181 shown in FIG. 2.

Based on control signal TC2, photosensor driving circuit 133 sequentially selects one signal line of the reset signal lines (RS1-RSm) every unit time, and applies to the selected signal line a voltage VDDR that has a level higher than that of a usual one, at a predetermined timing. It should be noted that reset signal lines not selected remain fed with a voltage VSSR lower than the voltage applied to the selected reset signal line. For example, voltage VDDR may be set to 0 V whereas voltage VSSR may be set to −5 V.

In addition, based on control signal TC2, photosensor driving circuit 133 sequentially selects one signal line of the read signal lines (RW1-RWm) every unit time, and applies to the selected signal line a voltage VDD that has a level higher than that of a usual one, at a predetermined timing. It should be noted that read signal lines not selected remain fed with voltage VSSR described above. The value of VDD may be set, for example, to 8 V.

The timing at which voltage VDDR is applied and the timing at which voltage VDD is applied will be described later.

Photosensor circuit 144 includes a photodiode 145, a capacitor 146, and a TFT 147. In the description below, it is assumed that TFT 147 is a field effect transistor with an n-type channel, however, TFT 147 may be a field effect transistor with a p-type channel.

Photodiode 145 has an anode connected to reset signal line RSi. Photodiode 145 has a cathode connected to one electrode of capacitor 146. The other electrode of capacitor 146 is connected to read signal line RWi. In the description below, a connection point of photodiode 145 and capacitor 146 is referred to as node N.

TFT 147 has a gate connected to node N. TFT 147 has a drain connected to sensor signal line SDj. TFT 147 has a source connected to sensor signal line SSj. Details of sensing using photosensor circuit 144 will be described later.

Switch 134 is provided for switching as to whether to apply a predetermined voltage to each of the sensor signal lines (SD1-SDn) or not to apply the predetermined voltage thereto. The switching operation of switch 134 is caused by photosensor driving circuit 133. The voltage applied to each of the sensor signal lines (SD1-SDn) when switch 134 is brought into a conductive state will be described later.

Amplifiers 135 amplify respective voltages output from the sensor signal lines (SS1-SSn). Each of the voltages thus amplified is sent to signal processing unit 183 shown in FIG. 2.

It should be noted that image processing engine 180 controls the timing at which an image is displayed on liquid crystal panel 140 using pixel circuit 141 and the timing at which sensing is performed using photosensor circuit 144.

Figure 4:
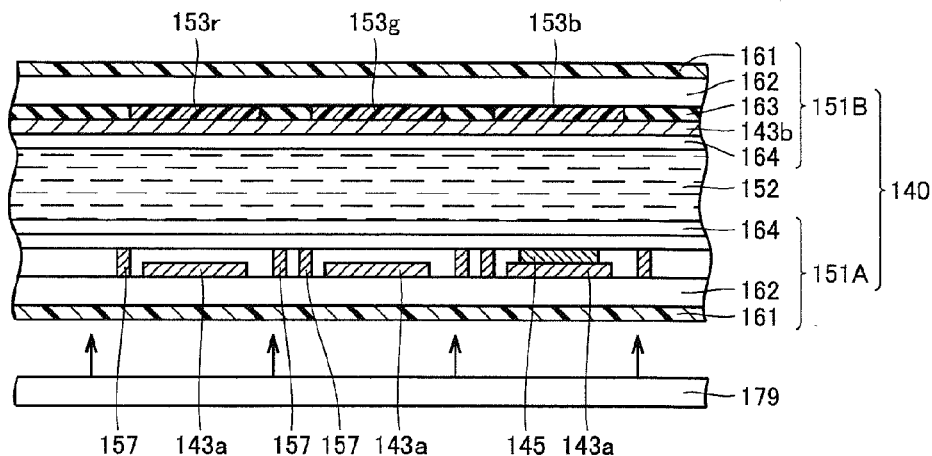
FIG. 4 is a cross-sectional view of the liquid crystal panel and a backlight.

FIG. 4 is a cross-sectional view of liquid crystal panel 140 and backlight 179. Referring to FIG. 4, liquid crystal panel 140 includes an active matrix substrate 151A, a counter substrate 151B, and a liquid crystal layer 152. Counter substrate 151B is provided opposite to active matrix substrate 151A. Liquid crystal layer 152 is interposed between active matrix substrate 151A and counter substrate 151B. Backlight 179 is provided on a side opposite to liquid crystal layer 152 so as to face active matrix substrate 151A.

Active matrix substrate 151A includes a polarizing filter 161, a glass substrate 162, pixel electrodes 143a constituting electrode pairs 143, photodiode 145, data signal lines 157, and an alignment film 164. Although not shown in FIG. 4, active matrix substrate 151A further includes capacitor 146, TFTs 147, TFTs 142, and scanning signal lines Gi, each of which is shown in FIG. 3.

In active matrix substrate 151A, polarizing filter 161, glass substrate 162, pixel electrodes 143a, and alignment film 164 are arranged in this order from the backlight 179 side thereof. Photodiode 145 and data signal lines 157 are formed on the liquid crystal layer 152 side of glass substrate 162.

Counter substrate 151B includes polarizing filter 161, glass substrate 162, a light shielding film 163, color filters (153r, 153g, 153b), counter electrode 143b constituting electrode pairs 143, and alignment film 164.

In counter substrate 151B, alignment film 164, counter electrode 143b, the color filters (153r, 153g, 153b), glass substrate 162, and polarizing filter 161 are arranged in this order from the liquid crystal layer 152 side thereof. Light shielding film 163 is formed in the same layer where the color filters (153r, 153g, 153b) are provided.

Color filter 153r is a filter allowing light in a wavelength of red to pass therethrough. Color filter 153g is a filter allowing light in a wavelength of green to pass therethrough. Color filter 153b is a filter to allow light in a wavelength of blue to pass therethrough. Here, photodiode 145 is provided at a position opposite to color filter 153b.

Liquid crystal panel 140 displays an image by shielding and passing the external light and light emitted from a light source such as backlight 179. Specifically, by applying a voltage between each pixel electrode 143a and each counter electrode 143b, orientations of liquid crystal molecules in liquid crystal layer 152 are changed in liquid crystal panel 140, thereby blocking or passing the light. However, the light cannot completely be blocked only by the liquid crystal, and therefore polarizing filter 161 is provided to allow only light having a specific polarization direction to pass therethrough.

It should be noted that the position of photodiode 145 is not limited to the position described above and photodiode 145 may be provided at a position opposite to color filter 153r or a position opposite to color filter 153g.

Figure 5:
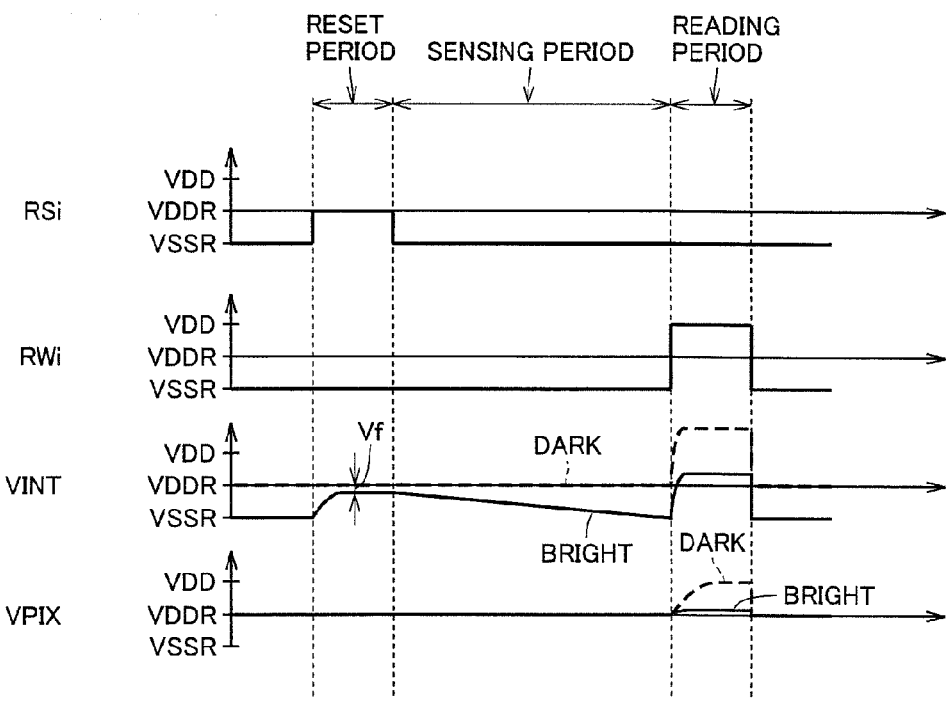
FIG. 5 shows a timing chart in operating a photosensor circuit.

Here, operations of photosensor circuit 144 will be described. FIG. 5 shows a timing chart in operating photosensor circuit 144. In FIG. 5, a voltage VINT is a potential at node N in photosensor circuit 144. A voltage VPIX is an output voltage of each sensor signal line SSj shown in FIG. 3 before being amplified by amplifier 135.

The following individually describes a reset period for resetting photosensor circuit 144, a sensing period for sensing light using photosensor circuit 144, and a reading period for reading a result of the sensing.

First explained is the reset period. In the reset period, the voltage applied to reset signal line RSi is momentarily switched from the low level (voltage VSSR) to the high level (voltage VDDR). Meanwhile, the voltage applied to read signal line RWi remains at the low level (voltage VSSR). By applying the high-level voltage to reset signal line RSi in this way, a current starts to flow in the forward direction of photodiode 145 (from the anode side to the cathode side). Accordingly, voltage VINT, which is the potential of node N, has a value found by a below-described formula (1). It should be noted that in formula (1), an amount of decrease in voltage in the forward direction of photodiode 145 is denoted as Vf.

$$VINT = VSSR + |VDDR - VSSR| - Vf \qquad (1)$$

Hence, the potential of node N has a value smaller than voltage VDDR by Vf as shown in FIG. 5.

Here, voltage VINT is not higher than the threshold of turning on the gate of TFT 147, and therefore no output is provided from sensor signal line SSj. Hence, voltage VPIX is not changed. Further, there is a difference between the electrodes of capacitor 146 by voltage VINT described above. Accordingly, charges corresponding to the difference are stored in capacitor 146.

Explained next is the sensing period. In the sensing period following the reset period, the voltage applied to reset signal line RSi is momentarily switched from the high level (voltage VDDR) to the low level (voltage VSSR). Meanwhile, the voltage applied to read signal line RWi remains at the low level (voltage VSSR).

By changing the voltage applied to reset signal line RSi to the low level as such, the potential of node N is higher than the voltage of reset signal line RSi and the voltage of read signal line RWi. Hence, in photodiode 145, the voltage on the cathode side is higher than the voltage on the anode side. Namely, photodiode 145 is in a reverse-biased state. When photodiode 145 receives light from the light source in such a reverse-biased state, a current starts to flow from the cathode side of photodiode 145 to the anode side thereof. As a result, as shown in FIG. 5, the potential of node N (i.e., voltage VINT) is decreased with lapse of time.

Since voltage VINT keeps decreasing as such, the gate of TFT 147 is not turned on. Hence, there is no output from sensor signal line SSj. Accordingly, voltage VPIX is not changed.

Explained next is the reading period. In the reading period following the sensing period, the voltage applied to reset signal line RSi is maintained at the low level (voltage VSSR). Meanwhile, the voltage applied to read signal line RWi is momentarily switched from the low level (voltage VSSR) to the high level (voltage VDD). Here, voltage VDD has a value higher than that of voltage VDDR.

By momentarily applying the high-level voltage to read signal line RWi in this way, the potential of node N is raised through capacitor 146 as shown in FIG. 5. Magnitude of rise of the potential of node N corresponds to the voltage applied to read signal line RWi. Here, the potential of node N (i.e., voltage VINT) is raised to be equal to or higher than the threshold of turning on the gate of TFT 147, whereby the gate of TFT 147 is turned on.

Here, if a fixed voltage is applied in advance to sensor signal line SDj (see FIG. 3) connected to the drain side of TFT 147, a voltage corresponding to the potential of node N is output from sensor signal line SSj connected to the source side of TFT 147 as shown in a graph of VPIX in FIG. 5.

Here, when an amount of light received by photodiode 145 (hereinafter, referred to as amount of received light) is small, the slope of the straight line shown in the graph of VINT in FIG. 5 is gentle. As a result, voltage VPIX is higher than that when the amount of received light is large. As such, photosensor circuit 144 varies the value of the voltage to be output to sensor signal line SSj, in accordance with the amount of light received by photodiode 145.

The description above deals with the operations of photosensor circuit 144 of the m×n photosensor circuits. In the description below, operations of the photosensor circuits in liquid crystal panel 140 will be described.

First, photosensor driving circuit 133 applies a predetermined voltage to all the n sensor signal lines (SD1-SDn). Then, photosensor driving circuit 133 applies to reset signal line RS1 voltage VDDR having a level higher than that of a usual one. Other reset signal lines (RS2-RSm) and read signal lines (RW1-RWm) remain fed with the low-level voltage. In this way, n photosensor circuits in the first row in FIG. 3 enter the above-described reset period. Thereafter, the n photosensor circuits in the first row enter the sensing period. Then, the n photosensor circuits in the first row enter the reading period.

It should be noted that the timing of applying the predetermined voltage to all the n sensor signal lines (SD1-SDn) is not limited to the above-described timing, and may be any timing at least before the reading period.

When the reading period of the n photosensor circuits in the first row ends, photosensor driving circuit 133 applies to reset signal line RS2 voltage VDDR having a level higher than a usual one. In other words, n photosensor circuits in the second row enter the reset period. When the reset period thereof ends, the n photosensor circuits in the second row enter the sensing period and then enter the reading period.

Thereafter, the above-described processes are performed onto n photosensor circuits in the third row, n photosensor circuits in the fourth row, . . . , and n photosensor circuits in the mth row, in this order. As a result, from the sensor signal lines (SS1-SSn), a sensing result for the first row, a sensing result for the second row, . . . , and a sensing result for the mth row are output in this order.

As such, in display device 102, sensing is performed for each row as described above, and a sensing result for each row is output from liquid crystal panel 140. Hence, in the description below, the data concerned with the voltages for m rows in total from the first row to the mth row output from liquid crystal panel 140 and having been subjected to the above-described data processing by signal processing unit 183 is referred to as "scan data". In other words, the scan data refers to image data obtained by scanning a scan target object (for example, the user's finger). Further, an image displayed based on the scan data is referred to as "scan image". Furthermore, in the description below, the sensing is referred to as "scan (scanning)".

Further, the configuration in which the m×n photosensor circuits are all used for scanning has been exemplified in the above, however, the present invention is not limited to this. A configuration may be employed in which a partial region of the surface of liquid crystal panel 140 is scanned using photosensor circuits selected in advance.

In the description below, it is assumed that electronic device 100 can adopt either of the configurations. The configurations can be changed over in accordance with a command that is based on an input or the like provided via operation key 177 and sent from main device 101. In the case where a partial region of the surface of liquid crystal panel 140 is to be scanned, image processing engine 180 sets a region to be scanned. The region to be scanned may be set and designated by the user via operation key 177.

In the case where the partial region of the surface of liquid crystal panel 140 is to be scanned, the following manners of utilization thereof are available in displaying an image. The first one is to display an image in a region in the surface other than the partial region above (hereinafter, referred to as "scan region"). The second one is to display no image in the region of the surface other than the scan region. Adoption of the manners depends on a command sent from main device 101 to image processing engine 180.

FIG. 6 is a cross-sectional view of liquid crystal panel 140 and backlight 179, showing how photodiode 145 receives light from backlight 179 in scanning.

Referring to FIG. 6, when the user's finger 900 touches the surface of liquid crystal panel 140, a part of light emitted from backlight 179 is reflected by the user's finger 900 (substantially flat surface) at the touched region. The light thus reflected is received by photodiode 145.

Further, even in a region not touched by finger 900, a part of the light emitted from backlight 179 is reflected by the user's finger 900. In this case as well, photodiode 145 receives the light thus reflected. However, since finger 900 does not touch the surface of liquid crystal panel 140 in the region, an amount of the light received by photodiode 145 is smaller than that in the region touched by finger 900. It should be noted that most of light emitted from backlight 179 but failing to reach the user's finger 900 cannot be received by photodiode 145.

Here, by lighting on backlight 179 at least during the sensing period, photosensor circuit 144 can output a voltage corresponding to the amount of light reflected by the user's finger 900, from sensor signal line SSj. As such, by controlling backlight 179 to light on and light off, the voltage output from each of the sensor signal lines (SS1 to SSn) is varied in liquid crystal panel 140 in accordance with the position touched by finger 900, a range touched by finger 900 (determined by pressing force of finger 900), a direction of finger 900 relative to the surface of liquid crystal panel 140, and the like.

In this way, display device 102 is capable of scanning an image (hereinafter, also referred to as reflection image) obtained by reflection of the light by finger 900.

It should be noted that an exemplary scan target object other than finger 900 is a stylus or the like.

It should also be noted that, in the present embodiment, the liquid crystal panel is illustrated as an exemplary display device of electronic device 100, however, other panels such as an organic EL (Electro-Luminescence) panel may be used instead of the liquid crystal panel.

<As to Data>

The following describes commands exchanged between first unit 1001 and second unit 1002, and commands exchanged between main device 101 and display device 102 in first unit 1001.

FIG. 7 shows a schematic configuration of a command. Referring to FIG. 7, the command includes a header DA01, a first field DA02, a second field DA03, a third field DA04, a fourth field DA05, a fifth field DA06, and a reserve data region DA07.

FIG. 8 illustrates a command of type "000" (i.e., sensing command). CPU 110 transmits the command of type "000" (hereinafter, referred to as "first command") from main device 101 of first unit 1001 to second unit 1002. Alternatively, CPU 110 transmits the first command from main device 101 to display device 102. The description below shows an exemplary case where CPU 110 transmits the first command from main device 101 of first unit 1001 to second unit 1002.

CPU 110 writes, in header DA01, the type ("000") of the command, a destination of transmission of the command, and the like. CPU 110 writes, in first field DA02, a value of timing corresponding to a number "1". CPU 110 writes, in second field DA03, a value of a data type corresponding to a number "2". CPU 110 writes, in third field DA04, a value of a scanning method corresponding to a number "3". CPU 110 writes, in fourth field DA05, a value of image gradation corresponding to a number "4". CPU 110 writes, in fifth field DA06, a value of resolution corresponding to a number "5".

A first command having first field DA02 set to "00" requests image processing engine 280 to transmit scan data obtained at the moment. Specifically, the sensing first command requests transmission of scan data obtained by scanning using the photosensor circuits of liquid crystal panel 240 after image processing engine 280 receives the first command. A first command having first field DA02 set to "01" requests transmission of scan data obtained when there is a change in scan result. A first command having first field DA02 set to "10" requests transmission of scan data every fixed cycle.

A first command having second field DA03 set to "001" requests transmission of coordinate values of the center coordinates of a partial image. A first command having second field DA03 set to "010" requests transmission only of a partial image changed in scan result. It should be noted that change in scan result refers to difference between the previous scan result and the current scan result. A first command having second field DA03 set to "100" requests transmission of an entire image.

The "entire image" herein refers to an image generated by image processing engine 280 based on the output voltage of each photosensor circuit in scanning with the m×n photosensor circuits. On the other hand, the "partial image" herein refers to a portion of the entire image. Regarding the partial image, a reason for requesting the transmission of only the partial image changed in scan result will be described later.

Further, the coordinate values and the partial image or the entire image may simultaneously be requested. Furthermore, in the case where the partial region of the surface of liquid crystal panel 240 is scanned, the entire image is an image corresponding to the scanned region.

Figure 17:
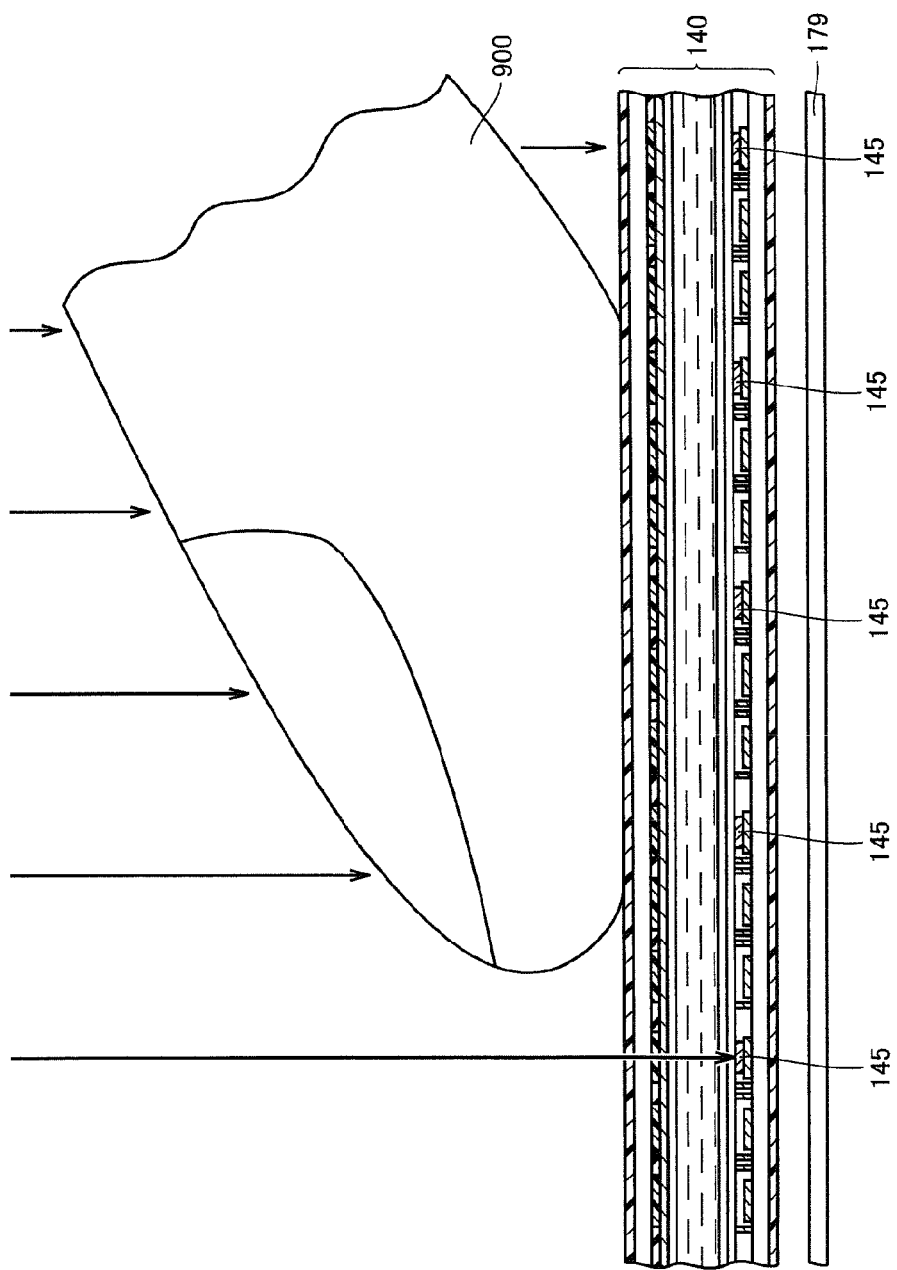
FIG. 17 is a cross-sectional view showing how the photodiode receives external light in scanning.

A sensing first command having third field DA04 set to "00" requests scan with backlight 279 lit on. On the other hand, a first command having third field DA04 set to "01" requests to scan with backlight 279 lit off. A configuration of scanning with backlight 279 lit off will be described later (FIG. 17). A first command having third field DA04 set to "10" requests scanning with both reflection and transmission of light. Scanning with both reflection and transmission of light refers to scanning of a scan target object by switching between the method of scanning with backlight 279 lit on and the method of scanning with the backlight lit off.

A first command having fourth field DA05 set to "00" requests binary image data of black or white. A first command having fourth field DA05 set to "01" requests image data of multiple gradation. A first command having fourth field DA05 set to "10" requests image data of RGB colors.

A first command having fifth field DA06 set to "0" requests image data having a high resolution. A first command having fifth field DA06 set to "1" requests image data having a low resolution.

Also described in the first command in addition to the data shown in FIG. 8 are designation of a region to be scanned (region of pixels in which photosensor circuits 144 are to be driven), a timing of scanning, a timing of lighting on backlight 179, and the like.

Image processing engine 280 analyzes the content of the first command, and returns to main device 101 data generated in accordance with a result of the analysis (i.e., response data).

FIG. 9 illustrates a command of type "001" (hereinafter, referred to as "second command"). CPU 110 sends the second command from main device 101 of first unit 1001 to second unit 1002.

CPU 110 writes, in header DA01, the type ("001") of the command, a destination of transmission of the command, and the like. CPU 110 writes, in first field DA02, a value of display request corresponding to a number "1". CPU 110 writes, in second field DA03, information regarding the number/kind and corresponding to a number "2". CPU 110 writes, in third field DA04, a value of a range of display corresponding to a number "3". CPU 110 writes, in fourth field DA05, information regarding image data and corresponding to a number "4".

A second command having first field DA02 set to "001" requests image processing engine 280 to display an image on liquid crystal panel 240 (sub screen). A second command having first field DA02 set to "010" requests image processing engine 280 to display an icon on liquid crystal panel 240. A second command having first field DA02 set to "011" requests image processing engine 280 to display a handwriting region on liquid crystal panel 240.

Stored in second field DA03 is the number of images to be displayed on liquid crystal panel 240, and a number designating a kind of language used in handwriting. Image processing engine 280 performs processing in accordance with the number of the images and the kind of language.

A second command having third field DA04 set to "01" requests image processing engine 280 to designate the range of display in liquid crystal panel 240 using coordinates. A second command having third field DA04 set to "10" requests image processing engine 280 to set the entire display region as the range of display in liquid crystal panel 240.

Stored in fourth field DA05 are image data to be displayed on liquid crystal panel 240 and information on a position where the image data is to be displayed. Image processing engine 280 performs processing to display the image data at a position specified by the position information.

FIG. 10 illustrates a command of type "010" (hereinafter, referred to as "third command"). CPU 110 sends the third command from main device 101 of first unit 1001 to second unit 1002. Alternatively, CPU 210 sends the third command from main device 104 of second unit 1002 to first unit 1001.

CPU 110 or 210 writes, in header DA01, a type ("010") of the command, a destination of the transmission of the command, and the like. CPU 110 or 210 writes, in first field DA02, a value of OS (Operating System) processing request corresponding to a number "1". CPU 110 or 210 writes, in second field DA03, a value of OS information corresponding to a number "2".

A third command having first field DA02 set to "01" or "10" is transmitted from second unit 1002 to first unit 1001.

The third command having first field DA02 set to "01" requests first unit 1001 to transmit information indicating a type of an OS employed in first unit 1001 (main device). The third command having first field DA02 set to "10" requests first unit 1001 to launch the OS designated by the OS information.

A third command having second field DA03 set to "000", "001", or "010" is transmitted from second unit 1002 to first unit 1001.

The third command having second field DA03 set to "000" does not request first unit 1001 to launch an OS. The third command having second field DA03 set to "001" indicates that second unit 1002 has selected to launch a first OS. The third command having second field DA03 set to "010" indicates that second unit 1002 has selected to launch a second OS.

FIG. 11 illustrates a command of type "011" (hereinafter, referred to as "fourth command"). CPU 210 sends the fourth command from main device 104 of second unit 1002 to first unit 1001.

CPU 210 writes, in header DA01, the type of the command ("011"), a destination of the transmission of the command, and the like. CPU 210 writes, in first field DA02, information regarding an application to be launched and corresponding to a number "1". CPU 210 writes, in second field DA03, launch information corresponding to a number "2".

Stored in first field DA02 is information designating the application to be launched in first unit 1001. Stored in second field DA03 are information used in launch setting and information used after the launch thereof.

FIG. 12 illustrates a command of type "100" (hereinafter, referred to as "fifth command"). CPU 210 sends the fifth command from main device 104 of second unit 1002 to first unit 1001.

CPU 210 writes, in header DA01, the type of the command ("100"), a destination of transmission of the command, and the like. CPU 210 writes, in first field DA02, information regarding a reception request and corresponding to a number "1". CPU 210 writes, in second field DA03, information regarding the number and corresponding to a number "2". CPU 210 writes, in third field DA04, information regarding files and corresponding to a number "3".

A fifth command having first field DA02 set to "01" requests first unit 1001 to receive a file. Stored in second field DA03 is the number of files to be transmitted by second unit 1002 to first unit 1001. Stored in third field DA04 are the files to be transmitted by second unit 1002 to first unit 1001.

FIG. 13 illustrates a command of type "101" (hereinafter, referred to as "sixth command"). CPU 110 sends the sixth command from main device 101 of first unit 1001 to second unit 1002. Alternatively, CPU 210 sends the sixth command from main device 104 of second unit 1002 to first unit 1001.

CPU 110 or 210 writes, in header DA01, the type of the command ("101"), a destination of transmission of the command, and the like. CPU 110 or 210 writes, in first field DA02, a value of a communication type corresponding to a number "1". CPU 110 or 210 writes, in second field DA03, a value of a destination of connection corresponding to a number "2". CPU 110 or 210 writes, in third field DA04, a value of a destination of transfer corresponding to a number "3". CPU 110 or 210 writes, in fourth field DA05, a value of a timing to obtain strength of a signal corresponding to a number "4".

A sixth command having first field DA02 set to "001" requests a device of its counterpart to establish infrared communication therewith. A sixth command having first field DA02 set to "010" requests the device of its counterpart to establish wireless communication therewith using Bluetooth®. A sixth command having first field DA02 set to "011" requests the device of its counterpart to establish communication therewith using a LAN.

A sixth command having second field DA03 set to "000" indicates that it has no information designating the destination of connection in the communication.

A sixth command having second field DA03 set to "001" is transmitted by first unit 1001 to a device connected to first unit 1001. Such a sixth command requests transmission of information regarding the device to which first unit 1001 is connected.

A sixth command having second field DA03 set to "010" is transmitted by second unit 1002 to first unit 1001 connected to second unit 1002. Such a sixth command requests transmission of information regarding first unit 1001 to which second unit 1002 is connected.

A sixth command having second field DA03 set to "011" is transmitted by second unit 1002 to first unit 1001 to which second unit 1002 is connected. Such a sixth command requests setting of information regarding second unit 1002 as device information of the destination of connection.

A sixth command having second field DA03 set to "100" is transmitted by first unit 1001 to a device connected to first unit 1001 (for example, second unit 1002). Such a sixth command requests setting of information regarding first unit 1001 as device information of the destination of connection.

A sixth command having third field DA04 set to "000" indicates that it has no information designating a transfer destination of data (such as a file).

A sixth command having third field DA04 set to "001" is transmitted by first unit 1001 to a device that is a data transfer destination. Such a sixth command requests transmission of information on the device that is the data transfer destination.

A sixth command having third field DA04 set to "010" is transmitted by second unit 1002 to first unit 1001 that is a data transfer destination. Such a sixth command requests transmission of information regarding first unit 1001 that is the data transfer destination.

A sixth command having third field DA04 set to "011" is transmitted by second unit 1002 to first unit 1001 that is a data transfer destination. Such a sixth command requests setting of information regarding second unit 1002 as information on a device that will transfer the data.

A sixth command having third field DA04 set to "100" is transmitted by first unit 1001 to a device that is a data transfer destination (for example, second unit 1002). Such a sixth command requests setting of information regarding first unit 1001 as information on the device that will transfer the data.

A sixth command having fourth field DA05 set to "00", "01", "10", or "11" is transmitted by first unit 1001 to second unit 1002.

The sixth command having fourth field DA05 set to "00" does not request second unit 1002 to transmit data indicating strength of a signal. The sixth command having fourth field DA05 set to "01" requests signal strength detecting unit 297 to transmit data indicating the strength of the signal at the moment. The sixth command having fourth field DA05 set to "10" requests transmission of data indicating strength of the signal when there is a change in signal strength. The sixth command having fourth field DA05 set to "11" requests transmission of data indicating strength of the signal every fixed cycle.

FIG. 14 shows a schematic configuration of the response data. The response data is data that is based on the content of the first command (sensing command).

When the first command is transmitted from main device 101 to second unit 1002, CPU 210 transmits the response data from display device 103 to first unit 1001.

On the other hand, when the first command is transmitted from main device 101 to display device 102 of first unit 1001, image processing engine 180 transmits the response data from image processing engine 180 to main device 101. In the description below, the case where the first command is transmitted from main device 101 to second unit 1002 is illustrated by way of example.

Referring to FIG. 14, the response data includes a data region DA11 for its header, a data region DA12 indicating coordinates, a data region DA13 indicating time, and a data region DA14 indicating an image. In data region DA12 indicating coordinates, the center coordinates of a partial image are written. In the data region indicating time, time information obtained from timer 282 of image processing engine 280 is written. In the data region indicating an image, image data (i.e., scan data) having been processed by image processing engine 280 is written.

Figure 15:
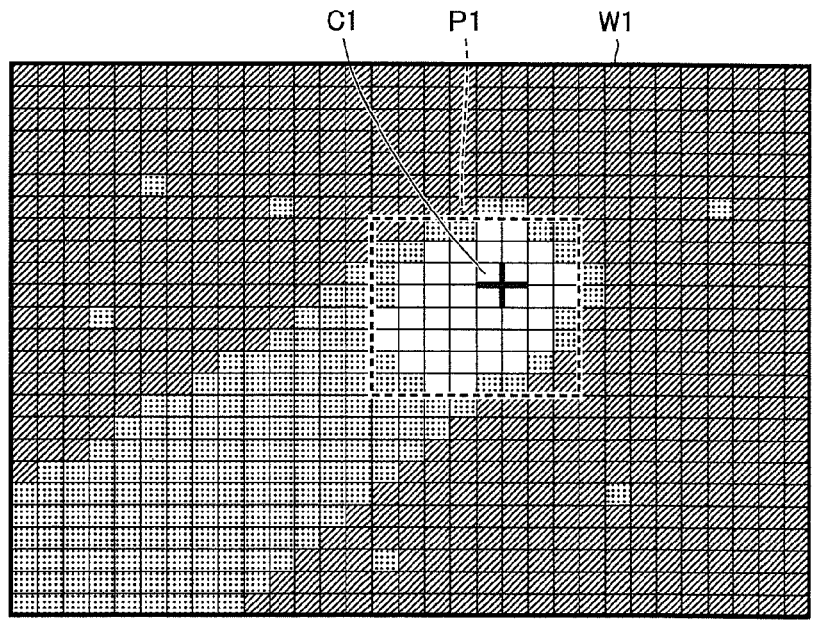
FIG. 15 shows an image (a scan image) obtained by scanning a finger.

FIG. 15 shows an image (i.e., scan image) obtained by scanning finger 900. Referring to FIG. 15, the entire image corresponds to an image of a region W1 surrounded by a thick solid line, whereas the partial image corresponds to an image of a region P1 surrounded by a dashed line. The center coordinates correspond to a central point C1 of a cross indicated by thick lines.

In the present embodiment, the region of the partial image is a rectangular region including all pixels each having a photosensor circuit and having an output voltage not lower than a predetermined value from sensor signal line SSj (i.e., pixels having not less than a predetermined gradation or a predetermined luminance).

The center coordinates are coordinates determined in consideration of gradation of the pixels in the region of the partial image. Specifically, the center coordinates are determined by weighting the pixels in the partial image based on the gradation of the pixels as well as a distance between each of the pixels and the central point (i.e., centroid) of the rectangle. Namely, the center coordinates do not necessarily coincide with the centroid of the partial image.

However, the position of the center coordinates is not necessarily limited to the above-described position, but the center coordinates may be the coordinates of the centroid or coordinates near the centroid.

When "001" is set in the data region indicating a data type of the first command, image processing engine 280 writes the values of the center coordinates in data region DA12 indicating coordinates. In this case, image processing engine 280 does not write image data in data region DA14 indicating an image. After writing the values of the center coordinates, image processing engine 280 sends the response data including the values of the center coordinates to main device 104. Main device 104 sends the response data including the values of the center coordinates to main device 101 of first unit 1001. As such, when "001" is set in the data region indicating a data type, the first command does not request output of image data but requests output of the values of the center coordinates.

When "010" is set in the data region indicating a data type of the first command, image processing engine 280 writes, in data region DA14 indicating an image, image data of a partial image changed in scan result. In this case, image processing engine 280 does not write the values of the center coordinates in data region DA12 indicating coordinates. After writing the image data of the partial image changed in scan result, image processing engine 280 sends the response data including the image data of the partial image to main device 104. Main device 104 sends the response data including the image data of the partial image to main device 101 of first unit 1001. As such, when "010" is set in the data region indicating a data type, the first command does not request the output of the values of the center coordinates, but requests output of the image data of the partial image changed in scan result.

A reason for transmitting only the partial image changed in scan result as described above is that the scan data of the region of the partial image is data more important than those of other regions in the scan data, and that scan data of a region corresponding to the region of the partial image is likely to be changed depending on a state of contact with a scan target object such as finger 900.

When "011" is set in the data region indicating a data type of the first command, image processing engine 280 writes the values of the center coordinates in data region DA12 indicating coordinates, and writes, in data region DA14 indicating an image, the image data of the partial image changed in scan result. Thereafter, image processing engine 280 sends the response data including the values of the center coordinates and the image data of the partial image to main device 104. Main device 104 sends the response data including the values of the center coordinates and the image data of the partial image to main device 101 of first unit 1001. As such, when "011" is set in the data region indicating a data type, the first command requests output of the values of the center coordinates and output of the image data of the partial image changed in scan result.

When "100" is set in the data region indicating a data type of the first command, image processing engine 280 writes the image data of the entire image in data region DA14 indicating an image of the response data shown in FIG. 14. In this case, image processing engine 280 does not write the values of the center coordinates in data region DA12 indicating coordinates. After writing the image data of the entire image, image processing engine 280 sends the response data including the image data of the entire image to main device 104. Main device 104 sends the response data including the image data of the entire image to main device 101 of first unit 1001. As such, when "100" is set in the data region indicating a data type, the first command does not request output of the values of the center coordinates but requests output of the image data of the entire image.

When "101" is set in the data region indicating a data type of the first command, image processing engine 280 writes the values of the center coordinates in data region DA12 indicating coordinates, and writes the image data of the entire image in data region DA14 indicating an image. Thereafter, image processing engine 280 sends response data including the values of the center coordinates and the image data of the entire image to main device 104. Main device 104 sends the response data including the values of the center coordinates and the image data of the entire image to main device 101 of first unit 1001. As such, when "101" is set in the data region indicating a data type, the first command requests output of the values of the center coordinates and output of the image data of the entire image.

<As to First Variation of Configuration>

The configuration of liquid crystal panel 140 is not limited to the one shown in FIG. 3. The following describes a liquid crystal panel different in manner from the one shown in FIG. 3.

Figure 16:
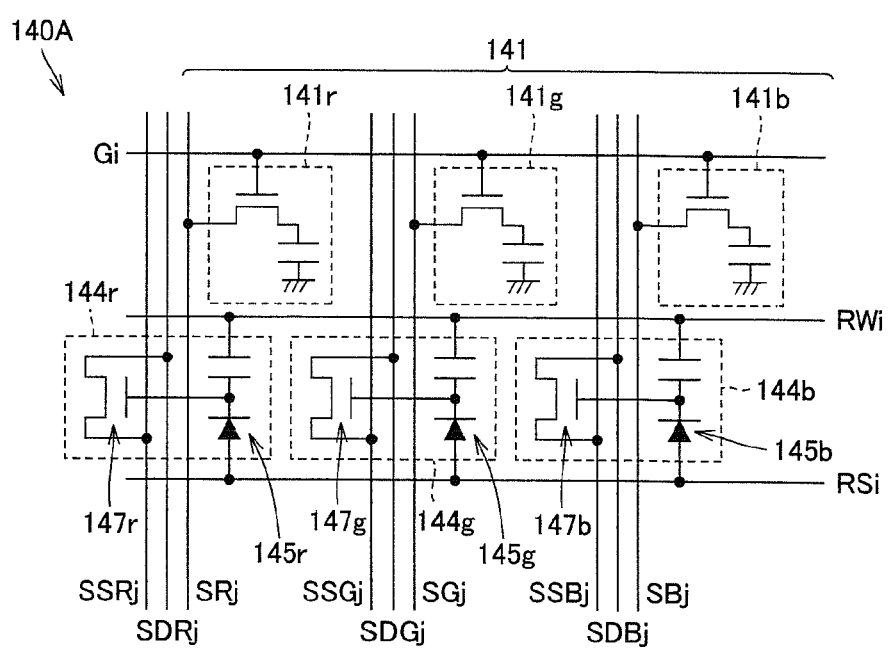
FIG. 16 is a circuit diagram of a photosensor built-in liquid crystal panel 140A.

FIG. 16 is a circuit diagram of a photosensor built-in liquid crystal panel 140A different in manner as described above. Referring to FIG. 16, photosensor built-in liquid crystal panel 140A (hereinafter, referred to as liquid crystal panel 140A) includes three photosensor circuits (144r, 144g, 144b) in one pixel. As such, liquid crystal panel 140A including the three photosensor circuits (144*r*, 144*g*, 144*b*) in one pixel is thus different from liquid crystal panel 140 including one photosensor circuit in one pixel. It should be noted that the configuration of photosensor circuit 144 is the same as that of each of the three photosensor circuits (144*r*, 144*g*, 144*b*).

Moreover, the three photodiodes (145*r*, 145*g*, 145*b*) in one pixel are provided at positions opposite to color filter 153*r*, color filter 153*g*, and color filter 153*b* respectively. Hence, photodiode 145*r* receives red light, photodiode 145*g* receives green light, and photodiode 145*b* receives blue light.

Meanwhile, since only one photosensor circuit 144 is provided in one pixel in liquid crystal panel 140, the two data signal lines, i.e., sensor signal line SSj and sensor signal line SDj, are arranged in one pixel for TFT 147. On the other hand, liquid crystal panel 140A includes three photosensor circuits (144*r*, 144*g*, 144*b*) in one pixel, six data signal lines are arranged in one pixel for TFTs (147*r*, 147*g*, 147*b*).

Specifically, for TFT 147*r* connected to the cathode of photodiode 145*r* provided at the position opposite to color filter 153*r*, a sensor signal line SSRj and a sensor signal line SDRj are arranged. For TFT 147*g* connected to the cathode of photodiode 145*g* provided at the position opposite to color filter 153*g*, a sensor signal line SSGj and a sensor signal line SDGj are arranged. For TFT 147*b* connected to the cathode of photodiode 145*b* provided at the position opposite to color filter 153*b*, a sensor signal line SSBj and a sensor signal line SDBj are arranged.

In such a liquid crystal panel 140A, white light emitted from backlight 179 passes through the three color filters (153*r*, 153*g*, 153*b*), and red light, green light, and blue light are mixed at the surface of liquid crystal panel 140A, thus obtaining white light. When the white light is reflected by the scan target object, a portion of the white light is absorbed in a pigment at the surface of the scan target object, and a portion thereof is reflected by the surface thereof. The light thus reflected passes through the three color filters (153*r*, 153*g*, 153*b*) again.

Here, color filter 153*r* allows light in a wavelength of red to pass therethrough and photodiode 145*r* receives the light in the wavelength of red. Color filter 153*g* allows light in a wavelength of green to pass therethrough and photodiode 145*g* receives the light in the wavelength of green. Color filter 153*b* allows light in a wavelength of blue to pass therethrough and photodiode 145*b* receives the light of the wavelength of blue. In other words, the light reflected by the scan target object is separated by the three color filters (153*r*, 153*g*, 153*b*) into light beams of three primary colors (R, G, B), and the photodiodes (145*r*, 145*g*, 145*b*) receive the light beams of corresponding colors respectively.

When a portion of the white light is absorbed in the pigment at the surface of the scan target object, respective amounts of light received by the photodiodes (145*r*, 145*g*, 145*b*) are different among the photodiodes (145*r*, 145*g*, 145*b*). Hence, output voltages of sensor signal line SSRj, sensor signal line SSGj, and sensor signal line SSBj are different from one another.

In accordance with the respective output voltages, image processing engine 180 determines gradation of R, gradation of G, and gradation of B, whereby image processing engine 180 can send a color image of RGB to main device 101.

As described above, in electronic device 100 including liquid crystal panel 140A, the scan target object can be scanned in color.

The following describes a scanning method different from the above-described scanning method (i.e., the method of scanning a reflection image as shown in FIG. 6) with reference to FIG. 17.

FIG. 17 is a cross-sectional view showing how the photodiodes receive external light in scanning. As shown in the figure, the external light is partially blocked by finger 900. Hence, photodiodes arranged below a region of contact with finger 900 in the surface of liquid crystal panel 140 can hardly receive the external light. Photodiodes below a region shaded by finger 900 in the surface thereof can receive a certain amount of the external light, however, the amount of the external light received is smaller than that in regions not shaded in the surface.

Here, by lighting off backlight 179 at least during the sensing period, photosensor circuit 144 can output a voltage from sensor signal line SSj in accordance with the position of finger 900 relative to the surface of liquid crystal panel 140. By controlling backlight 179 to light on and off in this way, in liquid crystal panel 140, a voltage output from each of the sensor signal lines (SS1 to SSn) is changed in accordance with the touch position of finger 900, a range touched by finger 900 (determined by pressing force of finger 900), a direction of finger 900 relative to the surface of liquid crystal panel 140, and the like.

In this way, display device 102 can scan an image (hereinafter, also referred to as shadow image) obtained by finger 900 blocking the external light.

Further, display device 102 may be configured to scan with backlight 179 lit on, and then scan again with backlight 179 lit off. Alternatively, display device 102 may be configured to scan with backlight 179 lit off, and then scan again with backlight 179 lit on.

In this case, the two scanning methods are used, and therefore two pieces of scan data can be obtained. Hence, accuracy can be higher as compared with a case where one scanning method alone is employed for scanning.

<As to Display Device>

As in the operation of display device 102, an operation of display device 103 is controlled in accordance with a command from main device 101 (for example, a first command). Display device 103 is configured in the same way as display device 102. Hence, when display device 103 accepts from main device 101 the same command as the command provided to display device 102, display device 103 operates in the same way as display device 102. Hence, explanation is not repeated for the operation and configuration of display device 103.

It should be noted that main device 101 can send commands different in instruction to display device 102 and display device 103. In this case, display device 102 and display device 103 operate in different ways. Further, main device 101 may send a command to either of display device 102 and display device 103. In this case, only one of the display devices operates in accordance with the command. Further, main device 101 may send a command identical in instruction to display device 102 and display device 103. In this case, display device 102 and display device 103 operate in the same way.

It should also be noted that the size of liquid crystal panel 140 of display device 102 may be the same as or different from the size of liquid crystal panel 240 of display device 103. Further, the resolution of liquid crystal panel 140 may be the same as or different from the resolution of liquid crystal panel 240.

<As to Second Variation of Configuration>

Described in the present embodiment is a configuration in which electronic device 100 includes the liquid crystal panels each having photo sensors built therein, such as liquid crystal panel 140 and liquid crystal panel 240. However, only one of the liquid crystal panels may have photosensors built therein.

Figure 18:
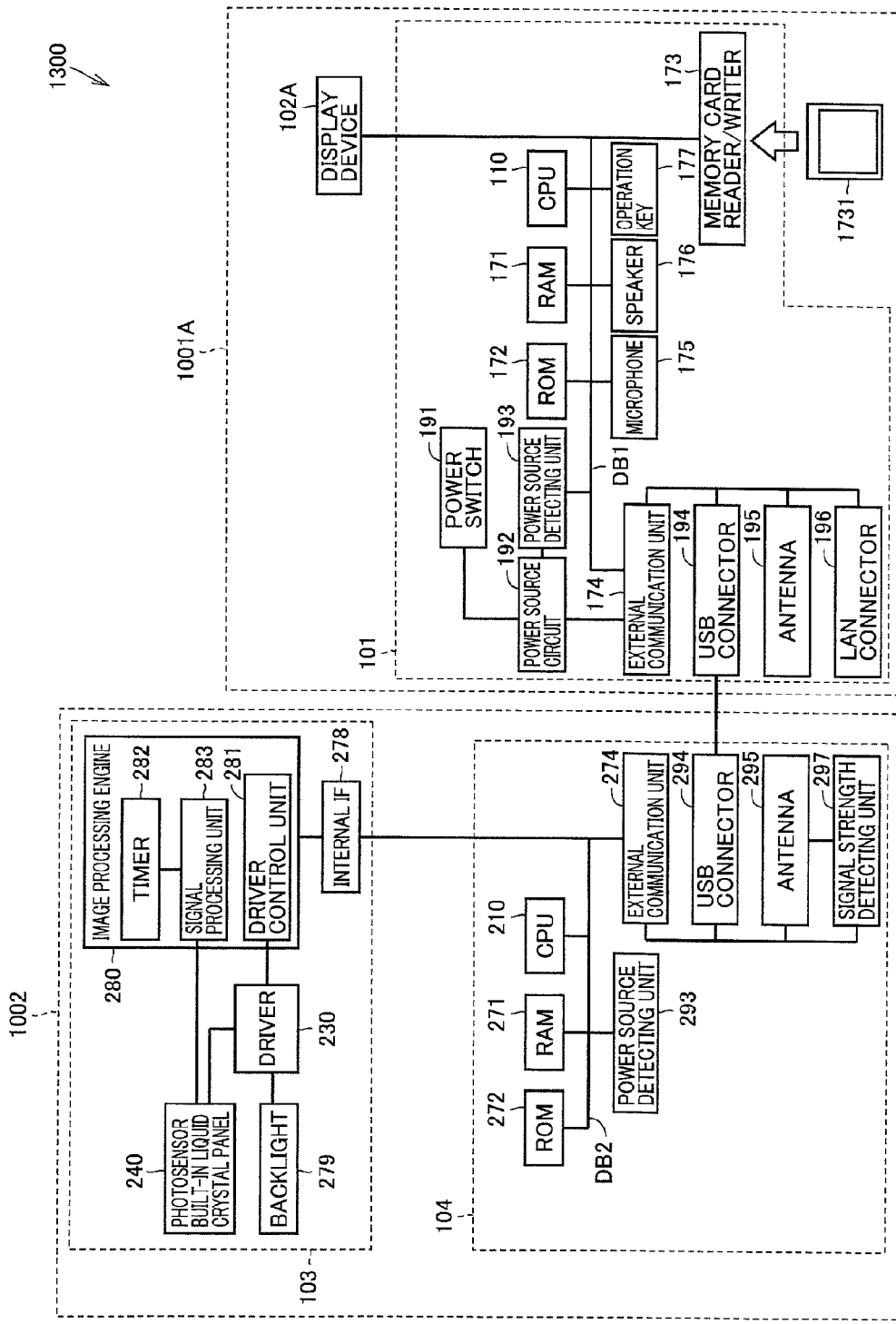
FIG. 18 is a block diagram showing a hardware configuration of a variation of the electronic device.

FIG. 18 is a block diagram of a hardware configuration of an electronic device 1300. As in electronic device 100, electronic device 1300 includes first casing 100A and second casing 100B. Referring to FIG. 18, electronic device 1300 includes a first unit 1001A and second unit 1002. First unit 1001A includes main device 101 and a display device 102A. Second unit 1002 includes main device 104 and display device 103.

Display device 102A includes a liquid crystal panel which does not have photosensors built therein (i.e., a liquid crystal panel only having a display function). Electronic device 1300 is different from electronic device 100 in which first unit 1001 includes liquid crystal panel 240 having the built-in photosensors, in that first unit 1001A includes the liquid crystal panel including no photosensor built therein. Such an electronic device 1300 performs the above-described sensing using display device 103 of second unit 1002.

Instead of liquid crystal panel 140 having the built-in photosensors, first unit 1001 may include, for example, a touch panel of a resistive type or a capacitive type.

In the present embodiment, it is assumed that display device 102 includes timer 182 and display device 103 includes timer 282, however, display device 102 and display device 103 may be configured to share one timer.

In the present embodiment, it is assumed that electronic device 100 is a foldable type device, however, electronic device 100 is not necessarily limited to the foldable type. For example, electronic device 100 may be a slidable type device in which first casing 100A is slid relative to second casing 100B.

In electronic device 100 according to the present embodiment and configured as above, second unit 1002 is removably attached to first unit 1001 via USB connectors 194, 294.

Electronic device 100 according to the present embodiment can perform the following function for example when powered on. When a user presses down power switch 191 of first unit 1001, first unit 1001 utilizes power from power source circuit 192 to launch BIOS (Basic Input/Output System).

Second unit 1002 obtains power from first unit 1001 via USB connectors 194, 294. Second unit 1002 utilizes the power to transmit data to and receive data from first unit 1001. Here, CPU 210 of second unit 1002 uses power through each of USB connectors 194, 294 so as to display types of OSs on liquid crystal panel 240 in a selectable manner.

Through liquid crystal panel 240, the user selects an OS to be launched. In accordance with the user's selection, CPU 210 transmits a command designating the OS to be launched (for example, "first OS" command shown in FIG. 10), to first unit 1001 via USB connectors 194, 294. In accordance with the command, first unit 1001 launches the OS.

Further, second unit 1002 transmits data to and receives data from an external mobile phone or the like via antenna 295, for example. Via antenna 295, CPU 210 of second unit 1002 obtains photograph image data or corresponding thumbnail data from the external mobile phone, and stores the photograph image data or corresponding thumbnail data in RAM 271 or the like. CPU 210 reads out the thumbnail data from RAM 271, and causes liquid crystal panel 240 to display a thumbnail image of the photograph in a selectable manner.

In accordance with an external selection instruction, CPU 210 causes liquid crystal panel 240 to display the photograph image. Alternatively, CPU 210 causes liquid crystal panel 140 or display device 102A to display the photograph image via USB connector 294.

<Functional Configuration>

Figure 19:
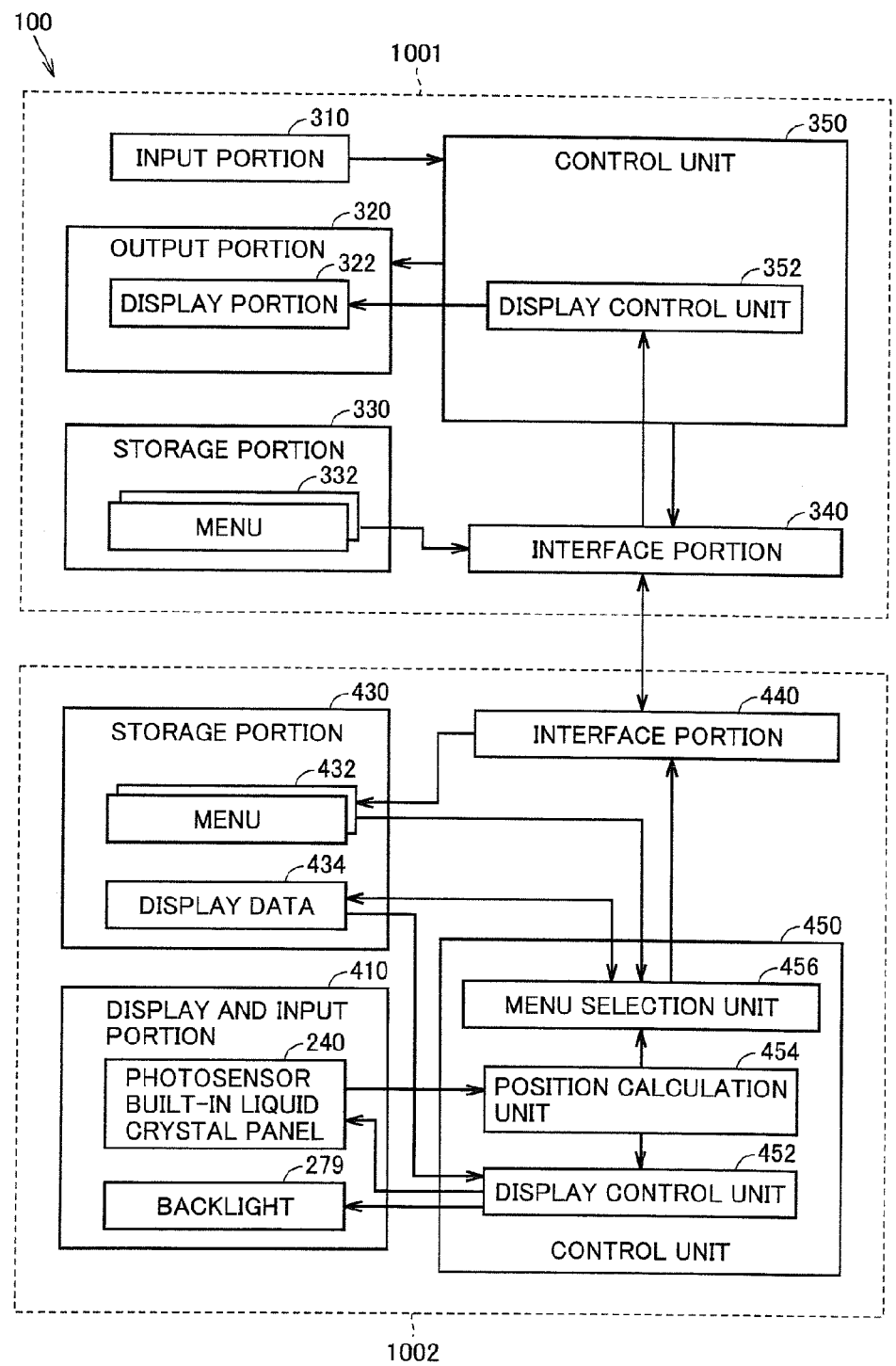
FIG. 19 is a diagram showing in a block diagram form, a functional configuration of an electronic device 100 according to the present embodiment.

A functional configuration of electronic device 100 according to the present embodiment will be described with reference to FIG. 19. Referring to FIG. 19, as already described, electronic device 100 includes first unit 1001 and second unit 1002.

First unit 1001 includes an input portion 310, an output portion 320, a storage portion 330, an interface portion 340, and a control unit 350.

Input portion 310 accepts an external instruction. In the present embodiment, operation key 177 performs a function as input portion 310. In addition, liquid crystal panel 140 containing a photosensor also performs a function as input portion 310.

Output portion 320 outputs information in first unit 1001 to the outside. Output portion 320 includes a display portion 322 for displaying an image. In the present embodiment, liquid crystal panel 140 performs a function as display portion 322. It should be noted that other display devices, for example, such a display as an LCD (Liquid Crystal Display), may be employed as display portion 322.

Storage portion 330 stores information such as a plurality of menus 332. Each menu 332 can be selected based on an instruction accepted by input portion 310. Menu 332 includes, for example, a thumbnail of an image and a command menu.

Interface portion 340 transmits and receives information to and from an interface portion 440 on the second unit 1002 side. In the present embodiment, in a case where first unit 1001 and second unit 1002 are directly connected to each other, USB connector 194 functions as interface portion 340. In a case where first unit 1001 and second unit 1002 are not directly connected to each other, antenna 195 functions as interface portion 340. It should be noted that a method of transmitting and receiving information through interface portion 340 is not limited as such.

Control unit 350 controls an operation of output portion 320, storage portion 330 and interface portion 340 based on an instruction or the like accepted by input portion 310.

Second unit 1002 includes a display and input portion 410, a storage portion 430, interface portion 440, and a control unit 450.

Display and input portion 410 displays information in second unit 1002 to the outside. In addition, display and input portion 410 accepts an external instruction. In the present embodiment, photosensor built-in liquid crystal panel 240 and backlight 279 perform a function as display and input portion 410. It should be noted that a configuration of display and input portion 410 is not limited as such. Other display devices, for example, such a display as an LCD (Liquid Crystal Display) and a multi-point-acceptable input device as combined, can also be employed as display and input portion 410.

Storage portion 430 stores information such as a plurality of menus 432, display data 434 displayed on display and input portion 410, and the like. Menu 432 includes, for example, a thumbnail of an image and a command menu, similarly to menu 332 stored in storage portion 330 of first unit 1001.

Interface portion 440 transmits and receives information to and from interface portion 340 on the first unit 1001 side. In the present embodiment, in a case where first unit 1001 and second unit 1002 are directly connected to each other, USB connector 294 functions as interface portion 440. In a case where first unit 1001 and second unit 1002 are not directly connected to each other, antenna 295 functions as interface portion 440. It should be noted that a method of transmitting and receiving information through interface portion 440 is not limited as such, Control unit 450 controls an operation of display and input portion 410, storage portion 430 and interface portion 440 based on an instruction or the like accepted by display and input portion 410. Control unit 450 includes a display control unit 452, a position calculation unit 454 and a menu selection unit 456.

Display control unit 452 controls liquid crystal panel 240 and backlight 279 so as to cause liquid crystal panel 240 to display an image based on display data 434. In particular, display control unit 452 creates display data 434 including a plurality of menus 432 and causes liquid crystal panel 240 to display an image based on display data 434. Here, display data 434 including the plurality of menus 432 includes display position information of each menu 432.

Position calculation unit 454 calculates an externally indicated position. Specifically, for example, position calculation unit 454 finds a region of a partial image based on a result of sensing by liquid crystal panel 240 and calculates center coordinates of the region of the partial image as the indicated position. In the present embodiment, position calculation unit 454 outputs the indicated position while an input is provided to liquid crystal panel 240. Namely, position calculation unit 454 continuously outputs the indicated position while an external object such as finger 900 is in contact with or proximate to liquid crystal panel 240.

Menu selection unit 456 selects a menu from among menus displayed on liquid crystal panel 240 based on the indicated position calculated by position calculation unit 454. Details of a method of menu selection by menu selection unit 456 will be described later. In addition, menu selection unit 456 passes the selected menu to interface portion 440.

<Operation>
(Overview)

Figure 20:
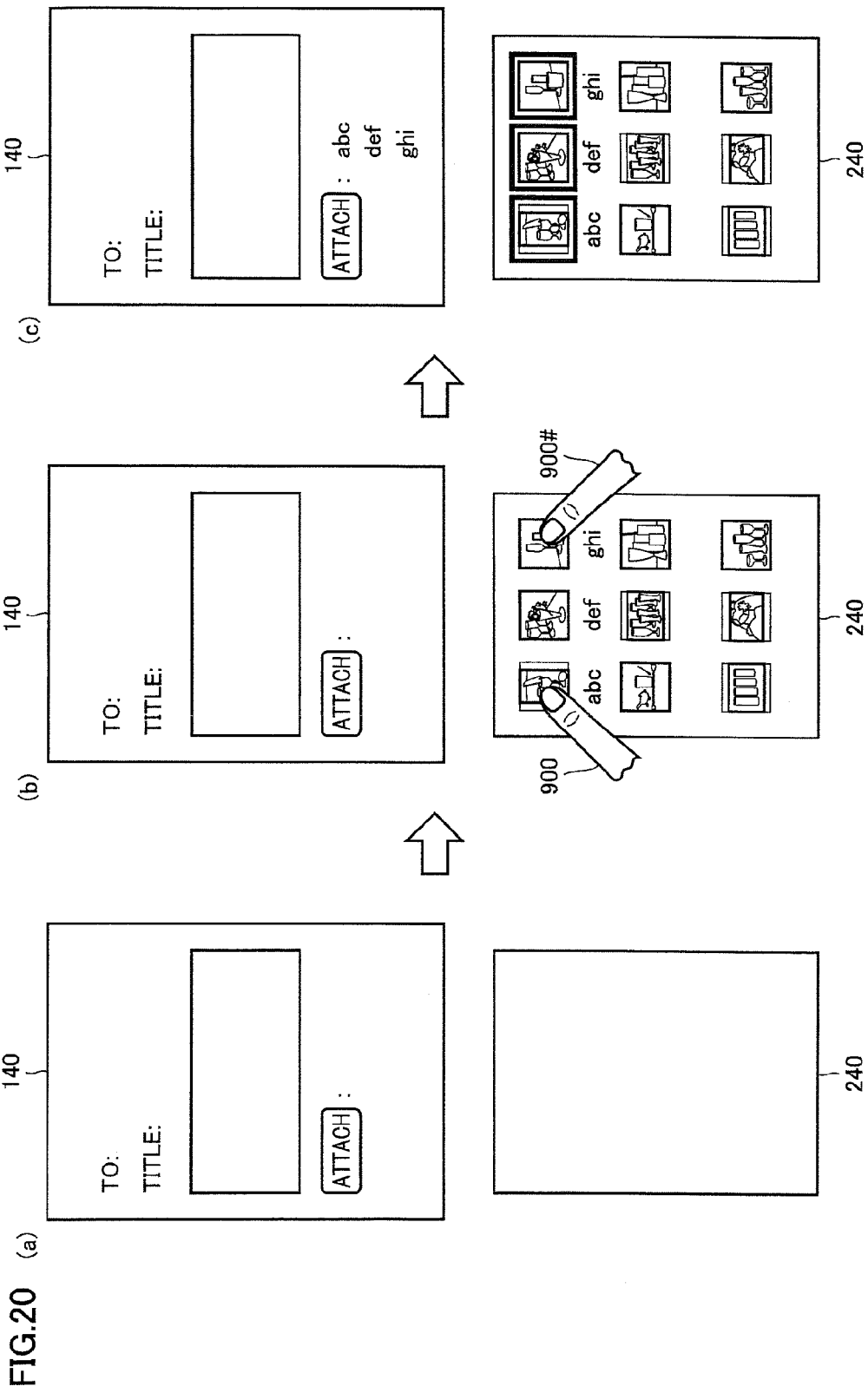
FIG. 20 is a diagram illustrating an overview of an operation of electronic device 100 according to a first embodiment.

When electronic device 100 is used, designation of a plurality of files may be required. Electronic device 100 facilitates user's designation of a plurality of files. Overview of an operation of electronic device 100 will be described with reference to FIG. 20. FIG. 20 shows an operation of electronic device 100 when a plurality of files are attached to an e-mail by way of example.

FIG. 20(a) is a diagram showing a screen displayed on electronic device 100 when an e-mail application is launched. Referring to FIG. 20(a), liquid crystal panel 140 on the first unit 1001 side displays a screen including a destination (To) field, a subject (Title) field, a text field, and an attach button. Liquid crystal panel 240 on the second unit 1002 side displays nothing. It should be noted that liquid crystal panel 240 may display some kind of screen.

FIG. 20(b) is a diagram showing a screen displayed on electronic device 100 when the attach button shown in FIG. 20(a) is selected. Referring to FIG. 20(b), liquid crystal panel 204 displays a screen including a plurality of menus (here, thumbnail images). Here, the menus displayed on liquid crystal panel 204 may be menus stored in advance in second unit 1002 or menus sent from first unit 1001 to second unit 1002 when the attach button is selected.

The user can select each thumbnail image by touching liquid crystal panel 240 with finger 900 or a finger 900#. It should be noted that the user may select a thumbnail image by using such an input device as a stylus instead of finger 900 or 900#.

FIG. 20(c) is a diagram showing a screen displayed on electronic device 100 when an image abc and an image ghi in liquid crystal panel 240 shown in FIG. 20(b) are simultaneously touched. When two menus are simultaneously touched, an image lying between the touched images is extracted as a provisionally selected image. Liquid crystal panel 240 displays the extracted, provisionally selected images as each surrounded by a frame. It should be noted that liquid crystal panel 240 may provide highlighted display of these candidate images with another method.

In addition, when an instruction to confirm selection of the extracted, provisionally selected images (referred to as a selection entry instruction) is accepted, electronic device 100 enters the provisionally selected images as selected images. The e-mail application attaches the entered selected images, that is, image abc, an image def, and image ghi, to an e-mail being created. Liquid crystal panel 140 displays file names of the attached images next to the attach button.

In the present embodiment, it is assumed that electronic device 100 regards touching of an enter button (not shown in FIG. 20) displayed on liquid crystal panel 240 as the selection entry instruction, however, the selection entry instruction is not limited thereto. Electronic device 100 may select an image lying between touched images as the selected image without a selection entry instruction, in response to simultaneous touching of two menus. It should be noted that the present embodiment employing the selection entry instruction is advantageous in that an erroneous operation due to the user's selection of an incorrect region can be prevented.

As described above, electronic device 100 causes liquid crystal panel 240 of second unit 1002 to display a screen including a plurality of menus representing selection candidates. Therefore, electronic device 100 can allow the user to select a menu while a work space on liquid crystal panel 140 is ensured.

(Selection of Multiple Menus)

Rules on which selection of menus in response to inputs to liquid crystal panel 240 by electronic device 100 according to the present embodiment is based will be described in further detail.

In the present embodiment, menu selection unit 456 regards simultaneous inputs of two indicated positions as an instruction to switch to a multiple menu selection mode. Namely, when inputs of two indicated positions are accepted from position calculation unit 454, menu selection unit 456 provisionally selects menus in a rectangle having the two indicated positions at vertices at respective opposite angles. Here, a direction of each side of the rectangle coincides with any of a horizontal direction and a vertical direction of the display screen. It should be noted that, when horizontal coordinates or vertical coordinates of the two indicated positions coincide with each other, it is assumed that menu selection unit 456 provisionally selects menus on a line segment connecting the two indicated positions to each other.

When display and input portion 410 accepts the selection entry instruction while the menus are provisionally selected, menu selection unit 456 enters the provisionally selected menus as the selected menus. Here, menu selection unit 456 regards pressing of the enter key displayed on liquid crystal panel 240 as the selection entry instruction.

Menu selection unit 456 outputs the selected menus to interface portion 440. Interface portion 440 that has accepted the selected menus transmits the selected menus to interface portion 340 on the first unit 1001 side. Control unit 350 on the first unit 1001 side subjects the selected menus to prescribed processing. In the example shown in FIG. 20, control unit 350 attaches contents corresponding to selected thumbnails to an e-mail.

An operation example of electronic device 100 will be described hereinafter with reference to FIGS. 21 to 23.

Figure 21:
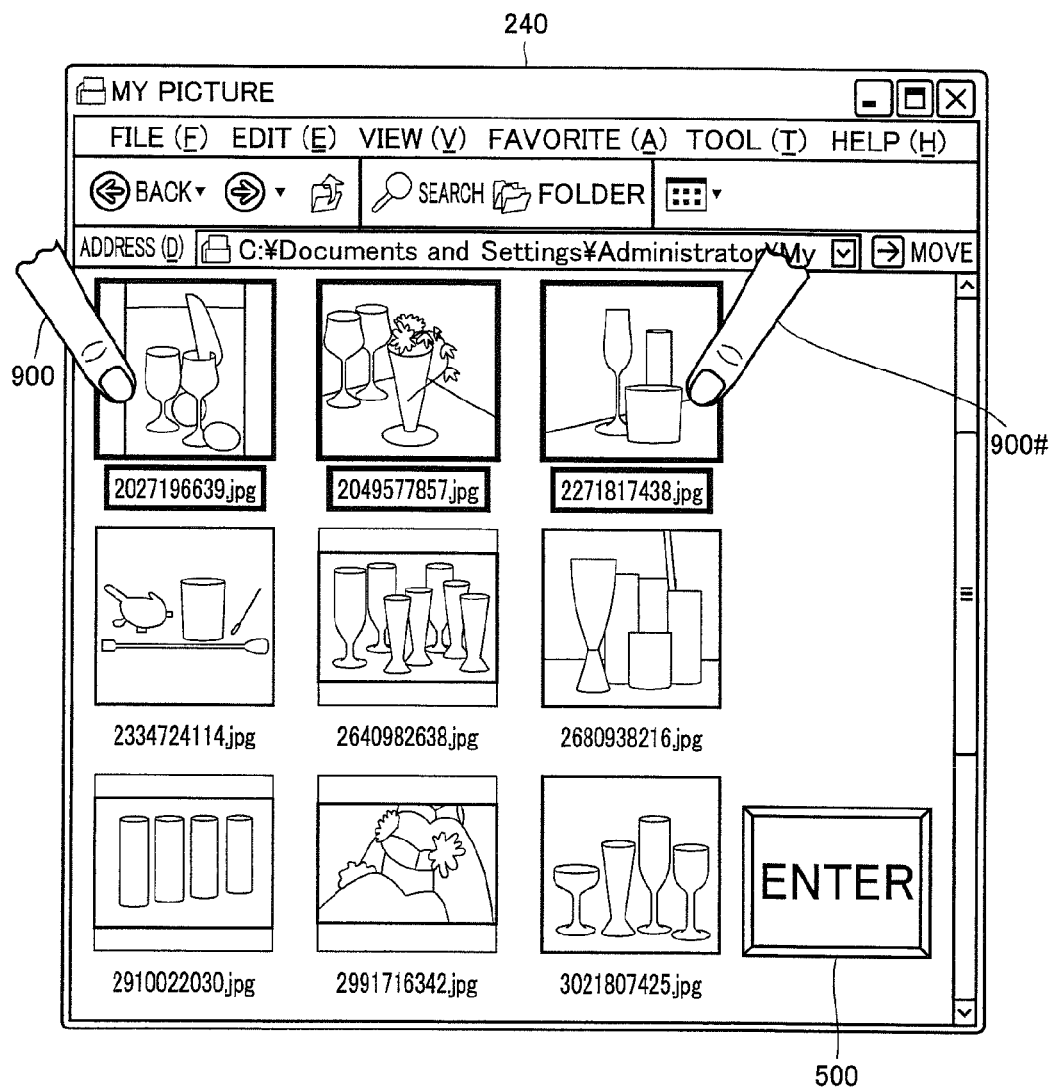
FIG. 21 is a diagram illustrating an operation of electronic device 100 selecting menus aligned in a lateral direction.

FIG. 21 is a diagram illustrating an operation of electronic device 100 selecting menus aligned in a lateral direction. Referring to FIG. 21, the user of electronic device 100 simultaneously presses a region on a thumbnail in the upper left portion and a region on a thumbnail in the upper right portion with finger 900 and finger 900# respectively.

Here, position calculation unit 454 simultaneously outputs two indicated positions. Therefore, menu selection unit 456 provisionally selects thumbnails in a rectangular region or on a line segment designated by the two indicated positions.

Menu selection unit 456 causes the provisionally selected thumbnails to specifically be displayed. In the present embodiment, as shown in FIG. 21, it is assumed that menu selection unit 456 causes the provisionally selected thumbnails to be displayed as each surrounded by a frame. It should be noted that menu selection unit 456 may cause the provisionally selected thumbnails to specifically be displayed with another method.

When position calculation unit 454 outputs an indicated position in enter button 500 while menu selection unit 456 provisionally selects thumbnails, menu selection unit 456 selects the provisionally selected thumbnails. In addition, menu selection unit 456 outputs the selected menus to interface portion 440.

Interface portion 440 that has accepted the selected menus sends the selected menus to interface portion 340 on the first unit 1001 side. Control unit 350 on the first unit 1001 side subjects the selected menus to prescribed processing (such as contents corresponding to the selected thumbnails).

Figure 22:
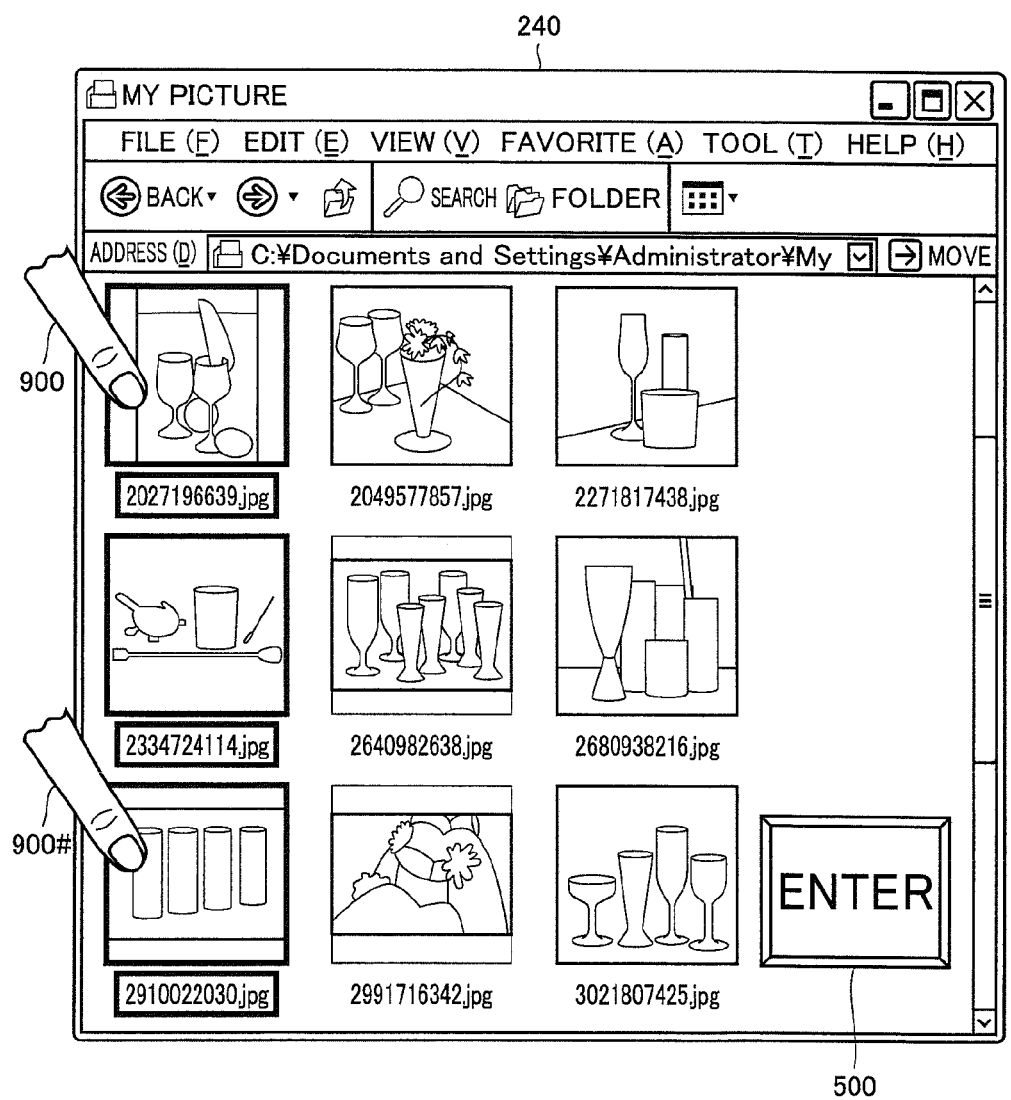
FIG. 22 is a diagram illustrating an operation of electronic device 100 selecting menus aligned in a vertical direction.

FIG. 22 is a diagram illustrating an operation of electronic device 100 selecting menus aligned in a vertical direction. Referring to FIG. 22, the user of electronic device 100 simultaneously presses a region on a thumbnail in the upper left portion and a region on a thumbnail in the lower left portion with finger 900 and finger 900# respectively.

Here, through the processing the same as described above, menu selection unit 456 provisionally selects three thumbnails each surrounded by a frame in FIG. 22. When enter button 500 is pressed, menu selection unit 456 selects and outputs the provisionally selected thumbnails. Control unit 350 on the first unit 1001 side subjects the selected menus to prescribed processing.

Figure 23:
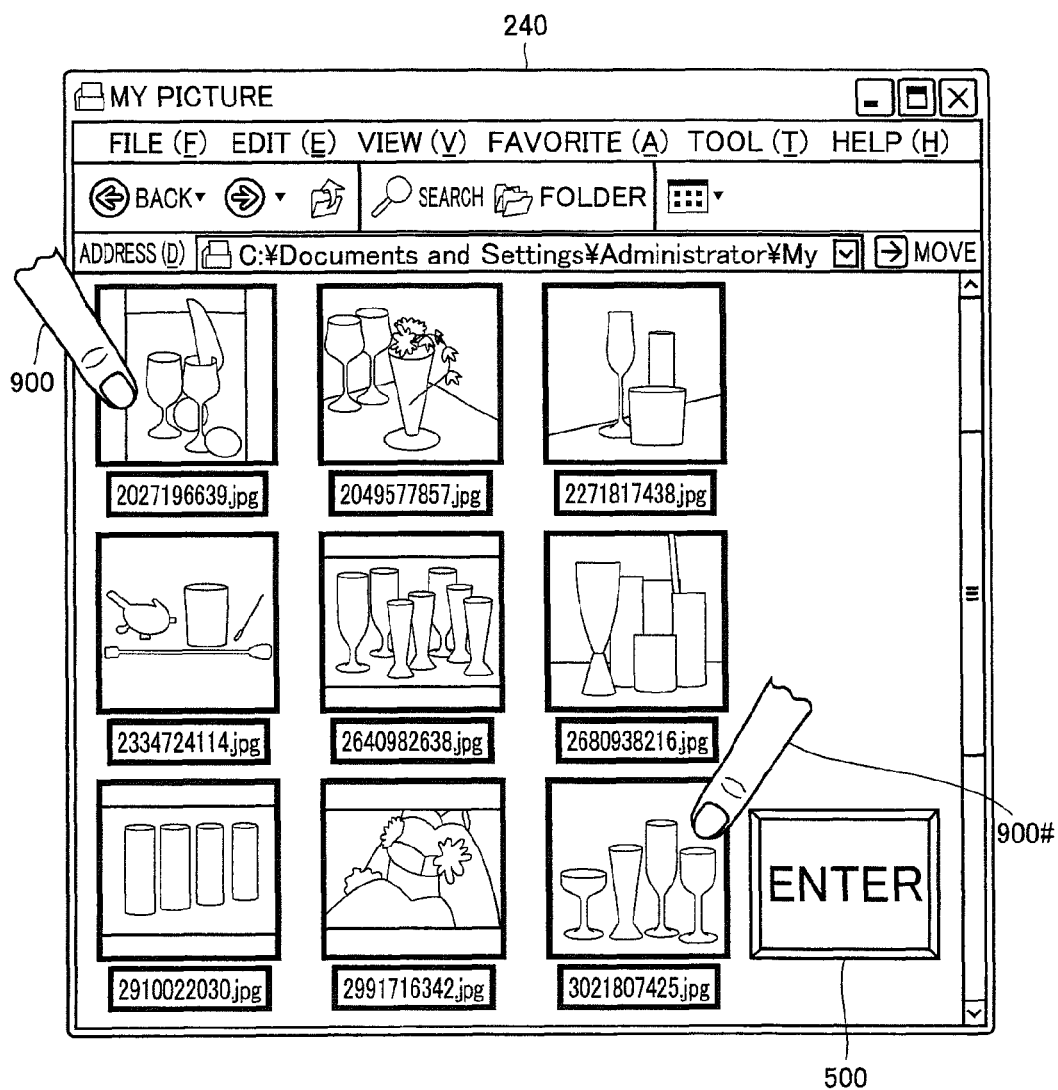
FIG. 23 is a diagram illustrating an operation of electronic device 100 selecting menus arranged in three rows and three columns.

FIG. 23 is a diagram illustrating an operation of electronic device 100 selecting menus in three rows and three columns. Referring to FIG. 23, the user of electronic device 100 simultaneously presses a region on a thumbnail in the upper left portion and a region on a thumbnail in the lower right portion with finger 900 and finger 900# respectively.

Here, through the processing the same as described above, menu selection unit 456 provisionally selects nine thumbnails each surrounded by a frame in FIG. 23. When enter button 500 is pressed, menu selection unit 456 selects and outputs the provisionally selected thumbnails. Control unit 350 on the first unit 1001 side subjects the selected menus to prescribed processing.

(Selection of Single Menu)

In the above, rules on which selection of a plurality of menus by menu selection unit 456 is based and an operation example have been described. From now on, rules on which selection of a single menu by menu selection unit 456 is based and an operation example will be described.

Figure 24:
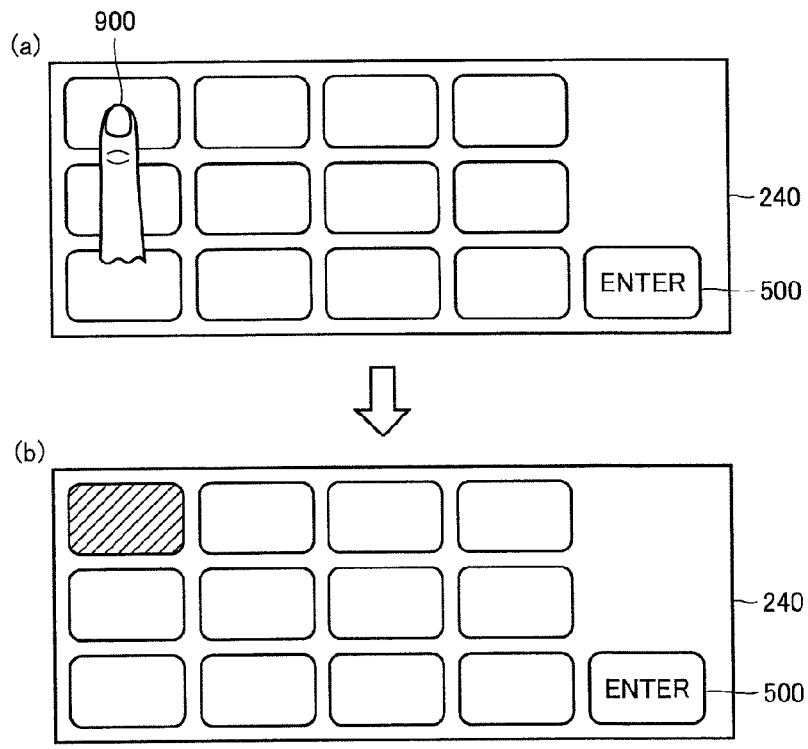
FIG. 24 is a diagram for illustrating single-selection.

When one input (a first input) to a region corresponding to one menu ends by the time when an input (a second input) to a region corresponding to another menu is provided, menu selection unit 456 according to the present embodiment provisionally selects the menu corresponding to the first input. Such provisional selection of one menu is called single-selection. Single-selection will be described hereinafter with reference to FIG. 24.

FIG. 24(a) is a diagram showing a display screen on liquid crystal panel 240 when user's finger 900 presses one menu. Here, menu selection unit 456 has not yet provisionally selected a menu. Based on a subsequent input onto liquid crystal panel 240, menu selection unit 456 determines which of single-selection and provisional selection of a plurality of menus is to be made.

FIG. 24(b) is a diagram showing a display screen on the liquid crystal panel when finger 900 moved away from liquid crystal panel 240 after the state shown in FIG. 24(a). Here, menu selection unit 456 extracts the pressed menu. In the present embodiment, display control unit 452 controls liquid crystal panel 240 so as to provide highlighted display of the singly-selected menu. When enter button 500 is pressed, menu selection unit 456 outputs the singly-selected menu to interface portion 440.

Figure 25:
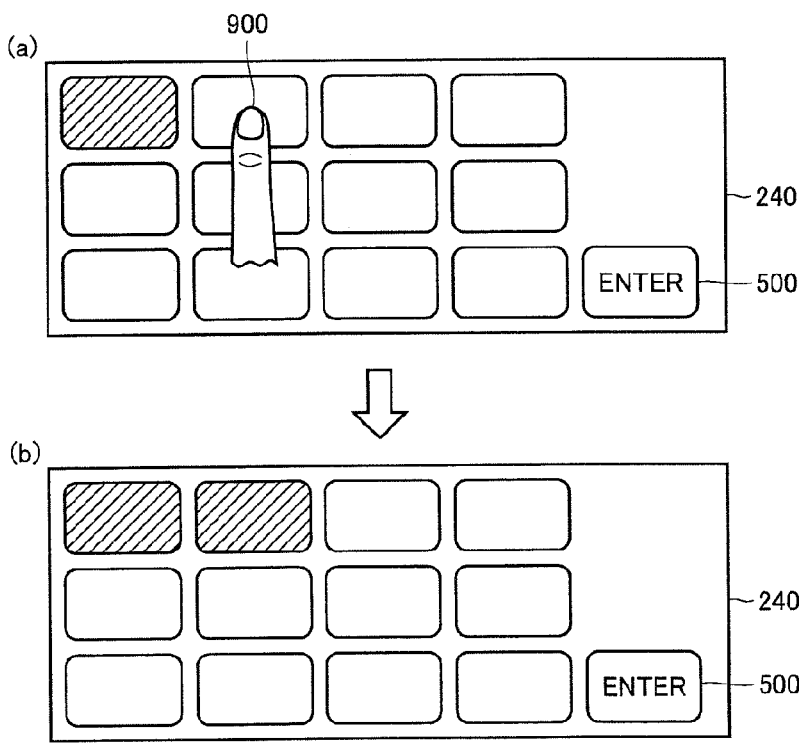
FIG. 25 is a diagram for illustrating continuous selection of a single menu.

In addition, menu selection unit 456 can continuously select a single menu in response to repetition of a single-selection operation. Continuous selection of a single menu will be described with reference to FIG. 25.

FIG. 25(a) is a diagram showing a display screen on liquid crystal panel 240 when user's finger 900 presses another menu while one menu has been extracted. Here, menu selection unit 456 has not yet extracted the pressed menu.

FIG. 25(b) is a diagram showing a display screen on the liquid crystal panel when user's finger 900 moved away from liquid crystal panel 240 after the state shown in FIG. 25(a). Here, menu selection unit 456 provisionally selects the pressed menu. Menu selection unit 456 continues provisional selection of the menu that has provisionally been selected since the time shown in FIG. 25(a). When enter button 500 is pressed, menu selection unit 456 selects the menu that has provisionally been selected since the time shown in FIG. 25(a) and a newly provisionally selected menu, and outputs the selected menus to interface portion 440.

Menu selection unit 456 may output a menu to interface portion 440 without pressing of enter button 500, as in selection of a plurality of menus. It should be noted, however, that in order for the user to continuously select a single menu, preferably, menu selection unit 456 provisionally selects a menu and then selects and outputs the provisionally selected menu in response to pressing of enter button 500, as in the present embodiment.

(Cancellation of Selection)

In addition, menu selection unit 456 cancels provisional selection of a menu in response to pressing again of the provisionally selected menu. Thus, the user can cancel provisional selection of the pressed menu if he/she pressed an unintended menu.

Figure 26:
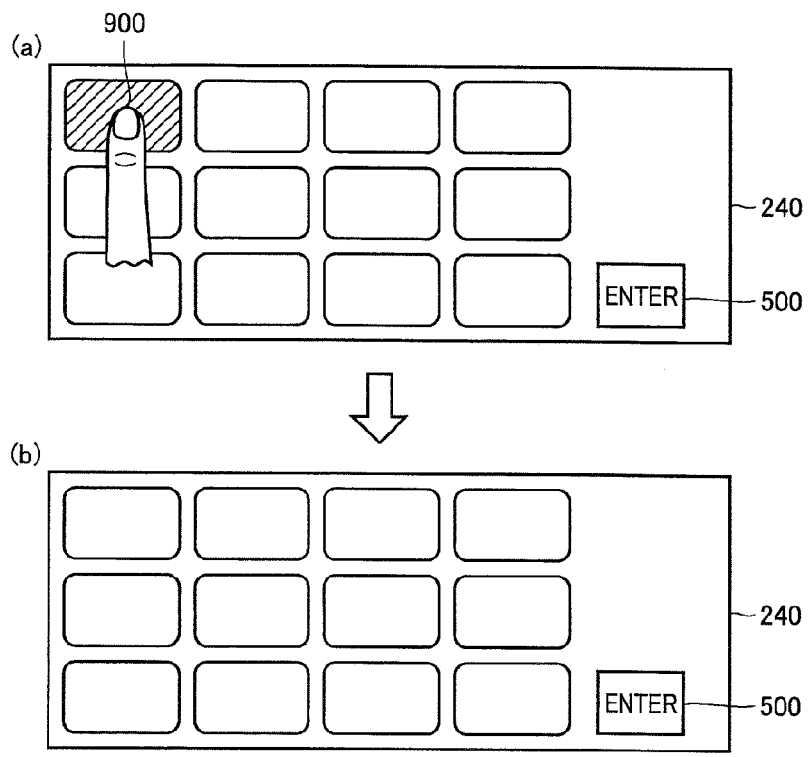
FIG. 26 is a diagram for illustrating cancellation of provisional selection of one menu.

Cancellation of provisional selection of one menu will be described with reference to FIG. 26. FIG. 26(a) is a diagram showing a display screen on liquid crystal panel 240 when finger 900 presses a provisionally selected menu. FIG. 26(b) is a diagram showing a display screen on liquid crystal panel 240 when finger 900 moved away from liquid crystal panel 240 after the state shown in FIG. 26(a). When finger 900 moves away from the provisionally selected menu, menu selection unit 456 cancels provisional selection of the menu pressed by finger 900. In addition, menu selection unit 456 returns a form of display of the provisionally selected menu to a normal form of display.

Figure 27:
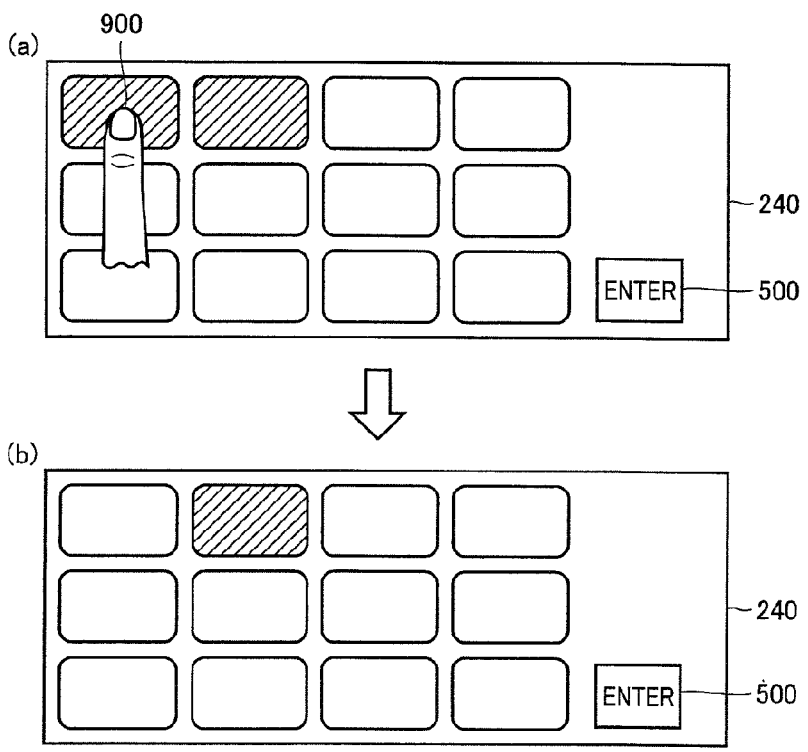
FIG. 27 is a diagram for illustrating cancellation of provisional selection of a specific menu from among a plurality of menus.

Menu selection unit 456 can also cancel provisional selection of a specific menu among a plurality of provisionally selected menus. Such an operation example will be described with reference to FIG. 27.

FIG. 27(a) is a diagram showing a display screen on liquid crystal panel 240 when finger 900 presses one menu out of two provisionally selected menus. FIG. 27(b) is a diagram showing a display screen on liquid crystal panel 240 when finger 900 moved away from liquid crystal panel 240 after the state shown in FIG. 27(a). When finger 900 moves away from the provisionally selected menu, menu selection unit 456 cancels provisional selection of the menu pressed by finger 900. In addition, menu selection unit 456 returns a form of display of the provisionally selected menu to a normal form of display.

According to such cancellation of selection, the user provisionally selects a plurality of menus and thereafter can cancel provisional selection of a part of them. Therefore, the user can select menu(s) in various manners of selection. For example, the user can provisionally select menus in a rectangle and then cancel provisional selection of one menu among them.

(Composite Selection)

In the present embodiment, menu selection unit 456 selects a menu by using provisional selection processing and a selection entry instruction. Therefore, menu selection unit 456 can select a menu in various manners of selection by issuing a selection entry instruction after making provisional selection a plurality of times. Such a selection method is called composite selection.

Figure 28:
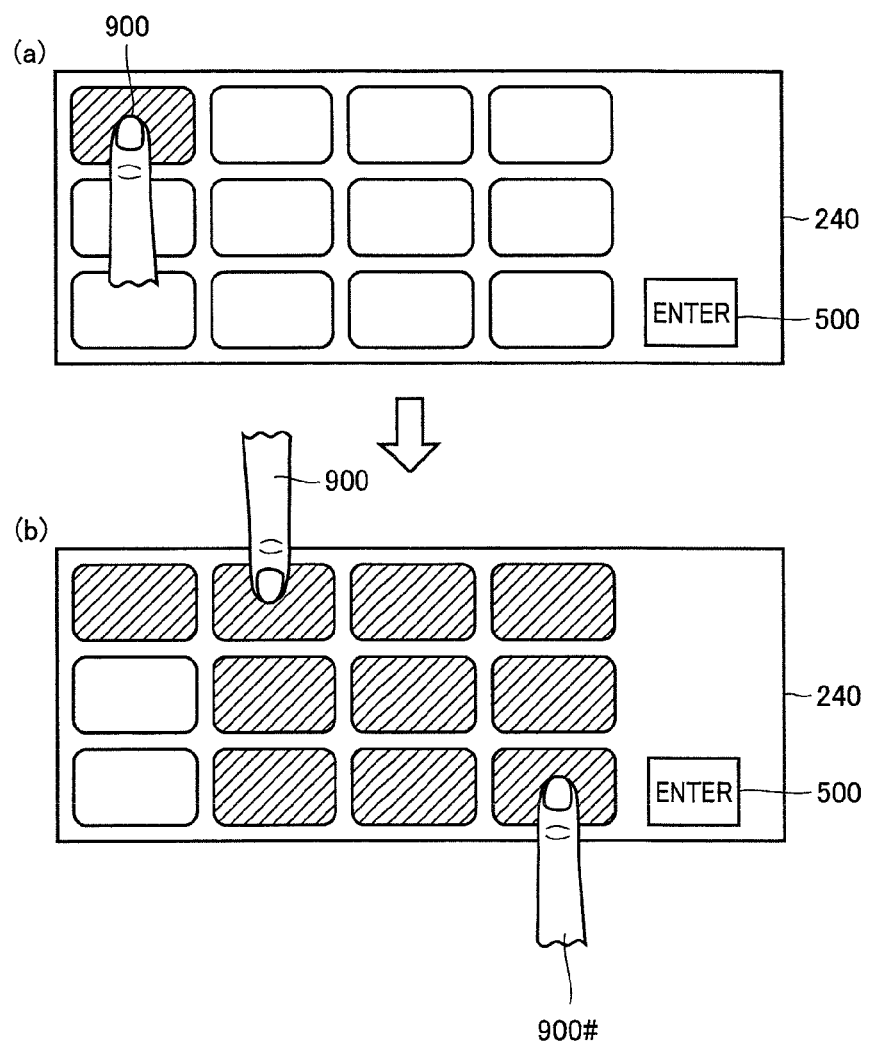
FIG. 28 is a diagram for illustrating composite selection.

Composite selection will be described with reference to FIG. 28. FIG. 28(a) is a diagram showing a display screen on liquid crystal panel 240 when menu selection unit 456 provisionally selects one menu in response to pressing with finger 900.

FIG. 28(b) is a diagram showing a display screen on liquid crystal panel 240 while finger 900 touches one menu and finger 900# touches another menu after the state shown in FIG. 28(a). In the state shown in FIG. 28(b), menu selection unit 456 provisionally selects menus lying between the position indicated by finger 900 and the position indicated by finger 900# in addition to the menu provisionally selected in the state shown in FIG. 28(a).

By thus using composite selection, the user can select a menu in various patterns.

(Process Flow)

From now on, flow of processing performed by menu selection unit 456 will be described with reference to FIG. 29. Here, though processing for selecting a content such as a thumbnail image will be described in line with the example shown in FIG. 20 and the like, this description is also applicable to general menu selection processing.

In step S101, menu selection unit 456 determines whether a first selection instruction has been accepted from position calculation unit 454 or not. Here, the "selection instruction" refers to an indicated position corresponding to a display region of a menu. In addition, here, a selection instruction accepted before menu selection unit 456 accepts another selection instruction is referred to as a first selection instruction.

When it is determined that the first selection instruction has not been accepted (NO in step S101), menu selection unit 456 repeats the processing in step S101.

When it is determined that the first selection instruction has been accepted (YES in step S101), menu selection unit 456 determines in step S103 whether the first selection instruction has ended or not. Specifically, when position calculation unit 454 stops output of the indicated position representing the first selection instruction, menu selection unit 456 determines that the first selection instruction has ended.

When it is determined that the first selection instruction has ended (YES in step S103), menu selection unit 456 provisionally selects in step S104 a menu corresponding to the indicated position representing the first selection instruction.

In step S105, menu selection unit 456 provides highlighted display of the provisionally selected content. Highlighted display herein refers to specific display of a content, such as surrounding a content with a frame. Thereafter, menu selection unit 456 repeats the processing from step S101.

When it is determined in step S103 that the first selection instruction has not ended (NO in step S104), menu selection unit 456 determines in step S107 whether a second selection instruction has been accepted or not. The second selection instruction refers to a selection instruction different from the first selection instruction.

When it is determined that the second selection instruction has not been accepted (NO in step S107), menu selection unit 456 repeats the processing from step S103.

When it is determined that the second selection instruction has ended (YES in step S107), menu selection unit 456 provisionally selects in step S109 contents based on the position indicated by the first selection instruction and the position indicated by the second selection instruction. Details of the processing in step S109 will be described later.

In step S111, menu selection unit 456 provides highlighted display of the contents provisionally selected in step S109.

In step S113, menu selection unit 456 determines whether cancellation of provisional selection has been indicated or not. In the present embodiment, menu selection unit 456 regards pressing again of a provisionally selected content as an instruction to cancel provisional selection.

When cancellation has been indicated (YES in step S113), menu selection unit 456 cancels provisional selection in response to the cancellation instruction and repeats the processing from step S101.

When cancellation has not been indicated (NO in step S113), menu selection unit 456 determines in step S115 whether a selection entry instruction has been issued or not. In the present embodiment, menu selection unit 456 determines that the selection entry instruction has been issued when the indicated position output by position calculation unit 454 is within the display region of enter button 500.

It should be noted that the cancellation instruction and the selection entry instruction are not limited to those described above. For example, menu selection unit 456 may regard end of the first selection instruction and the second selection instruction as the cancellation instruction. In this case, the user can select a menu by pressing enter button 500 while indicating two positions on liquid crystal panel 240.

Alternatively, display control unit 452 may cause liquid crystal panel 240 to display a cancel key and menu selection unit 456 may regard pressing of the cancel key as the cancellation instruction. In this case, for example, menu selection unit 456 may regard end of the first selection instruction and the second selection instruction as the selection entry instruction.

When entry has not been indicated (NO in step S115), menu selection unit 456 repeats the processing from step S113.

When entry has been indicated (YES in step S115), menu selection unit 456 enters in step S117 the provisionally selected content as the selected content and outputs the selected content to first unit 1001. Specifically, menu selection unit 456 outputs the selected content to interface portion 440. Interface portion 440 outputs the selected content to interface portion 340 on the first unit 1002 side. Interface portion 340 passes the selected content to control unit 350. Control unit 350 subjects the selected content to prescribed processing.

Details of the processing performed by menu selection unit 456 in step S109 in FIG. 29 will be described with reference to FIG. 30.

In step S201, menu selection unit 456 obtains coordinates indicated by the first selection instruction (first indicated coordinates) from position calculation unit 454. The first indicated coordinates will hereinafter be referred to as (X1, Y1).

In step S203, menu selection unit 456 obtains coordinates indicated by the second selection instruction (second indicated coordinates) from position calculation unit 454. The second indicated coordinates will hereinafter be referred to as (X2, Y2).

In step S205, menu selection unit 456 finds Xmin=Min(X1, X2), Xmax=Max(X1, X2), Ymin=Min(Y1, Y2), and Ymax=Max(Y1, Y2).

In step S207, menu selection unit 456 selects a content having i=1 (i being a number specifying a content). A display image corresponding to a content having i=i will hereinafter be referred to as an ith image.

In step S209, menu selection unit 456 determines whether a display region of an ith image includes a horizontal coordinate xi satisfying Xmin≤xi≤Xmax or not.

When the display region of the ith image does not include an x coordinate xi satisfying Xmin≤xi≤Xmax (NO in step S209), menu selection unit 456 proceeds to processing in step S215.

When the display region of the ith image includes x coordinate xi satisfying Xmin≤xi≤Xmax (YES in step S209), menu selection unit 456 determines in step S211 whether the display region of the ith image includes a vertical coordinate yi satisfying Ymin≤yi≤Ymax or not.

When the display region of the ith image does not include vertical coordinate yi satisfying Ymin≤yi≤Ymax (NO in step S211), menu selection unit 456 proceeds to processing in step S215.

When the display region of the ith image includes vertical coordinate yi satisfying Ymin≤yi≤Ymax (YES in step S211), menu selection unit 456 provisionally selects a content corresponding to the ith image.

In step S215, menu selection unit 456 determines whether processing from step S209 has been performed on all is or not.

When such processing has not been performed on a certain i (NO in step S209), menu selection unit 456 increments i in step S217 (i=i+1) and repeats the processing from step S209.

When the processing from step S209 has been performed on all is (YES in step S209), menu selection unit 456 ends the content selection processing.

Here, in step S209 and step S211, whether or not any coordinates (xi, yi) included in the ith image satisfy Xmin≤xi≤Xmax and Ymin≤yi≤Ymax has been determined, however, the coordinates (xi, yi) to be used for determination are not limited thereto. The coordinates (xi, yi) should only be coordinates corresponding to the display region of the ith image. For example, menu selection unit 456 may make determination in step S209 and step S211, with the center coordinates of the ith image being assumed as (xi, yi).

Second Embodiment

Electronic device 100 according to a second embodiment has a hardware configuration and a functional configuration the same as those of electronic device 100 according to the first embodiment, however, it is different in processing performed by menu selection unit 456.

Menu selection unit 456 according to the second embodiment selects menus on a line segment having two input indicated positions at respective opposing end points while inputs of two indicated positions are simultaneously accepted.

In addition, menu selection unit 456 causes storage portion 430 to store timing of start of input of each indicated position. While inputs of three or more indicated positions are accepted, menu selection unit 456 selects menus on a polygonal line connecting the indicated positions in the order of timing of start of input corresponding to each indicated position.

Menu selection according to the second embodiment will be described with reference to FIG. 31.

FIG. 31(a) is a diagram showing a display screen on liquid crystal panel 240 when finger 900 presses a first menu (a menu denoted with (1) in the drawing). Referring to FIG. 31(a), menu selection unit 456 updates display data 434 such that the pressed menu is displayed as surrounded by a frame. By thus changing a form of display of a menu, the user can more easily grasp which menu is being pressed. It should be noted that menu selection unit 456 may update display data 434 such that the pressed menu is specifically displayed with a method other than the method of surrounding the menu with a frame.

FIG. 31(b) is a diagram showing a display screen on liquid crystal panel 240 when finger 900# presses a second menu (a menu denoted with (2) in the drawing) while finger 900 presses the first menu. Referring to FIG. 31(b), menu selection unit 456 updates display data 434 such that a row of menus having the first menu and the second menu at respective opposing ends is displayed as surrounded by a frame.

FIG. 31(c) is a diagram showing a display screen on liquid crystal panel 240 when a finger 900## presses a third menu (a menu denoted with (3) in the drawing) while finger 900 presses the first menu and finger 900# presses the second menu. Referring to FIG. 31(c), menu selection unit 456 updates display data 434 such that the row of menus having the first menu and the second menu at the respective opposing ends and a column of menus having the second menu and the third menu at respective opposing ends are displayed as surrounded by a frame.

FIG. 31 shows an example where menu selection unit 456 selects menus aligned in a horizontal direction or a vertical direction. Menu selection unit 456 according to the present embodiment, however, may select menus aligned diagonally, depending on indicated positions.

Thus, according to electronic device 100 in the present embodiment, the user can select menus in a pattern in such a shape as L or the like. In particular, electronic device 100 according to the present embodiment allows the user to readily collectively select menus aligned on a straight line.

In addition, in the present embodiment, menu selection unit 456 provides each provisionally selected menu with a number sequentially from one end point of a polygonal line to the other end point thereof. In the example shown in FIG. 31(c), menu selection unit 456 provides each menu with a number in such an order as the menu denoted with (1)→ . . . →the menu denoted with (2)→ . . . →the menu denoted with (3).

In any of FIG. 31(c), menu selection unit 456 selects a menu surrounded by a frame when enter button 500 is pressed, and outputs the selected menu together with the number. Control unit 350 on the first unit 1001 side receives the output menu through interface portion 440 and interface portion 340.

Control unit 350 on the first unit 1001 side causes output portion 320 to output each menu in a manner based on the number. For example, display control unit 352 included in control unit 350 causes display portion 322 to display each menu in the order of the number.

The user can determine a manner of output of menus by output portion 320, based on the order of selection of the menus displayed on liquid crystal panel 240. Therefore, convenience in user's menu selection can be improved.

One example of a manner of output of menus by output portion 320 will be described with reference to FIG. 32.

Figure 32:
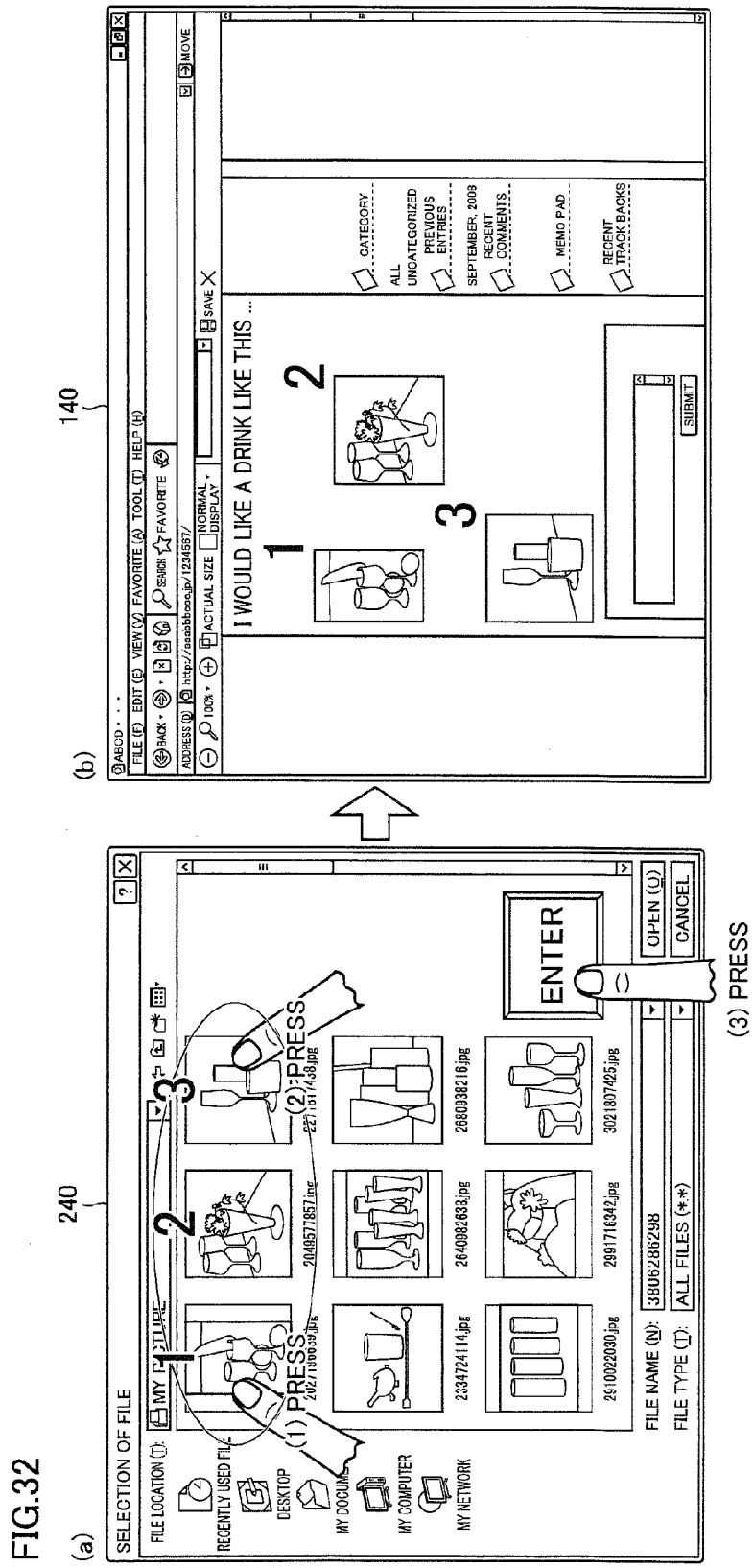
FIG. 32 is a diagram for illustrating a case where a menu selection method according to the second embodiment is used for creation of a blog entry.

FIG. 32 is a diagram for illustrating a case where the menu selection method according to the present embodiment is used for creation of a blog entry.

FIG. 32(a) is a diagram showing a screen for selecting a file to be inserted in a blog entry. Liquid crystal panel 240 displays thumbnail images of a plurality of image files. When the user presses two thumbnail images, menu selection unit 456 provisionally selects a plurality of thumbnail images based on positions pressed by the user. Here, menu selection unit 456 provides an image at the left end in an uppermost row with a number 1, an image in the center in the uppermost row with a number 2, and an image at the right end in the uppermost row with a number 3 based on the timing of start of input.

FIG. 32(b) is a diagram showing a display screen of display portion 322 (that is, liquid crystal panel 140) on the first unit 1001 side when the enter button is pressed while the plurality of thumbnail images are provisionally selected in FIG. 32(a). A blog creation application embeds the selected thumbnail images in the blog entry sequentially from upper left in accordance with the number. Liquid crystal panel 140 displays the created blog entry.

Figure 33:
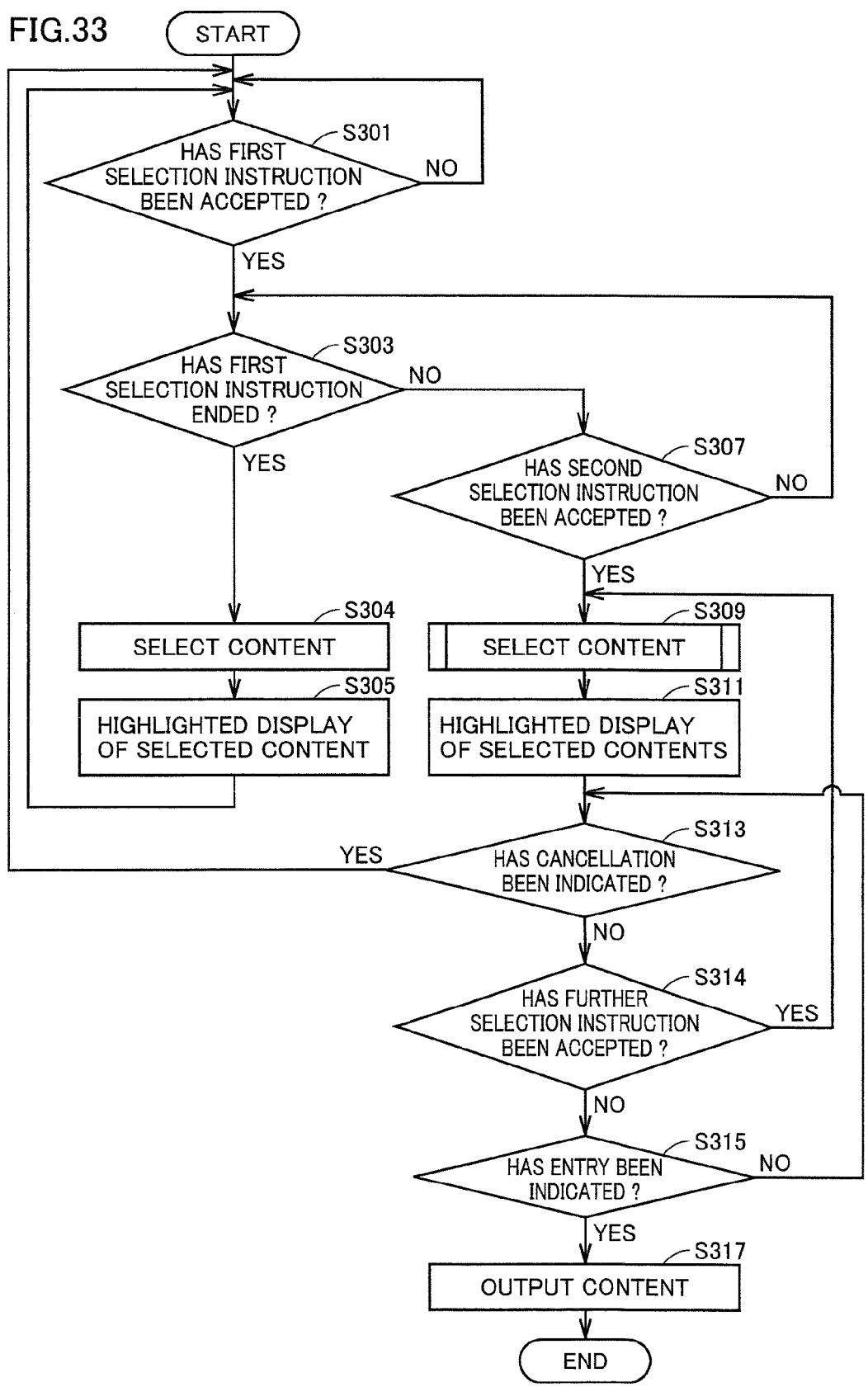
FIG. 33 is a diagram showing in a flowchart form, a flow of processing performed by menu selection unit 456 according to the second embodiment.

Flow of processing performed by menu selection unit 456 according to the second embodiment will be described with reference to FIG. 33. Though content selection processing will be described here, this description is also applicable to general menu selection processing.

Figure 29:
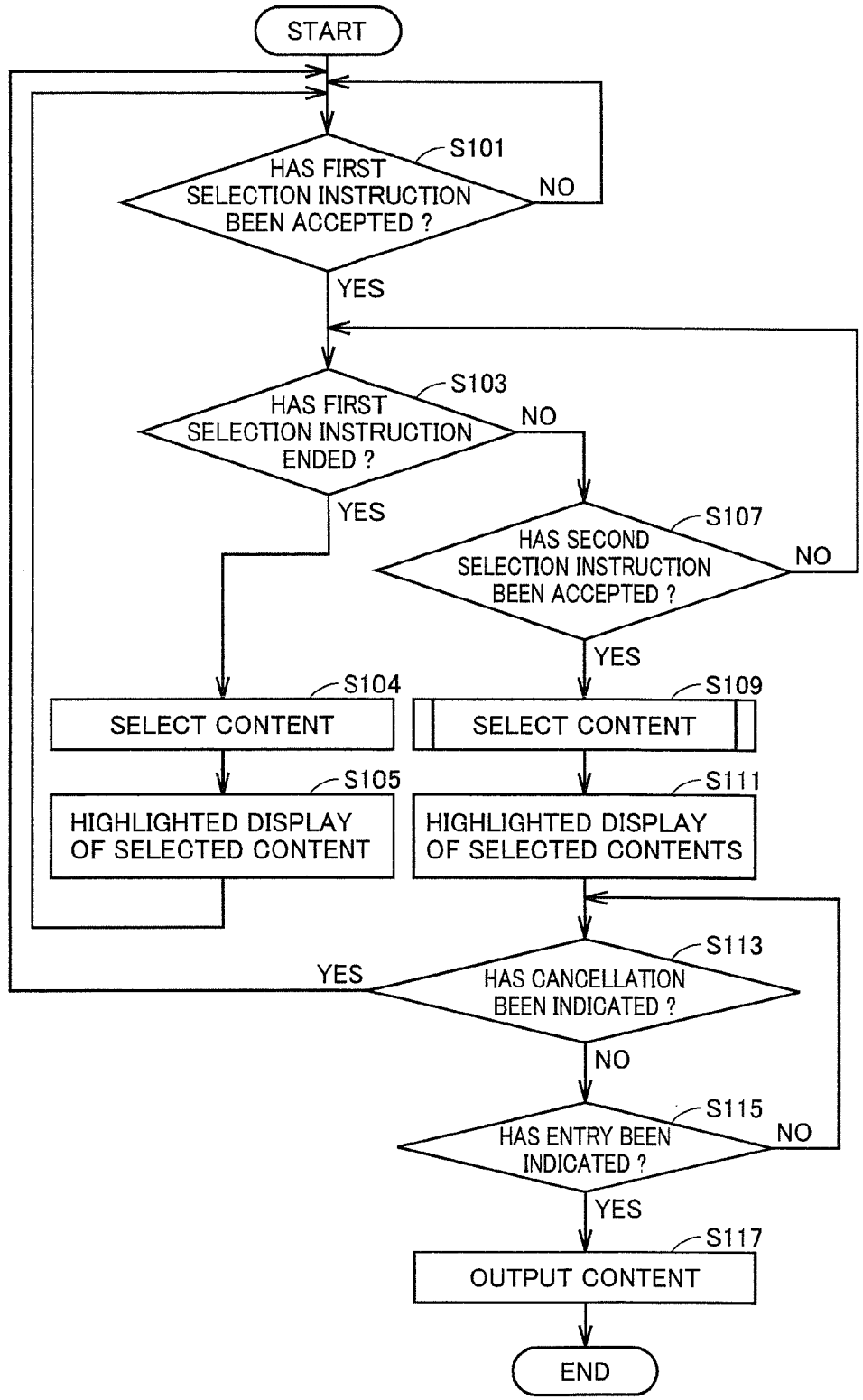
FIG. 29 is a diagram showing in a flowchart form, a flow of processing performed by a menu selection unit 456 according to the first embodiment.
Figure 30:
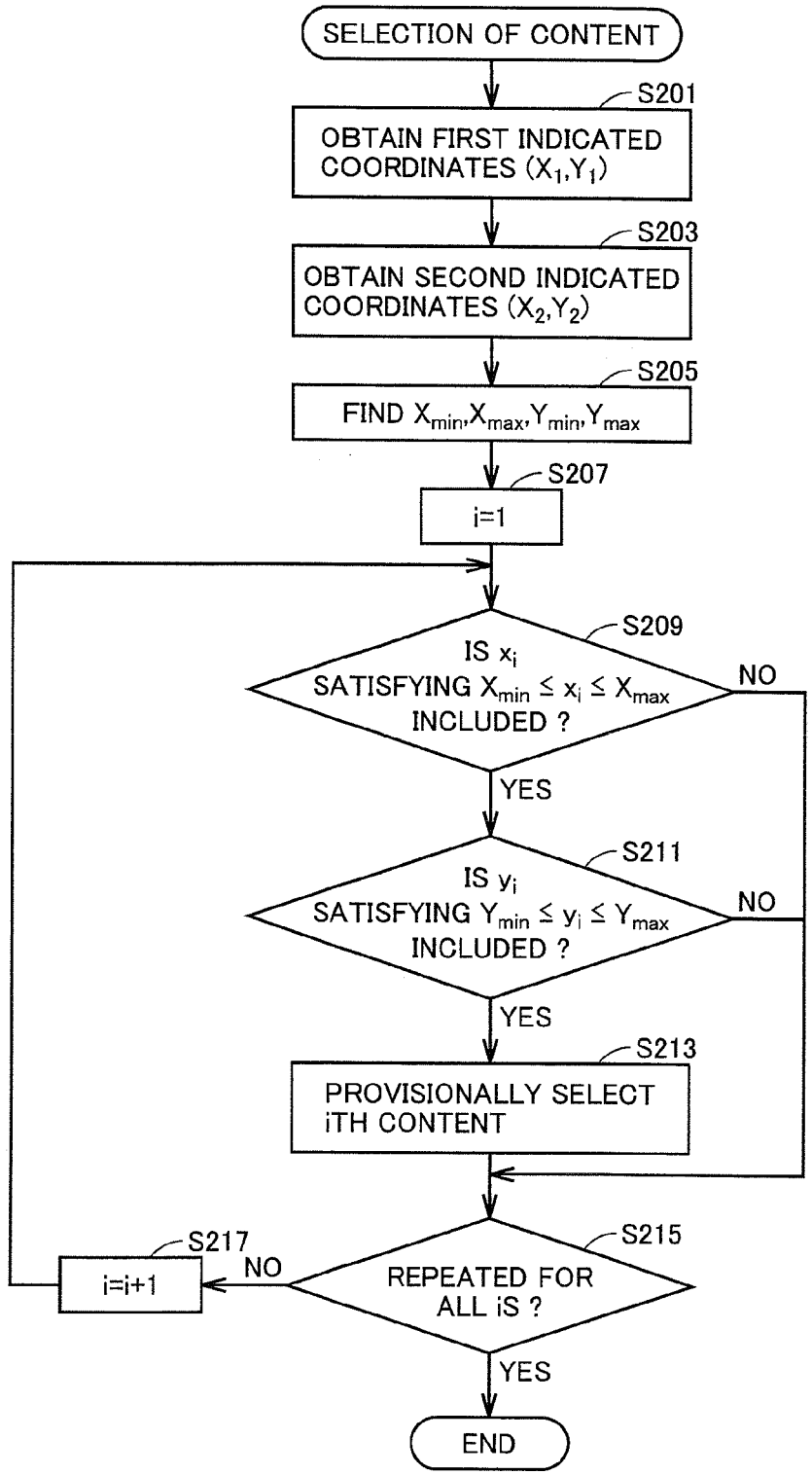
FIG. 30 is a diagram showing in a flowchart form, a flow of content selection processing performed by menu selection unit 456 according to the first embodiment.

Since the processing from step S301 to step S307 is the same as the processing from step S101 to step S107 in FIG. 29 described in the first embodiment, description thereof will not be repeated. Based on such processing or determination, menu selection unit 456 can perform single-selection.

In step S309, menu selection unit 456 provisionally selects a content. Details of step S309 will be described later.

In step S311, menu selection unit 456 provides highlighted display of the contents provisionally selected in step S109.

In step S313, menu selection unit 456 determines whether cancellation of provisional selection has been indicated or not. For example, menu selection unit 456 regards pressing again of a selected content as the instruction to cancel provisional selection. Alternatively, menu selection unit 456 may regard end of second and subsequent selection instructions (including the second one) as the instruction to cancel that selection instruction.

When cancellation has been indicated (YES in step S313), menu selection unit 456 cancels provisional selection in response to the cancellation instruction and repeats the processing from step S301.

In step S314, menu selection unit 456 determines whether a further selection instruction has been accepted or not.

When the further selection instruction has been accepted (YES in step S314), menu selection unit 456 repeats the processing from step S309.

When a further selection instruction has not been accepted (NO in step S314), menu selection unit 456 determines in step S315 whether the selection entry instruction has been issued or not. In the present embodiment, menu selection unit 456 determines that the selection entry instruction has been issued when the indicated position output from position calculation unit 454 is within the display region of enter button 500.

It should be noted that the cancellation instruction and the selection entry instruction are not limited to those described above, as in the first embodiment.

When entry has not been indicated (NO in step S315), menu selection unit 456 repeats the processing from step S313.

When entry has been indicated (YES in step S315), in step S317, menu selection unit 456 enters the provisionally selected contents as the selected contents and outputs the selected contents to first unit 1001. Specifically, menu selection unit 456 outputs the selected contents to interface portion 440. Interface portion 440 outputs the selected contents to interface portion 340 on the first unit 1002 side. Interface portion 340 passes the selected contents to control unit 350. Control unit 350 subjects the selected contents to prescribed processing.

Figure 34:
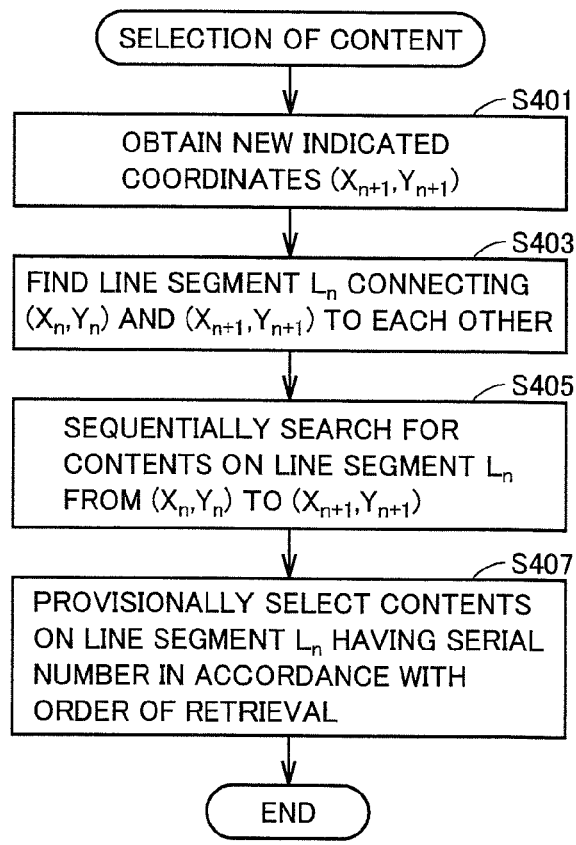
FIG. 34 is a diagram showing in a flowchart form, a flow of content selection processing performed by menu selection unit 456 according to the second embodiment.

Details of the processing performed by menu selection unit 456 in step S309 in FIG. 33 will be described with reference to FIG. 34.

In step S401, menu selection unit 456 obtains most recently indicated coordinates (Xn+1, Yn+1). Here, n is an integer not smaller than 1 representing an order of the indicated coordinate.

In step S403, menu selection unit 456 finds a line segment Ln connecting (Xn, Yn) and (Xn+1, Yn+1) to each other.

In step S405, menu selection unit 456 sequentially searches for contents on line segment Ln from (Xn, Yn) to (Xn+1, Yn+1). Specifically, for example, menu selection unit 456 retrieves a content having any coordinates (xi, yi) included in a display image corresponding to a content coinciding with coordinates on line segment Ln, as the content on line segment Ln.

In step S407, menu selection unit 456 provisionally selects the contents on line segment Ln provided with serial numbers in accordance with the order of retrieval. Menu selection unit 456 sets the provisionally selected contents as new provisionally selected contents, in addition to the contents provisionally selected so far.

Third Embodiment

Electronic device 100 according to a third embodiment has a hardware configuration and a functional configuration the same as those of electronic device 100 according to the first embodiment, however, it is different in contents in display data 434 and processing performed by menu selection unit 456.

In the third embodiment, display data 434 includes data on the order of display of menus. When menu selection unit 456 is simultaneously accepting inputs of two indicated positions, menu selection unit 456 selects menus having menus corresponding to the two input indicated positions at respective opposing ends and having a consecutive order of display.

Menu selection according to the third embodiment will be described with reference to FIGS. 35A to 35C.

Figure 35A:
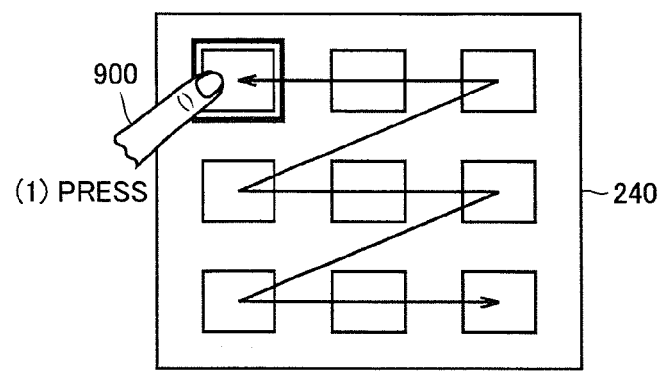
FIG. 35A is a first diagram for illustrating menu selection according to a third embodiment.

FIG. 35A is a diagram showing a display screen on liquid crystal panel 240 when finger 900 presses a first menu. Referring to FIG. 35A, menu selection unit 456 updates display data 434 such that a pressed menu is displayed as surrounded by a frame.

FIG. 35A also shows an arrow indicating flow of the order of display of menus. The order of display sequentially increases or decreases from one end to the other end of the arrow. Though the order of display extends along a lateral direction here, the order of display is not limited thereto, and for example, the order of display may extend along the lateral direction.

Figure 35B:
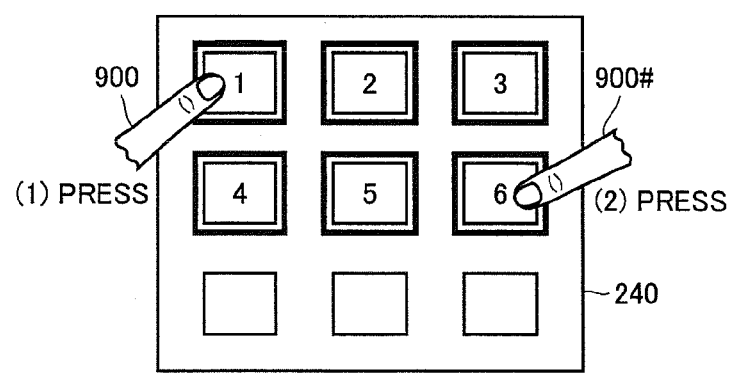
FIG. 35B is a second diagram for illustrating menu selection according to the third embodiment.

FIG. 35B is a diagram showing a display screen on liquid crystal panel 240 when finger 900# presses a second menu while finger 900 presses the first menu. Referring to FIG. 35B, menu selection unit 456 updates display data 434 such that menus having the first menu and the second menu at respective opposing ends and having a consecutive order of display are displayed as each surrounded by a frame.

In addition, menu selection unit 456 provides each content with a number in line with the flow of the order of display (1 to 6 in the drawing) from the first menu toward the second menu. It is assumed that menu selection unit 456 provides each content with a number from a menu earlier in timing of start of a corresponding selection instruction toward another menu. For example, in a case where the timing of start of input by finger 900 and the timing of start of input by finger 900# are opposite in FIG. 35B, numbers 1 to 6 in the drawing change to numbers 6 to 1 respectively.

By thus providing numbers in consideration of the timing of start of instruction, menu selection unit 456 can select a menu further in accordance with the user's intention, because the menu first selected by the user is often expected to be a menu which the user preferentially desired to select.

Figure 35C:
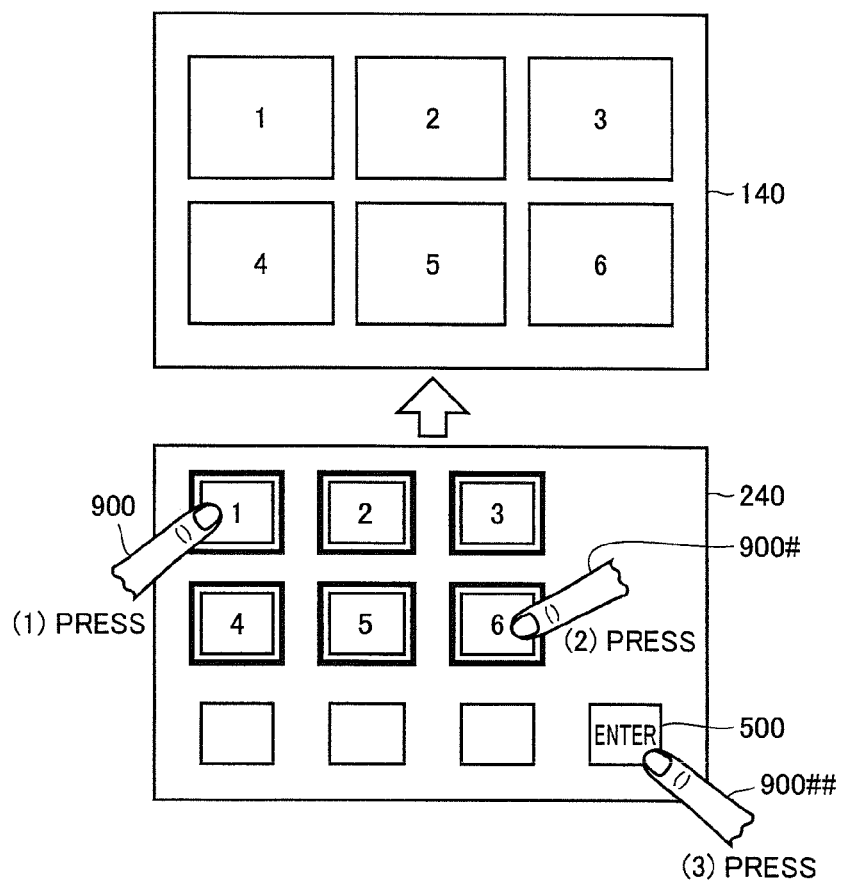
FIG. 35C is a third diagram for illustrating menu selection according to the third embodiment.

FIG. 35C is a diagram showing a display screen on liquid crystal panel 240 when finger 900## presses enter button 500 while finger 900 presses the first menu and finger 900# presses the second menu. It should be noted that FIGS. 35A and 35B show liquid crystal panel 240 without showing a display region of enter button 500.

Menu selection unit 456 enters the provisionally selected menus as the selected menus and outputs the selected menus to interface portion 440. Interface portion 440 that has accepted the selected menus sends the selected menus to interface portion 340 on the first unit 1001 side.

Control unit 350 on the first unit 1001 side subjects the selected menus to prescribed processing. Here, control unit 350 performs processing in accordance with the number provided to each selected menu. FIGS. 35A to 35C each show an example where control unit 350 causes display portion 322 to display the selected menus in the order in accordance with the number.

From now on, flow of processing performed by menu selection unit 456 will be described. Here, though content selection processing will be described, this description is also applicable to general menu selection processing.

Since brief flow of the processing performed by menu selection unit 456 is the same as described with reference to FIG. 29 in the first embodiment, description thereof will not be repeated. It should be noted that menu selection unit 456 is different from the first embodiment in processing performed in step S109 in FIG. 29 (selection of a content).

Figure 36:
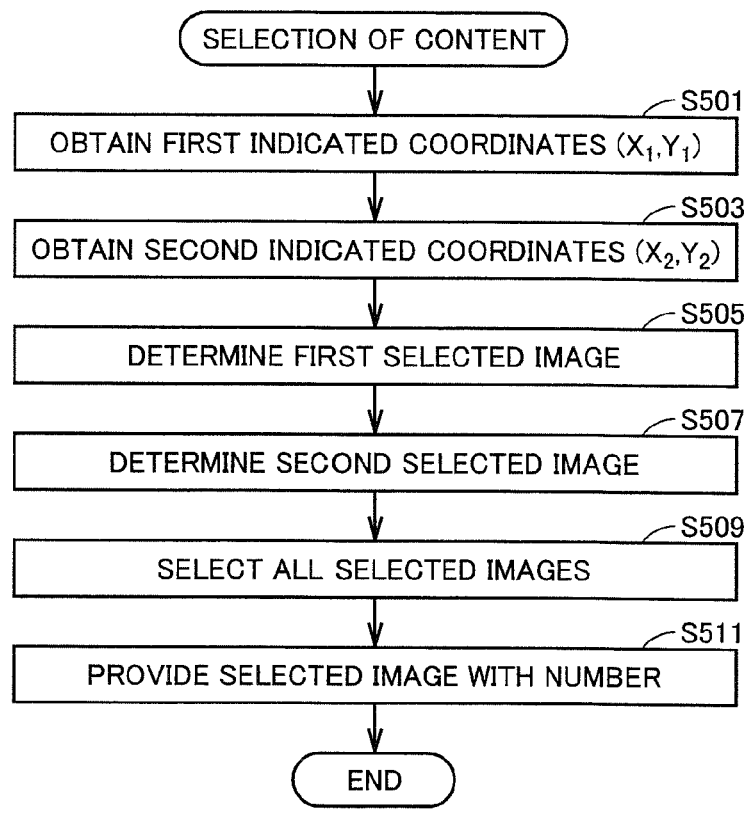
FIG. 36 is a diagram showing in a flowchart form, a flow of content selection processing performed by menu selection unit 456 according to the third embodiment.

Details of the content selection processing performed by menu selection unit 456 according to the third embodiment will be described with reference to FIG. 36.

In step S501, menu selection unit 456 obtains first indicated coordinates (X1, Y1).

In step S503, menu selection unit 456 obtains second indicated coordinates (X2, Y2).

In step S505, menu selection unit 456 selects a first selected image corresponding to first indicated coordinates. Specifically, for example, menu selection unit 456 determines as a selected image, a content corresponding to a display image including coordinates (xi, yi) coinciding with first indicated coordinates (X1, Y1).

In step S507, menu selection unit 456 selects a second selected image corresponding to second indicated coordinates. Specifically, for example, menu selection unit 456 determines as a selected image, a content corresponding to a display image including coordinates (xi, yi) coinciding with second indicated coordinates (X2, Y2).

In step S509, menu selection unit 456 determines as selected images, all display images having the first selected image and the second selected image at respective opposing ends and having a consecutive order of display.

In step S511, menu selection unit 456 provides the selected images with numbers in line with the flow of the order of display. In particular, in the present embodiment, menu selection unit 456 sequentially provides each selected image with a number from the first selected image earlier in timing of start of input toward the second selected image.

Fourth Embodiment

Electronic device 100 according to a fourth embodiment can set an anchor for selecting a plurality of menus. In addition, electronic device 100 according to the fourth embodiment allows scrolling of the screen. These operations will be described in detail below. It should be noted that, since electronic device 100 according to the fourth embodiment has a hardware configuration and a functional configuration (except for a function of menu selection unit 456) the same as those in the first embodiment, description thereof will not be repeated.

Menu selection unit 456 selects a menu basically similarly to menu selection unit 456 according to the third embodiment. Namely, when instructions to select two different menus are simultaneously issued, menus having the two indicated menus at respective opposing ends and having a consecutive order of display are provisionally selected. It should be noted that menu selection unit 456 according to the present embodiment is different from menu selection unit 456 according to the third embodiment in the following points.

When a plurality of indicated positions are simultaneously included in a display region of one menu, menu selection unit 456 sets an anchor for the menu. When anchors are set for the two respective different menus, menu selection unit 456 provisionally selects a plurality of menus having the two menus each having the anchor set at respective opposing ends and having a consecutive order of display.

Figure 37:
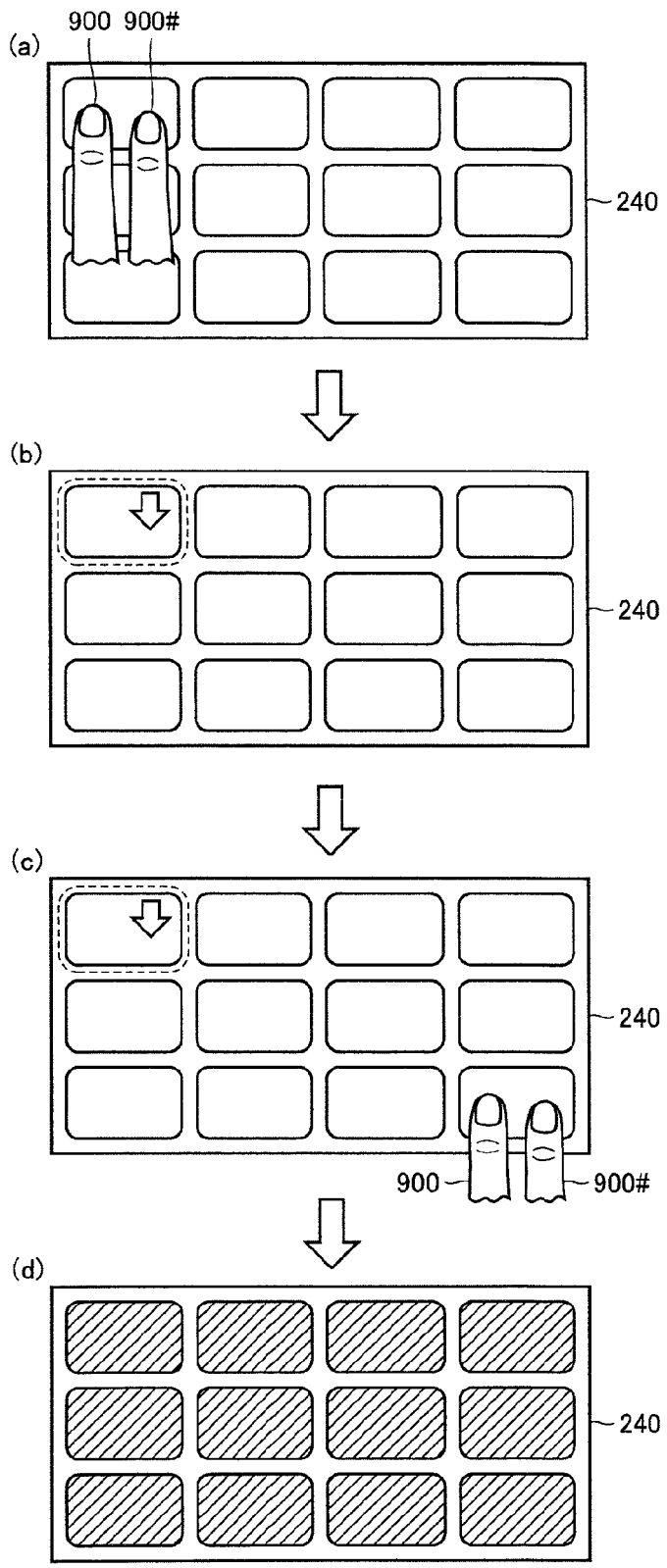
FIG. 37 is a diagram for illustrating anchor setting.

Selection of a menu using an anchor will be described with reference to FIG. 37. FIG. 37(*a*) is a diagram showing a state where finger 900 and finger 900# touched one menu displayed on liquid crystal panel 240. In response to this operation, menu selection unit 456 sets an anchor for the menu.

FIG. 37(*b*) is a diagram showing a display screen on liquid crystal panel 240 after menu selection unit 456 set the anchor for the menu. Menu selection unit 456 updates display data 434 such that the menu having the anchor set is specifically displayed. Here, the menu having the anchor set is surrounded by a dotted line and an arrow is drawn over the menu. Even when finger 900 and finger 900# moved away from the menu having the anchor set, menu selection unit 456 does not cancel anchor setting for the menu.

FIG. 37(c) is a diagram showing a state where finger 900 and finger 900# touched one menu displayed on liquid crystal panel 240 but not having an anchor set.

In response to this operation, menu selection unit 456 provisionally selects a plurality of menus having the two menus each having the anchor set at respective opposing ends and having a consecutive order of display. FIG. 37(d) shows menus provisionally selected by menu selection unit 456. Here, menu selection unit 456 provisionally selects all menus displayed on liquid crystal panel 240. It should be noted that menu selection unit 456 may provide the provisionally selected menus with numbers in accordance with the order of display, as in the third embodiment.

In addition, menu selection unit 456 causes scroll of the display screen when continuous movement of the indicated position, what is called a drag operation, is carried out. Namely, when menu selection unit 456 receives temporally continuous inputs of indicated positions from position calculation unit 454, menu selection unit 456 causes scroll of the display screen by a moved amount based on displacement of the input indicated position.

Scrolling will be described with reference to FIG. 38. FIG. 38(a) is a diagram for illustrating a display screen on liquid crystal panel 240 when finger 900 presses one menu (shown as surrounded by a frame in the drawing). Finger 900 presses a menu in a lower portion within liquid crystal panel 240 in FIG. 38.

FIG. 38(b) is a diagram for illustrating a display screen on liquid crystal panel 240 when the user slides finger 900 from the position in FIG. 38(a) to a position shown with a dotted line in FIG. 38(a) over liquid crystal panel 240. In response to movement upward of finger 900, menu selection unit 456 causes the display screen to scroll downward. Namely, menu selection unit 456 updates display data 434 such that liquid crystal panel 240 displays menus located below the menus displayed in FIG. 38(a). The user feels as if the menu pressed with his/her finger 900 were pulled upward with movement of finger 900.

Similarly, when finger 900 moves downward, menu selection unit 456 causes the display screen to scroll upward. In addition, menu selection unit 456 may cause scroll in a left/right direction.

According to electronic device 100 in the present embodiment, even if all menus are not included in liquid crystal panel 240, the user can select an appropriate menu by performing scrolling.

Figure 39:
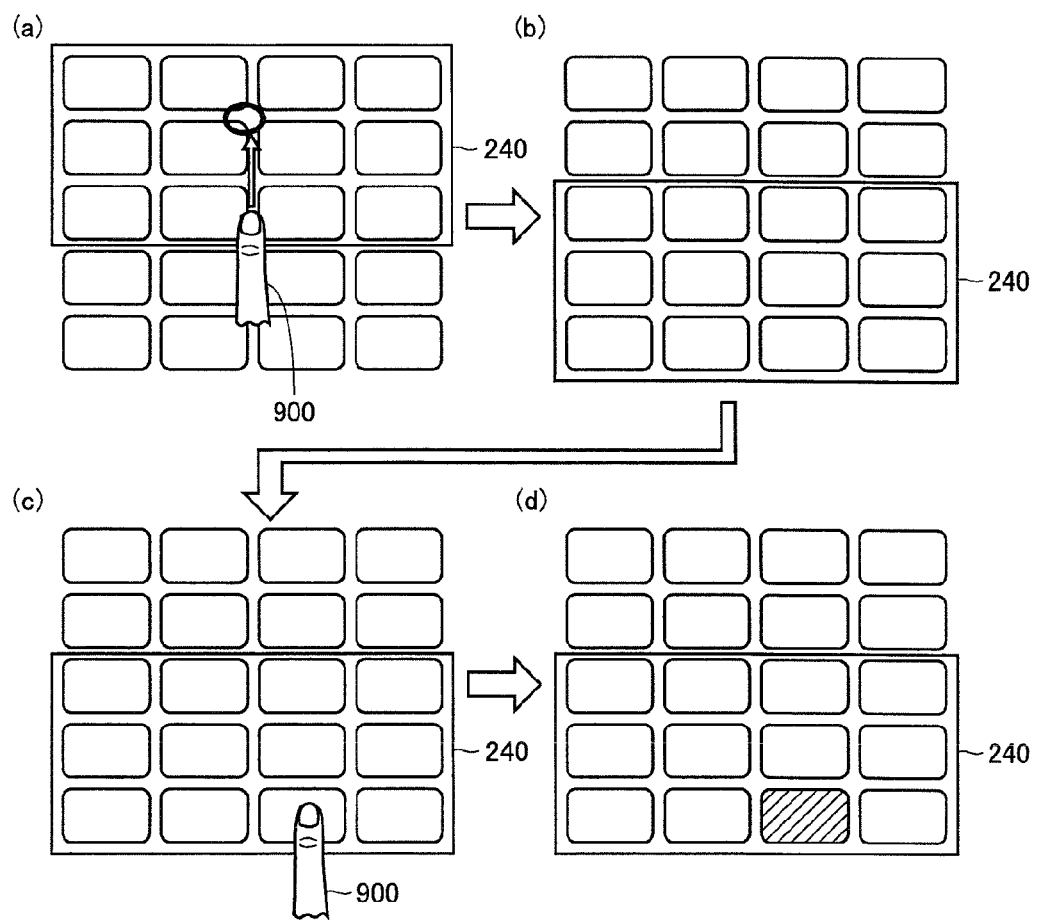
FIG. 39 is a first diagram for illustrating menu selection, with anchor setting and scrolling being combined.
Figure 40:
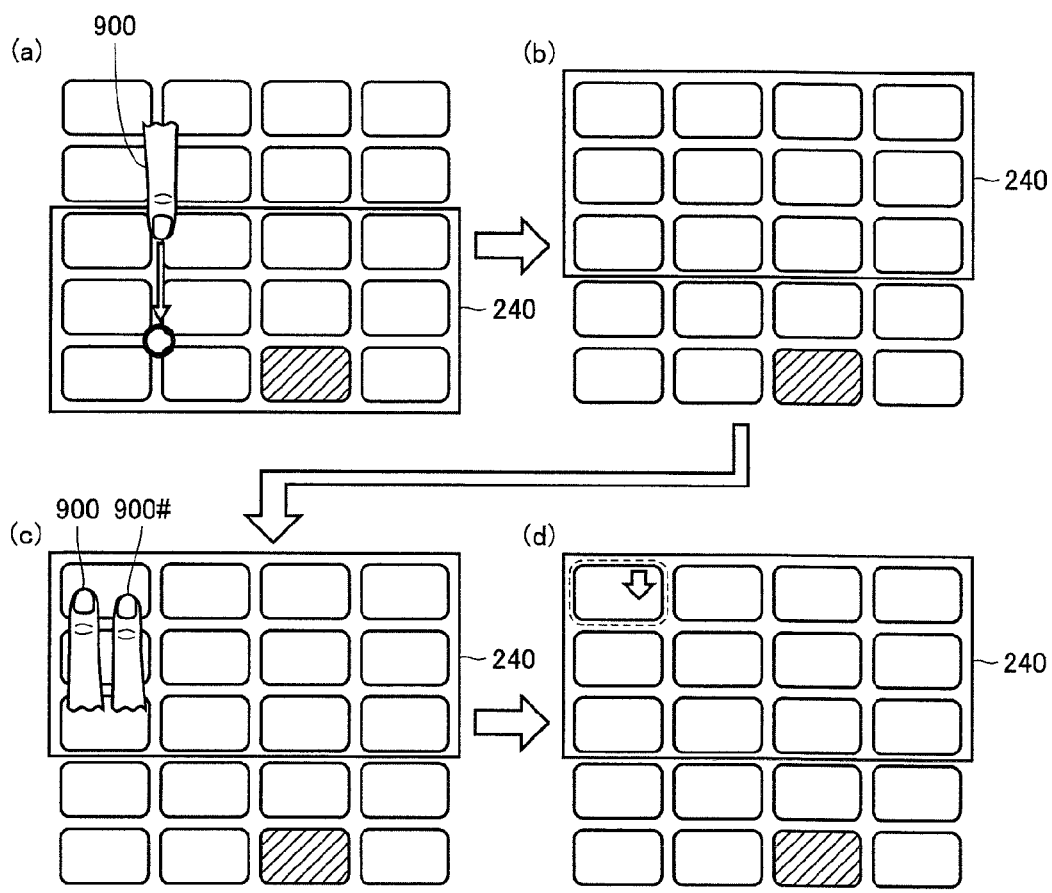
FIG. 40 is a second diagram for illustrating menu selection, with anchor setting and scrolling being combined.
Figure 41:
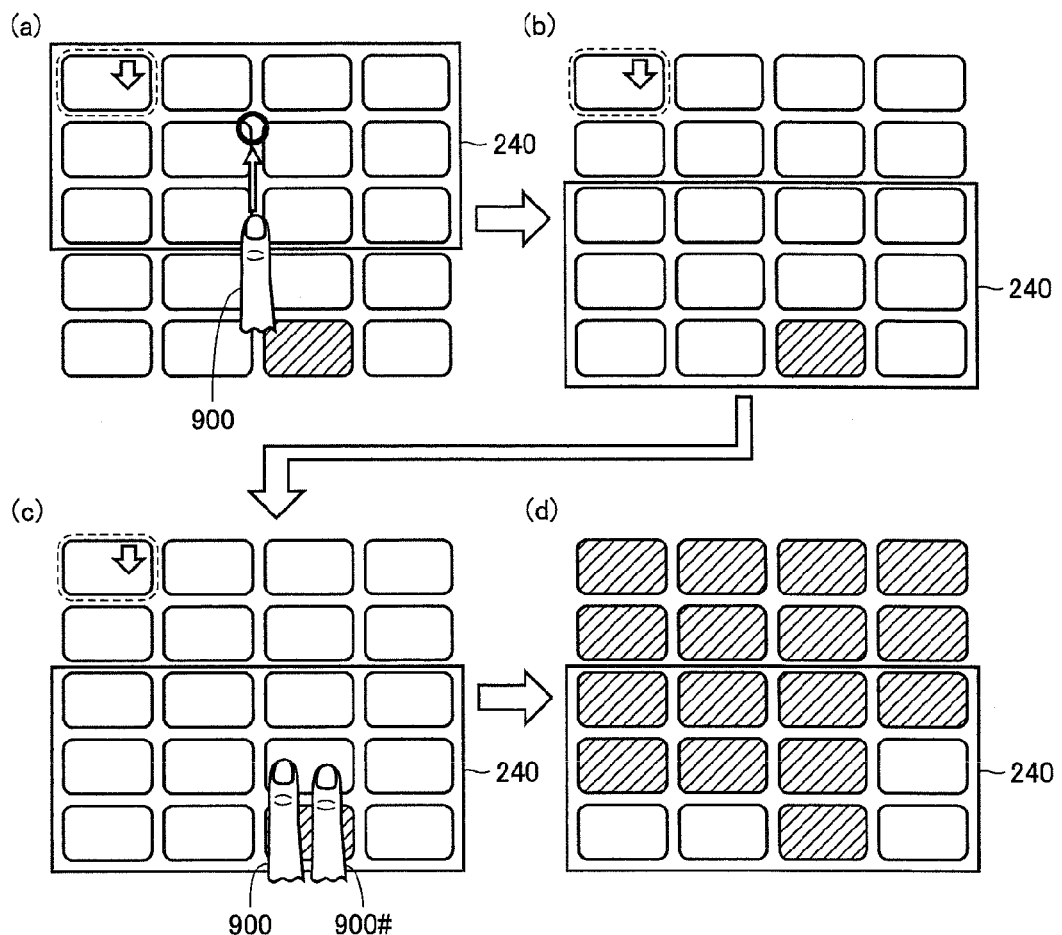
FIG. 41 is a third diagram for illustrating menu selection, with anchor setting and scrolling being combined.

Moreover, menu selection unit 456 can carry out anchor setting and scrolling as combined. One example of such a menu selection operation will be described with reference to FIGS. 39 to 41.

FIG. 39(a) is a diagram showing a manner in which the user drags finger 900 from a lower portion to an upper portion of the display screen over liquid crystal panel 240. FIG. 39(b) is a diagram showing a display screen after dragging in FIG. 39(a). The display screen scrolls downward. FIG. 39(c) is a diagram showing a manner in which the user presses one menu within the display screen after scrolling with his/her finger 900. FIG. 39(d) is a diagram showing a display screen when the user moved finger 900 off the menu. Menu selection unit 456 carries out single-selection of one menu.

FIG. 40(a) is a diagram showing a manner in which the user drags finger 900 from the upper portion to the lower portion of the display screen over liquid crystal panel 240 in the state shown in FIG. 39(d). FIG. 40(b) is a diagram showing a display screen after dragging in FIG. 40(a). The display screen scrolls upward. FIG. 40(c) is a diagram showing a manner in which the user presses one menu within the display screen after scrolling with finger 900 and finger 900#. FIG. 40(d) is a diagram showing a display screen after the user pressed the menu with finger 900 and finger 900#. Menu selection unit 456 sets an anchor for the menu pressed with finger 900 and finger 900#.

FIG. 41(a) is a diagram showing a manner in which the user drags finger 900 from the lower portion to the upper portion of the display screen over liquid crystal panel 240 in the state shown in FIG. 40(d). FIG. 41(b) is a diagram showing a display screen after dragging in FIG. 41(a). The display screen scrolls downward. FIG. 41(c) is a diagram showing a manner in which the user presses one menu (not having an anchor set) within the display screen after scrolling with finger 900 and finger 900#. FIG. 41(d) is a diagram showing a display screen after the user pressed the menu with finger 900 and finger 900#. Menu selection unit 456 provisionally selects menus lying between the menus each having the anchor set.

Based on such combination of anchor setting and scrolling, the user can simultaneously select menus within a range not included in one screen of liquid crystal panel 240.

Figure 42:
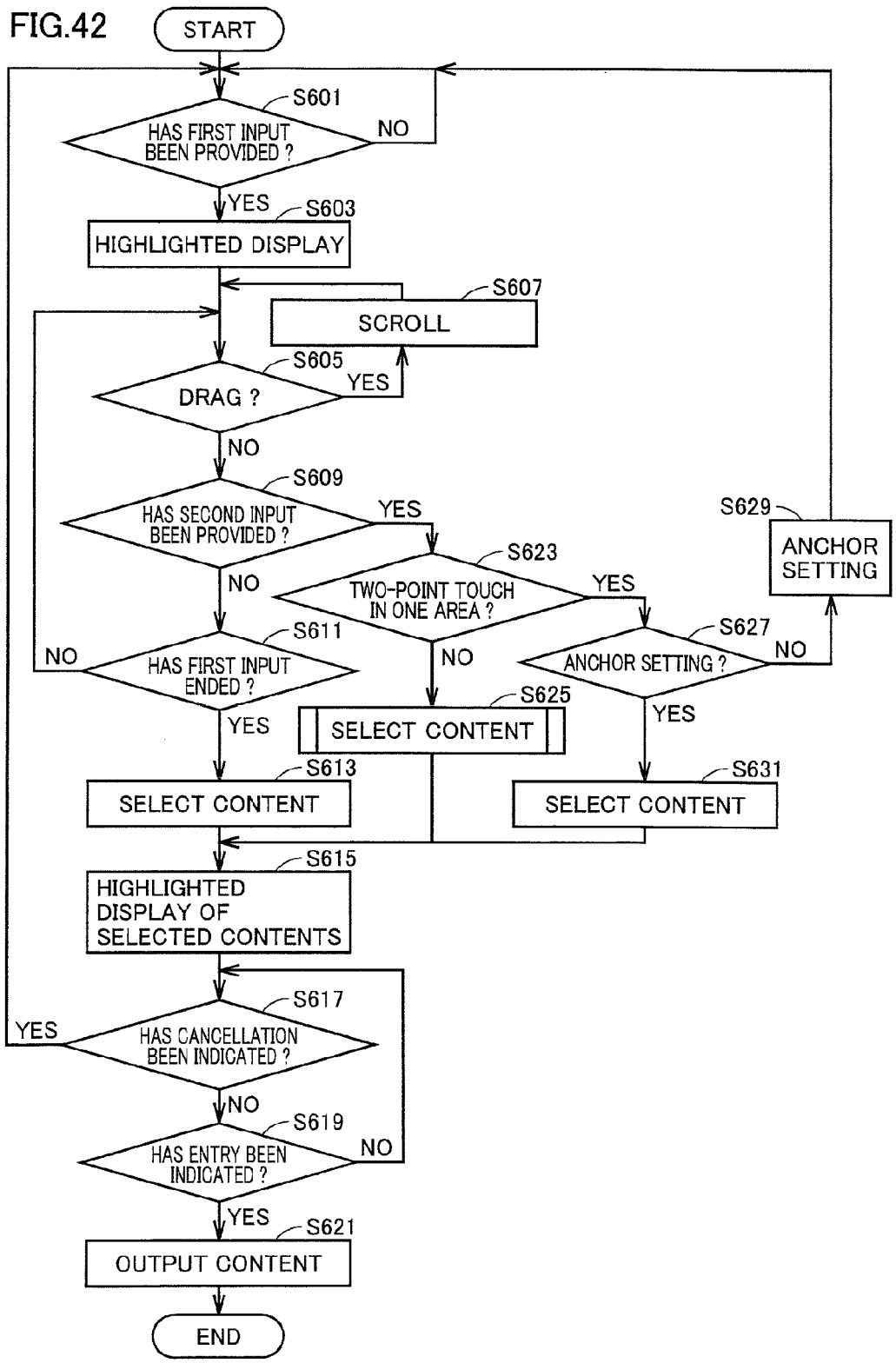
FIG. 42 is a diagram showing in a flowchart form, a flow of content selection processing performed by menu selection unit 456 according to a fourth embodiment.

From now on, flow of processing performed by menu selection unit 456 will be described with reference to FIG. 42.

Here, though processing for selecting a content such as a thumbnail image will be described, this description is also applicable to general processing for selecting a menu.

In step S601, menu selection unit 456 determines whether a first selection instruction (for the sake of brevity, referred to as a first input in the drawing) has been accepted from position calculation unit 454 or not.

When it is determined that the first selection instruction has not been accepted (NO in step S601), menu selection unit 456 repeats the processing in step S601.

When it is determined that the first selection instruction has been accepted (YES in step S601), menu selection unit 456 provides in step S603, highlighted display of a content corresponding to the first selection instruction.

In step S605, menu selection unit 456 determines whether a drag operation has been performed or not. When indicated positions output from position calculation unit 454 are temporally continuous and the indicated positions move, menu selection unit 456 determines that the drag operation has been performed.

When it is determined that the drag operation has been performed (YES in step S605), menu selection unit 456 causes in step S607 the display screen to scroll by a moved amount based on difference in the indicated position.

When it is determined that the drag operation has not been performed (NO in step S605), menu selection unit 456 determines in step S609 whether a second selection instruction (a second input in the drawing) has been issued or not.

When it is determined that the second selection instruction has not been issued (NO in step S609), menu selection unit 456 determines in step S611 whether the first selection instruction has ended or not.

When it is determined that the first selection instruction has not ended (NO in step S611), menu selection unit 456 repeats the processing from step S605.

When it is determined that the first selection instruction has ended (YES in step S611), in step S613, menu selection unit 456 provisionally selects a content corresponding to the first selection instruction. Thereafter, menu selection unit 456 proceeds to the processing in step S615 and subsequent steps. The processing in step S615 and subsequent steps will be described later.

On the other hand, when it is determined that the second selection instruction has been input (YES in step S609), menu selection unit 456 determines in step S623 whether two points in a display region corresponding to one content (one area) have been touched or not. Namely, menu selection unit 456 determines whether the positions indicated by the first selection instruction and the second selection instruction are included in one common area or not.

When it is determined that two points in one area have not been touched (NO in step S623), menu selection unit 456 provisionally selects a content in step S625. In step S625, menu selection unit 456 performs the processing the same as described with reference to FIG. 36 in the third embodiment. Thereafter, menu selection unit 456 proceeds to the processing in step S615 and subsequent steps. The processing in step S615 and subsequent steps will be described later.

On the other hand, when it is determined that two points in one area have been touched (YES in step S623), menu selection unit 456 determines in step S627 whether a content other than the content corresponding to the area in which two points have been touched has an anchor set or not.

When another content does not have an anchor set (NO in step S627), menu selection unit 456 sets in step S629 an anchor for the content corresponding to the area in which two points have been touched. Subsequently, menu selection unit 456 repeats the processing from step S601.

When another content has an anchor set (YES in step S627), menu selection unit 456 provisionally selects in step S631, a content lying between the content having the anchor already set and the content corresponding to the area in which two points have been touched. Thereafter, menu selection unit 456 proceeds to the processing in step S615 and subsequent steps.

In step S615, menu selection unit 456 provides highlighted display of the provisionally selected contents.

In step S617, menu selection unit 456 determines whether cancellation of provisional selection has been indicated or not. For example, menu selection unit 456 regards pressing again of a provisionally selected content as an instruction to cancel provisional selection.

When cancellation has been indicated (YES in step S617), menu selection unit 456 cancels provisional selection in response to the cancellation instruction and repeats the processing from step S601.

When cancellation has not been indicated (NO in step S617), menu selection unit 456 determines in step S619 whether a selection entry instruction has been issued or not. For example, menu selection unit 456 determines that a selection entry instruction has been issued when the indicated position output from position calculation unit 454 is within the display region of enter button 500.

When entry has not been indicated (NO in step S619), menu selection unit 456 repeats the processing from step S617.

When entry has been indicated (YES in step S619), in step S621, menu selection unit 456 enters the provisionally selected contents as the selected contents and outputs the selected contents to first unit 1001. Specifically, menu selection unit 456 outputs the selected contents to interface portion 440. Interface portion 440 outputs the selected contents to interface portion 340 on the first unit 1002 side. Interface portion 340 passes the selected contents to control unit 350. Control unit 350 subjects the selected contents to prescribed processing. Here, control unit 350 may perform the processing on the selected contents in accordance with the numbers corresponding to the order of display provided to the respective selected contents.

Fifth Embodiment

In the third embodiment and the fourth embodiment, description has been given assuming that the order of entry for entering selection of menus within the display screen is fixed. In contrast, electronic device 100 according to a fifth embodiment can switch this order of entry.

Since electronic device 100 according to the fifth embodiment has a hardware configuration and a functional configuration (except for menu selection unit 456) the same as those in other embodiments, description thereof will not be repeated.

Figure 43:
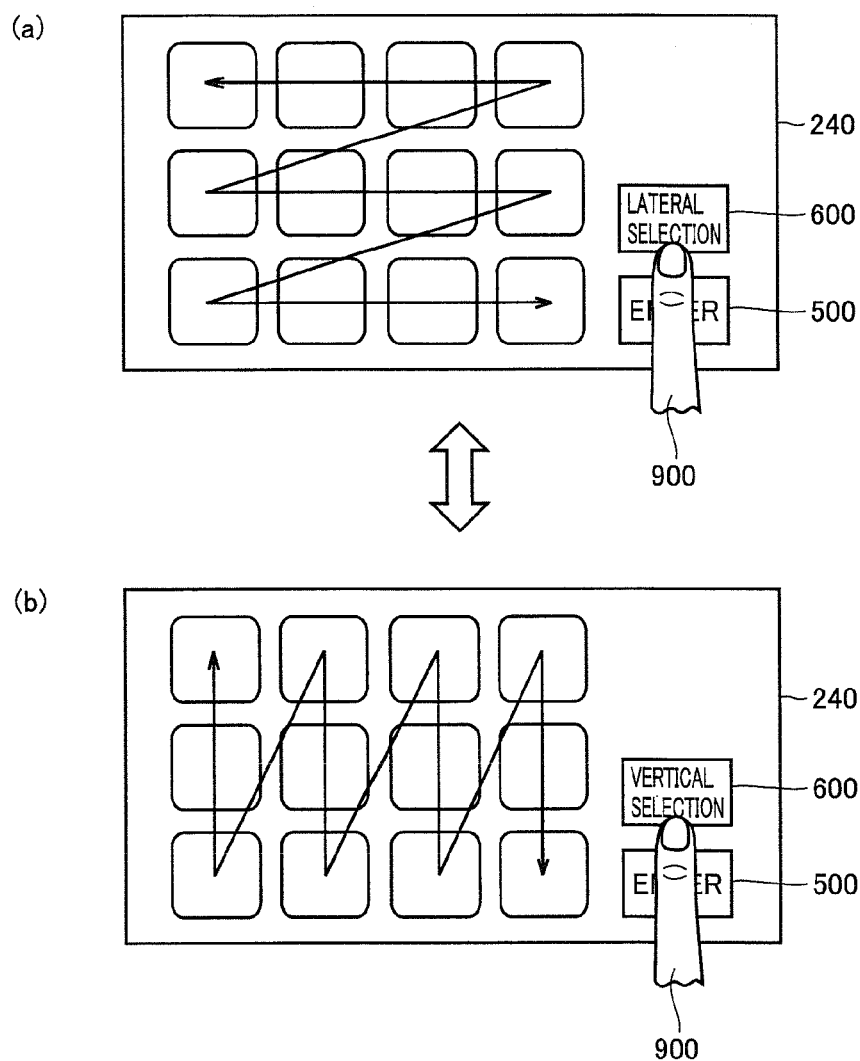
FIG. 43 is a diagram for illustrating switching of an order of entry.

Switching of the order of entry will be described with reference to FIG. 43. Referring to FIG. 43, menu selection unit 456 causes liquid crystal panel 240 to display a switch button 600. Switch button 600 shows a current order of entry.

FIG. 43(*a*) is a diagram for illustrating an order of entry when the order of entry is set to "lateral selection". Here, the order of entry is the same as shown in FIG. 35A.

FIG. 43(*b*) is a diagram for illustrating an order of entry when the order of entry is set to "vertical selection". In vertical selection, menu selection unit 456 provides a selected menu with a number along an arrow in FIG. 43(*b*).

When finger 900 presses switch button 600 in the state shown in FIG. 43(*a*) (in lateral selection), the order of entry switches to vertical selection. When finger 900 presses switch button 600 in the state shown in FIG. 43(*b*) (in vertical selection), the order of entry switches to lateral selection.

According to electronic device 100 in the present embodiment, menus can be selected in various patterns by switching the order of entry, which will be described with reference to FIGS. 44 and 45.

Figure 44:
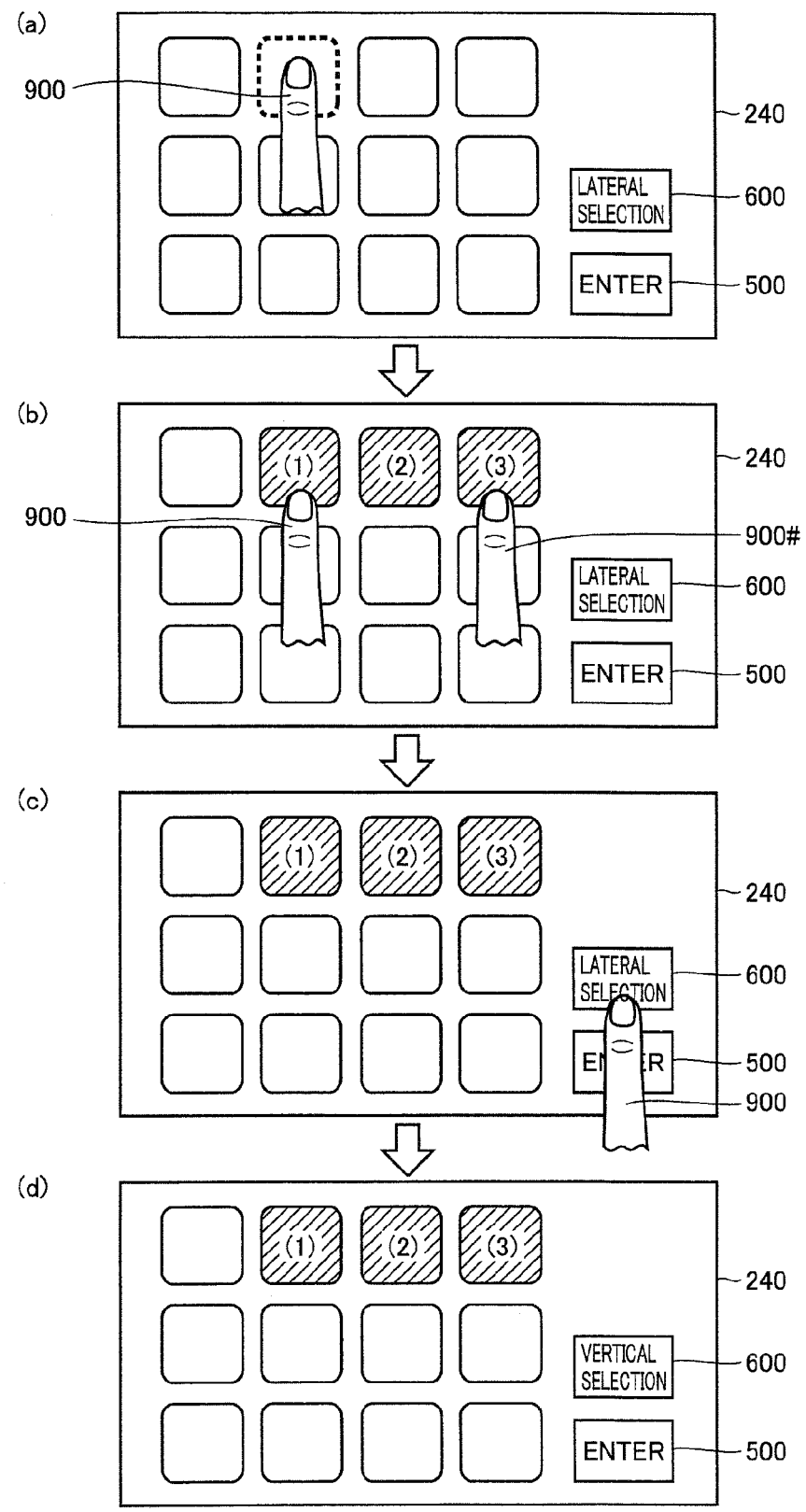
FIG. 44 is a first diagram for illustrating menu selection making use of switching of the order of entry.

FIG. 44(*a*) is a diagram showing a state where the user presses one menu within liquid crystal panel 240 with his/her finger 900.

FIG. 44(*b*) is a diagram showing a state where the user presses a menu other than the menu pressed in FIG. 44(*a*) in liquid crystal panel 240 with finger 900#. Since two menus are simultaneously pressed, menu selection unit 456 provisionally selects the menus having the pressed menus at respective opposing ends. Here, since the order of entry is set to lateral selection, menus shown with a hatched line in FIG. 44(*b*) are provisionally selected.

FIG. 44(*c*) is a diagram showing a manner in which the user presses switch button 600 with his/her finger after provisional selection in FIG. 44(*b*). As a result of this operation, menu selection unit 456 switches the order of entry to vertical selection. FIG. 44(*d*) is a diagram showing a display screen after switching of the order of entry.

Figure 45:
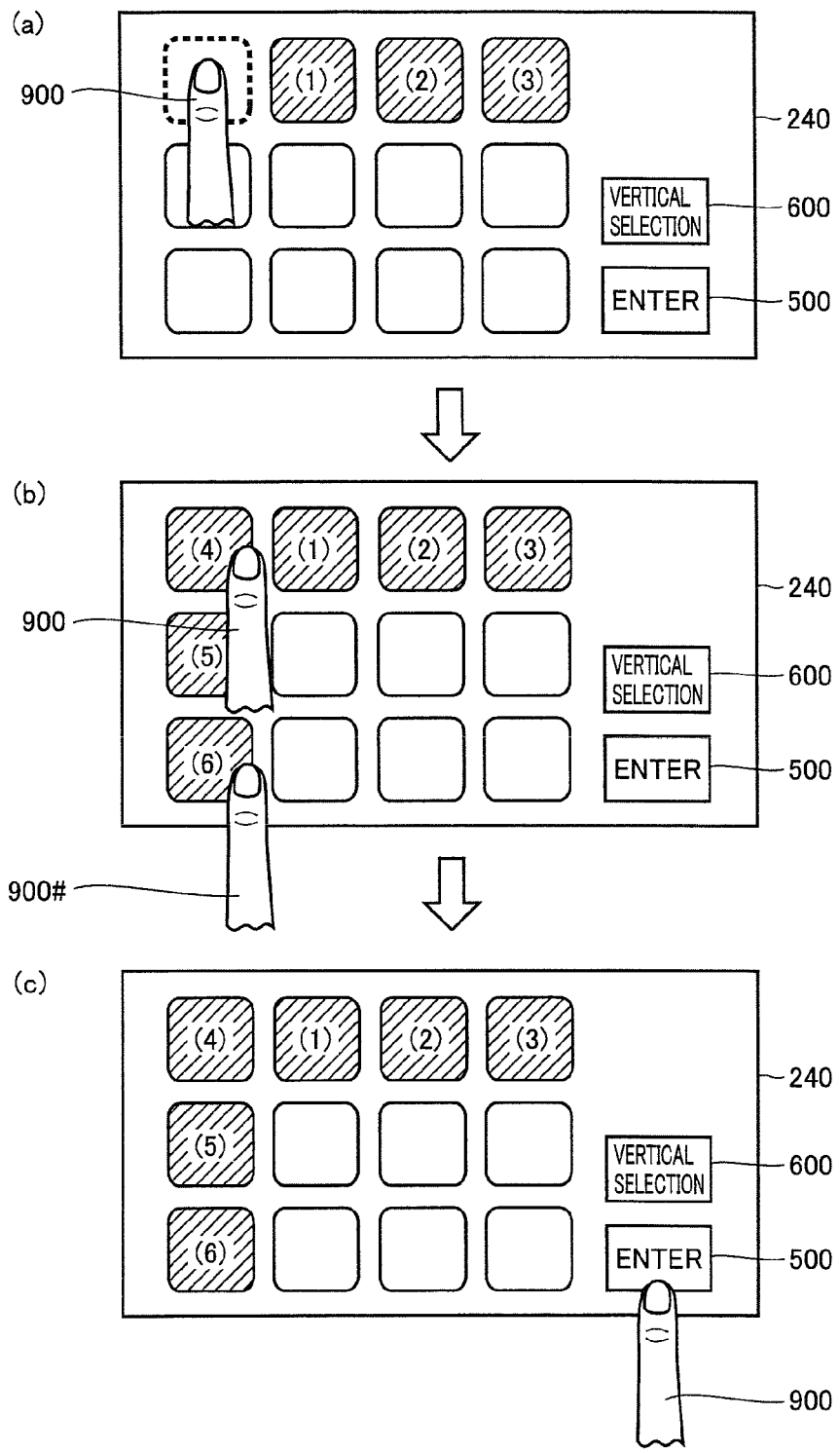
FIG. 45 is a second diagram for illustrating menu selection making use of switching of the order of entry.

FIG. 45(*a*) is a diagram showing a state where the user presses one menu in liquid crystal panel 240, which has not provisionally been selected, with finger 900 in the state shown in FIG. 44(*d*).

FIG. 44(*b*) is a diagram showing a state where the user presses a menu in liquid crystal panel 240, which has not provisionally been selected and not pressed in FIG. 45(*a*), with finger 900#. Since two menus are simultaneously pressed, menu selection unit 456 provisionally selects menus having the pressed menus at respective opposing ends. Here, since the order of entry is set to vertical selection, menus shown with a hatched line in FIG. 45(*b*) are provisionally selected.

FIG. 45(*c*) is a diagram showing a state where the user presses enter button 500 with finger 900 after provisional selection in FIG. 45(*b*). In response to this operation, menu selection unit 456 enters the provisionally selected menus as the selected menus and outputs the selected menus.

In addition, based on combination of anchor setting and scrolling with each other as described in the fourth embodiment, the user can select menus in further various patterns. For example, when all menus are not displayed in a vertical direction, the user can select menus in a vertically long region by setting the order of entry to vertical selection and then using an anchor and scrolling.

[Miscellaneous]

Combination of the embodiments above as appropriate can be regarded as one manner of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 100 electronic device; 100A casing; 100B casing; 100C hinge; 101 main device; 102 display device; 102A display device; 103 display device; 104 main device; 130 driver; 131 scan signal line driving circuit; 132 data signal line driving circuit; 133 photosensor driving circuit; 134 switch; 135 amplifier; 140 photosensor built-in liquid crystal panel; 140A photosensor built-in liquid crystal panel; 141 pixel circuit; 141b sub pixel circuit; 141g sub pixel circuit; 141r sub pixel circuit; 143 electrode pair; 143a pixel electrode; 143b counter electrode; 144 photosensor circuit; 145 photodiode; 145b photodiode; 145g photodiode; 145r photodiode; 146 capacitor; 151A active matrix substrate; 151B counter substrate; 152 liquid crystal layer; 153b color filter; 153g color filter; 153r color filter; 157 data signal line; 161 polarizing filter; 162 glass substrate; 163 light shielding film; 164 alignment film; 173 memory card reader/writer; 174 external communication unit; 175 microphone; 176 speaker; 177 operation key; 179 backlight; 180 image processing engine; 181 driver control unit; 182 timer; 183 signal processing unit; 191 power switch; 192 power source circuit; 193 power source detecting unit; 194 connector; 195 antenna; 196 connector; 230 driver; 240 photosensor built-in liquid crystal panel; 274 external communication unit; 279 backlight; 280 image processing engine; 281 driver control unit; 282 timer; 283 signal processing unit; 293 power source detecting unit; 294 connector; 295 antenna; 297 signal strength detecting unit; 310 input portion; 320 output portion; 322 display portion; 330 storage portion; 332 menu; 340 interface portion; 350 control unit; 352 display control unit; 410 display and input portion; 430 storage portion; 432 menu; 434 display data; 440 interface portion; 450 control unit; 452 display control unit; 454 position calculation unit; 456 menu selection unit; 500 enter button; 600 switch button; 900 finger; 1001 first unit; and 1002 second unit.

The invention claimed is:

1. An electronic device, comprising:
a storage portion for storing a plurality of menus;
a multi-point-acceptable display-integrated tablet extending in horizontal and vertical directions;
a display control unit for causing said display-integrated tablet to display a display screen including said plurality of menus, wherein the menus are arranged in the horizontal and vertical directions;
an input processing unit for outputting an indicated position in accordance with an input while said input is provided to said display-integrated tablet;
a selection unit for selecting said menus based on a plurality of simultaneously output said indicated positions; and
an output portion for outputting selected said menus,
said selection unit selects said menus lying between two simultaneously output said indicated positions,
said selection unit selects said menus on a line segment having two simultaneously output said indicated positions at respective end points,
said storage portion stores timing of start of each said input,
said selection unit sequentially provides selected said menus with respective selection serial numbers from one said end point to the other said end point wherein the selection serial numbers are based on an order of said timing of start of said input corresponding to each said end point, and
said output portion outputs said menus based on the selection serial numbers.

2. The electronic device according to claim 1, wherein
said storage portion stores timing of start of each said input, and
said selection unit selects said menus on a polygonal line formed by connecting the plurality of simultaneously output said indicated positions in an order of said timing of start of said input corresponding to each said indicated position.

3. The electronic device according to claim 2, wherein
said selection unit sequentially provides selected said menus with respective selection numbers from one end point of said polygonal line to the other end point of said polygonal line, and
said output portion outputs said menus based on said selection numbers.

4. The electronic device according to claim 1, wherein
said storage portion stores an order of display of each said menu in said display screen, and
said selection unit selects the plurality of said menus having said menus corresponding to two simultaneously input said indicated positions at respective opposing ends and having consecutive said order of display.

5. The electronic device according to claim 4, wherein
said selection unit provisionally selects one said menu simultaneously designated by the plurality of said indicated positions and selects the plurality of said menus having two provisionally selected said menus at respective opposing ends and having consecutive said order of display.

6. The electronic device according to claim 5, wherein
said display control unit causes said display screen to scroll in accordance with continuous transition of said indicated position.

7. The electronic device according to claim 4, wherein
said output portion outputs said menus based on said order of display.

8. The electronic device according to claim 1, wherein
said output portion includes a monitor.

9. The electronic device according to claim 8, wherein
said monitor is a photosensor built-in liquid crystal panel.

10. The electronic device according to claim 1, wherein
said display-integrated tablet is a photosensor built-in liquid crystal panel.

11. A method of selecting a menu with an electronic device having a multi-point-acceptable display-integrated tablet extending in horizontal and vertical directions, comprising:
displaying a display screen including a plurality of said menus on said display-integrated tablet, wherein the menus are arranged in the horizontal and vertical directions;
outputting an indicated position in accordance with an input while said input is provided to said display-integrated tablet; and
selecting said menus based on a plurality of simultaneously output said indicated positions, said selecting step selecting said menus lying between two simultaneously output said indicated positions, said selecting step selecting selects said menus on a line segment having two simultaneously output said indicated positions at respective end points, said storage portion stores timing of start of each said input, said selecting step sequentially providing selected said menus with respective selection serial numbers from one said end point to the other said end point wherein the selection serial numbers are based on an order of said timing of start of said input corresponding to each said end point, and outputting said menus based on the selection serial numbers.

12. A non-transitory processor-readable medium having embodied thereon instructions which, when executed by a processor, cause the processor to perform a method of causing an electronic device having a multi-point-acceptable display-integrated tablet extending in horizontal and vertical directions displaying a plurality of menus to select a menu, wherein the menus are arranged in the horizontal and vertical directions, said electronic device including an input processing unit for outputting an indicated position in accordance with an input while said input is provided to said display-integrated tablet, the method comprising:

determining whether said input processing unit is simultaneously outputting a plurality of said indicated positions; and selecting menus from among said plurality of menus displayed on said display-integrated tablet based on the plurality of simultaneously output said indicated positions when said electronic device has determined that said input processing unit is simultaneously outputting the plurality of said indicated positions, said selecting step selecting said menus lying between two simultaneously output said indicated positions, selecting step selecting said menus on a line segment having two simultaneously output said indicated positions at respective end points, storing timing of start of each said input, said selecting step sequentially providing selected said menus with respective selection serial numbers from one said end point to the other said end point wherein the selection serial numbers are based on an order of said timing of start of said input corresponding to each said end point, and outputting said menus based on the selection serial numbers.

* * * * *